United States Patent [19]

Krogmann

[11] 4,321,678

[45] Mar. 23, 1982

[54] APPARATUS FOR THE AUTOMATIC DETERMINATION OF A VEHICLE POSITION

[75] Inventor: Uwe Krogmann, Überlingen, Fed. Rep. of Germany

[73] Assignee: Bodenseewerk Geratetechnik GmbH, Bodensee, Fed. Rep. of Germany

[21] Appl. No.: 101,736

[22] Filed: Dec. 7, 1979

Related U.S. Application Data

[63] Continuation-in-part of Ser. No. 904,926, May 11, 1978, abandoned.

[30] Foreign Application Priority Data

Sep. 14, 1977 [DE]  Fed. Rep. of Germany ....... 2741274
Jan. 29, 1979 [DE]  Fed. Rep. of Germany ....... 2903282
Jun. 1, 1979 [DE]  Fed. Rep. of Germany ....... 2922411
Jun. 1, 1979 [DE]  Fed. Rep. of Germany ....... 2922414
Jun. 1, 1979 [DE]  Fed. Rep. of Germany ....... 2922415

[51] Int. Cl.$^3$ .................. G06G 7/78; G01C 19/38
[52] U.S. Cl. ................ 364/453; 33/320; 33/324; 364/434; 364/450
[58] Field of Search .......... 364/434, 450, 453, 556, 364/559, 571; 33/318, 320, 324, 326

[56] References Cited

U.S. PATENT DOCUMENTS

3,206,864  9/1965  Sanchirico et al. ............ 33/324
3,911,255  10/1975  Dewar et al. ............... 33/318 X
3,962,797  6/1976  Galuschak .................. 33/318 X
4,038,527  7/1977  Brodie et al. .............. 364/453
4,075,764  2/1978  Krogmann et al. ........... 33/324
4,106,094  8/1978  Land ...................... 364/434 X
4,114,437  9/1978  Krogmann ................. 364/450 X
4,123,849  11/1978  Maughmer ................. 33/320

Primary Examiner—Jerry Smith
Attorney, Agent, or Firm—Darbo & Vandenburgh

[57] ABSTRACT

The position of a vehicle is derived from vehicle speed and heading. A two-axis electrically restrained gyro, the spin axis of which is parallel to the vehicle vertical axis, serves at first to determine the north direction with stationary vehicle. The attitude of the vehicle about the longitudinal and transverse axes is measured by means of a pair of vehicle-fixed accelerometers. True north direction is derived from the signals of the accelerometers and of the gyro. Subsequently the gyro is rotated through 90° about one input axis and serves as heading-attitude reference during the mission. The rotary speed about a third axis perpendicular to the input axes of the gyro is measured by means of a rotary acceleration meter the output of which is applied to an integrator. During the mission, the attitude parameters of the vehicle are computed continuously from the initial attitude parameters and the rotary speeds. An estimated value of the gyro drift is obtained in a filter by comparison with a magnetic heading and is taken into account. The speed signal from a vehicle speed sensor and inertial speed signals which are derived from the acceleration signals are applied to a filter which provides an estimated value of the error of the speed signal. The speed signal is corrected for this estimated value. The corrected speed signal is resolved into components in accordance with the attitude parameters. The position of the vehicle is derived from these speed components by integration.

25 Claims, 26 Drawing Figures

APPARATUS FOR THE AUTOMATIC DETERMINATION OF A VEHICLE POSITION

RELATED APPLICATIONS

This application is a Continuation-in-Part of applicant's patent application 904,926, filed May 11, 1978 and entitled "Instrument for the Automatic Determination of the North Direction" and now abandoned. The disclosure of this application is incorporated in the present application by reference.

BACKGROUND AND SUMMARY OF THE INVENTION

Meridian gyros are known, wherein the spin axis of the gyro is kept horizontal, for example by suspending the housing by means of a tape. A gyro directing torque acts on the gyro and tends to align the gyro spin axis with north direction. In order to avoid the loss of time involved with the rotation of the gyro into the north direction, it is known, with such a tape suspended meridian gyro to sense the deflection of the gyro from a zero position by means of a pick-off and to apply the pick-off signal with approximately high gain to a torquer, which exerts on the gyro a torque about the vertical tape axis and counteracting the gyro directing torque. Thus the gyro is electrically restrained to the zero position, and, practically, the gyro directing torque is counteracted by a counter-torque. The amplified pick-off signal, which is applied to the torquer, will then be proportional to the gyro directing torque. The north deviation, i.e. the deviation of the zero position of gyro from the north direction, can be derived from this signal. As the gyro directing torque is proportional to the cosine of geographic latitude, this latitude has to be taken into account when determining the north deviation. Conventionally the gyro spin axis of this meridian gyro is pre-aligned with north (U.S. Pat. No. 3,750,300 to Tumback and U.S. Pat. No. 3,758,952 to Fischel).

Furthermore an electrically restrained gyro with horizontal spin axis is known with which the gyro directional torque is measured at two slightly different azimuth angles of the spin axis. The values obtained thereby are fed into an analog computer which is to compute therefrom the north deviation independently of geographic latitude. With this prior art device, two consecutive measurements with intermediate rotation of the gyro in azimuth through a fixed angle are required. The signal representing north deviation is obtained as a difference of two signals which are large as compared thereto, whereby the accuracy of this measurement is rather limited (U.S. Pat. No. 3,206,864 to Sanchirico).

In another prior art gyro instrument (German Pat. No. 1,281,155) the gyro consists of a rotating ball with well-defined main axis of inertia. The ball is mounted through an air bearing in a cup, which is driven about a vertical axis by a motor. The gyro is driven by the air friction occuring, when the cup is driven, and tends to maintain its orientation in inertial space. However the cup and thus the direction of the driving torque acting on the gyro change their orientation relative to inertial space in the course of the rotation of the earth. Thereby the axis of rotation of the cup will not coincide with the main axis of inertia of the gyro, even if these axes were initially aligned. This results in a precession torque as component of the driving torque acting on the gyro, whereby the main axis of inertia of the gyro is caused to follow the vertical axis of rotation of the cup. The follow-up occurs, however, with a lag in east-west direction, which is observed by means of an optical system.

This prior art arrangement is expensive and makes use of effects, such as torque generation by air friction, which are difficult to control. The position of the gyro has to be detected contact-freely, for example by visual observation or by photoelectric pick-offs.

In another prior art device (German Offenlegungsschrift No. 1,448,737), a spherical gyro is mounted for universal rotation on a central support ball. A force, which is exerted by a torquer, acts on the gyro axis at a distance from the support ball. The torquer is laterally spaced from the gyro and is located on an arm, which is rotatable around the gyro about a vertical axis by means of a servomotor. The position of the gyro axis is picked off in two mutually perpendicular directions by means of photoelectric position pick-offs. The servomotor and the torquer are controlled by the position pick-offs such that the gyro spin axis is kept vertical. The arm will then align itself with north direction, while the erection torque then acting in east-west direction provides a measure of geographic latitude.

Also this arrangement is rather expensive. It provides north direction only after a run-in procedure.

U.S. Pat. No. 4,123,849 discloses a device for determining the north direction by using a two-axis gyro with vertical spin axis. An angle pick-off and a torquer are arranged on each of the two input axes. Each angle pick-off is connected crosswise to the torquer of the respective order input axis through amplifier means, whereby the gyro is electrically restrained to its position of rest. The ratio of the restraining torques is the inverse tangent of the north deviation angle. The gyro is supported on a float assembly which floats on a liquid, whereby the spin axis remains always vertically aligned.

This device requires expensive means for keeping the gyro spin axis vertical.

German Offenlegungsschrift No. 25 45 025 discloses a navigational instrument for the navigation of land vehicles, wherein a north-seeking meridian gyro, for example of the type disclosed in U.S. Pat. No. 3,758,952 or German Offenlegungsschrift No. 1 941 808 is provided for the determination of the north direction with stationary vehicle. A free gyro as heading reference unit is arranged to be aligned in accordance with the meridian gyro. A speed sensor provides a signal proportional to vehicle speed. A computer is connected to the heading reference unit and to the speed sensor and provides output signals representing the vehicle position in a grid coordinate system, from the grid heading angle and speed signals supplied by the heading reference unit and the speed sensor. The drift of the free gyro relative to the grid coordinate system due to the rotation of the earth is compensated for or is taken into account in the computer.

It is an object of the invention to provide a navigational instrument for vehicles, wherein a single gyro can be used both for the "northing" with stationary vehicle and as heading reference unit during the mission.

It is another object of the invention to provide a navigational instrument with a gyro for northing, wherein no exact alignment of the gyro spin axis is required.

It is another object of the invention to eliminate certain errors occurring with the "northing".

It is a still further object of the invention to provide a heading-attitude reference unit for a navigational instrument, which unit provides the heading and the transformation parameters for a transformation from a vehicle-fixed coordinate system into an earth-fixed coordinate system.

A more specific object of the invention is to obtain heading and transformation parameters unaffected by Newton's accelerations of the vehicle relative to ground.

Eventually it is an object of the invention to provide estimated values of the errors of some measured quantities used, and to correct the measured quantities correspondingly.

According to one aspect the invention relates to a navigational instrument for a vehicle, wherein the north direction is determined by means of a gyro, comprising: a two-axis gyro having a spin axis, a first and a second input axis, a first angle pick-off and a first torquer on the first input axis, a second angle pick-off and a second torquer on the second input axis, first amplifier means for applying the amplified angle signal from the first angle pick-off to the second torquer, second amplifier means for applying the amplified angle signal from the second angle pick-off to the first torquer, and signal processing means, to which the amplified angle signals are applied. This navigational instrument is characterized by the following features:

The gyro with the angle pick-offs and the torquers is arranged in an intermediate housing. The intermediate housing is mounted for rotation about an axis of rotation parallel to one input axis through 90° from a first position with substantially vertical spin axis into a second position. A pair of vehicle-fixed accelerometers is arranged with its input axes parallel to the transverse and longitudinal axes, respectively, of the vehicle. The signal processing means comprise first computer means for providing initial vehicle attitude signals from the amplified angle signals with stationary vehicle and said first position of the intermediate housing, and second computer means for continuously providing vehicle attitude signals representing the attitude of the moving vehicle in an earth-fixed coordinate system from said initial vehicle attitude signals and said accelerometer signals with the second position of the intermediate housing.

Said first computer means may comprise means for forming from the acceleration signals $A_x^F$, $A_y^F$ of the accelerometers estimated values of the elements $C_{31}$ and $C_{32}$ of the directional cosine matrix for the transformation from a vehicle-fixed coordinate System $(x^F, y^F, z^F)$ into an earth-fixed coordinate system $(x^R, y^R, z^R)$ in accordance with the relation $$\hat{C}_{31}(O) = -\frac{\hat{A}_x^F}{g}$$

$$\hat{C}_{32}(O) = -\frac{\hat{A}_y^F}{g},$$

means for forming, from the estimated values thus obtained, an estimated value of the third element $C_{33}$ of the last line of the directional cosine matrix $C_F^R$ in accordance with the relation.

$$\hat{C}_{33}(O) = +\sqrt{1 - \hat{C}_{32}^2 - \hat{C}_{32}^2} \text{ , and}$$

means for providing, from the signals $C_{31}, C_{32}$ and $C_{33}$ as well as from signals representing the rotary speeds $W_y^F$ and $W_x^F$, which are derived from the signals applied to the torquers, a signal representing the initial heading angle $\psi(O)$ of the vehicle in an earth-fixed coordinate system in accordance with the relation $$\cos \psi(O) = \frac{1}{\sqrt{1-\hat{C}_{31}^2}} \left[ \hat{C}_{31} \sin \Phi + \frac{\hat{w}_x^F}{\Omega_E \cos \Phi} \right]$$

$$\sin \psi(O) = -\frac{1}{\sqrt{1-\hat{C}_{31}^2-\hat{C}_{32}^2}} \sqrt{1-\hat{C}_{31}^2} \left[ \frac{\hat{w}_y^F}{\Omega_E \cos \Phi} + C_{32} \tan \Phi + \hat{C}_{31}\hat{C}_{32} \cos \psi(O) \right]$$

wherein $\Phi$ is geographic latitude and $\omega_E$ is the rotary speed of the earth.

Certain systematic errors may be eliminated by measuring at two positions of the gyro unit angularly offset by 180° about a horizontal input axis and/or about the vertical spin axis.

The attitude parameter and the heading angle during the mission can be obtained in that the signal processing or computer means comprises means for providing signals $$\dot{C}_{31} = C_{32}\omega_z^F - C_{33}\omega_y^F$$

$$\dot{C}_{32} = C_{33}\omega_x^F - C_{31}\omega_z^F \text{ wherein}$$

$C_{31}, C_{32}, C_{33}$ are the elements of the last line of the directional cosine matrix, $\dot{C}_{31}, \dot{C}_{32}$ are the associated time derivatives, $\omega_x^F$ is the rotary speed about an input axis $x^F$ in the vehicle-fixed coordinate system, $\omega_y^F$ is the rotary speed about the second input axis $y^F$ in the vehicle-fixed coordinate system, and $\omega_z^F$ is the rotary speed about the third input axis $z^F$ in the vehicle-fixed coordinate system, means for integrating the signals $\dot{C}_{31}$ and $\dot{C}_{32}$ with respect to time to provide signals $C_{31}$ and $C_{32}$, respectively, means for providing a signal $$C_{33} = \sqrt{1 - C_{31}^2 - C_{32}^2}$$

from the signals $C_{31}$ and $C_{32}$ thus obtained, means for feeding the signals $C_{31}, C_{32}$ and $C_{33}$ back to the computer for providing $\dot{C}_{31}$ and $\dot{C}_{32}$ from the rotary speed signals, means for providing a signal from the signals $C_{31}, C_{32}, C_{33}$ thus obtained and from the rotary speed signals $W_z^F$ and $W_y^F$, and means for integrating this signal with respect to time to provide a signal representing the heading angle $\psi$ in the earth-fixed coordinate system.

According to another aspect, the invention relates to a navigational instrument for land vehicles. The navigational instrument includes an inertial measuring unit having rotation-responsive inertial sensors, which respond to rotary movements about vehicle-fixed axes, and accelerometers, which respond to linear accelerations along vehicle-fixed axes. A speed sensor responds to the speed of the vehicle with respect to ground in the direction of the longitudinal axis of the vehicle. A transformation parameter computer to which the signals from the inertial measuring unit are applied comprises means for computing transformation parameters for the transformation of vector components from a vehicle-fixed coordinate system into an earth-fixed coordinate system. Corrective signal generators, to which transformation parameters from the transformation parameter computer are applied, provide output signals representing the components due to gravity of the accelerations detected by the accelerometers. The output signals are superposed to the signals from the accelerometers to provide translation acceleration signals. Integrators, to which the translation acceleration signals are applied, provide inertial speed signals. An optimal filter, to which the inertial speed signals and the signal from the speed sensor are applied provides optimized speed signals referenced to vehicle-fixed coordinates on the basis of these signals. A coordinate transformation computer to which the optimized speed signals and the transformation parameters from the transformation parameter computer are supplied comprises means for transforming these speed signals into transformed speed signals, which are referenced to an earth-fixed coordinate system. A position computer to which the transformed speed signals are supplied comprises means for providing position signals representing the position of the vehicle.

Therein the optimal filter has the following structure: The difference $(V_{Ix}{}^F - v_x{}^F)$ of the component $v_{Ix}{}^F$ falling into the direction of the vehicle longitudinal axis of the inertial speed signal and of the speed signal from the speed sensor is opposed, at a first summing point, to the difference of a first signal and a second signal to provide a first difference signal $(z_1)$, said signal representing an estimated value $(\Delta\hat{v}_{Ix}{}^F)$ of the error of the longitudinal component signal $(v_{Ix}{}^F)$ of the inertial speed, and said second signal representing an estimated value $(\Delta\hat{v}_x{}^F)$ of the error of the speed signal $(v_x{}^F)$. The component $(v_{Iy}{}^F)$ falling into the direction of the vehicle transverse axis of the inertial speed signal is opposed, at a second summing point, to a further signal to provide a second difference signal $(z_2)$, this further signal representing an estimated value $(\Delta\hat{v}_{Iy}{}^F)$ of the error of the transverse component signal $(v_{Iy}{}^F)$ of the inertial speed. The first difference signal $(z_1)$ multiplied by a factor $(K_{11})$ and a signal $$C_{32}d_z - C_{33}d_y$$

are added at a third summing point, the sum being integrated by means of an integrator to provide a signal $\Delta\hat{C}_{31}$, wherein $C_{32}, C_{33}$ are elements, provided by the transformation parameter computer, from the last line of the directional cosine matrix for the transformation from a vehicle-fixed coordinate system into an earth-fixed coordinate system, $d_z, d_y$ are the known drifts of the rotary speed sensors sensitive about the vertical and transverse axes, respectively, and $\Delta\hat{C}_{31}$ is an estimated value of the error of the element $C_{31}$ of the directional cosine matrix.

The signal $C_{31}$ multiplied by the acceleration g due to gravity, the first difference signal $z_1$ multiplied by a factor $K_{31}$, as well as the known zero deviation $b_x$ of the accelerometer sensitive in longitudinal direction of the vehicle are added at a fifth summing point and are integrated by means of an integrator to provide a signal which represents the estimated value $\Delta\hat{v}_{Ix}{}^F$ of the error of the longitudinal component signal $v_{Ix}{}^F$ of the inertial speed. The signal $A_x{}^F$ of the accelerometer sensitive in longitudinal direction of the vehicle, and the element $C_{31}$ of the first column and third line of the directional cosine matrix provided by the transformation parameter computer and multiplied by the acceleration g due to gravity are added at a sixth summing point to provide a signal $v_x{}^F$ representing the translatory acceleration in the longitudinal axis of the vehicle. The first difference signal $z_1$ multiplied by a factor $K_{61}$ is integrated by an integrator to provide an estimated value of the error $\Delta\hat{k}_x$ of the scale factor of the speed sensor. The first difference signal $z_1$ multiplied by a factor $K_{51}$, and the product of the signal representing the translatory acceleration $v_x{}^F$ and of the output signal from the last-mentioned integrator are added at a seventh summing point, the sum being integrated by means of a further integrator to provide the signal which represents the estimated value $\Delta\hat{v}_x{}^F$ of the error of the speed signal from the speed sensor. The signal $C_{32}$ multiplied by the acceleration g due to gravity, and the second difference signal $z_2$ multiplied by a factor $K_{42}$, as well as the known zero deviation of the accelerometer sensitive in longitudinal direction of the vehicle are added in an eighth summing point and are integrated by means of an integrator to provide a signal which represents the estimated value $(\Delta\hat{v}_{Iy}{}^F)$ of the error of the transverse component signal $v_{Iy}{}^F$ of the inertial speed. The signal representing the estimated value $\Delta\hat{v}_x{}^F$ of the error of the speed signal is substracted from the speed signal.

An embodiment of the invention will now be described in greater detail with reference to the accompanying drawings:

BRIEF DESCRIPTION OF THE DRAWINGS

The navigation system comprises magnetic field sensors 10,12,14 for the components $G_x^F$, $G_y^F$, $G_z^F$ of the magnetic field of the earth. The magnetic field sensors are so-called "fluxgates". These magnetic field sensors 10,12 and 14 are mounted on the vehicle 16 (FIG. 2) such that they respond to the components of the magnetic field of the earth along the longitudinal axis $x^F$, the transverse axis $y^F$ and the vertical axis $z^F$ of the vehicle, respectively. Thus they provide the components of the magnetic field of the earth in a vehicle-fixed coordinate system. In FIG. 1, the magnetic field sensors 10,12,14 are represented by the block 18.

Figure 1:
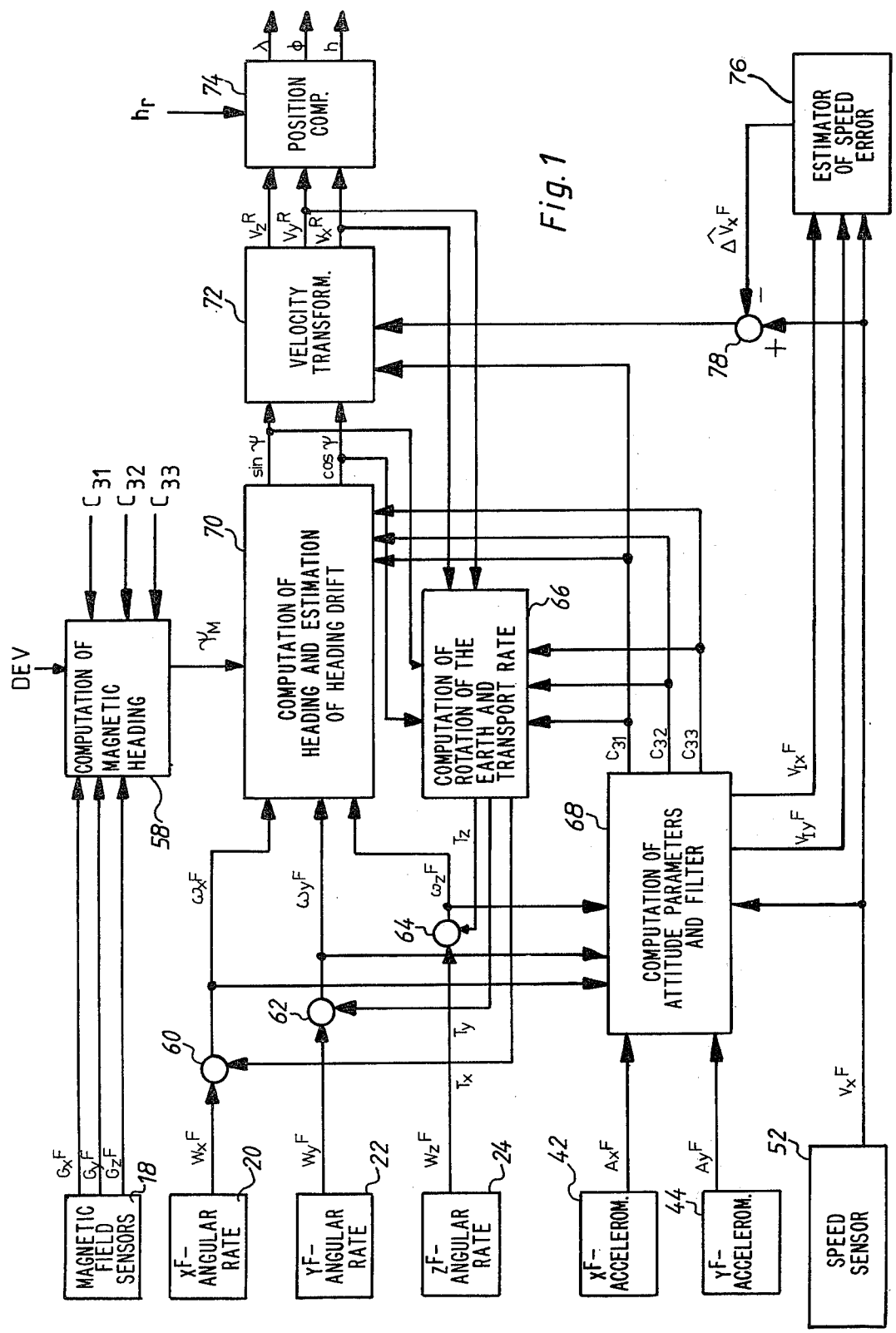
FIG. 1 is a block diagram and illustrates the overall system of a navigational instrument according to the invention.
Figure 2:
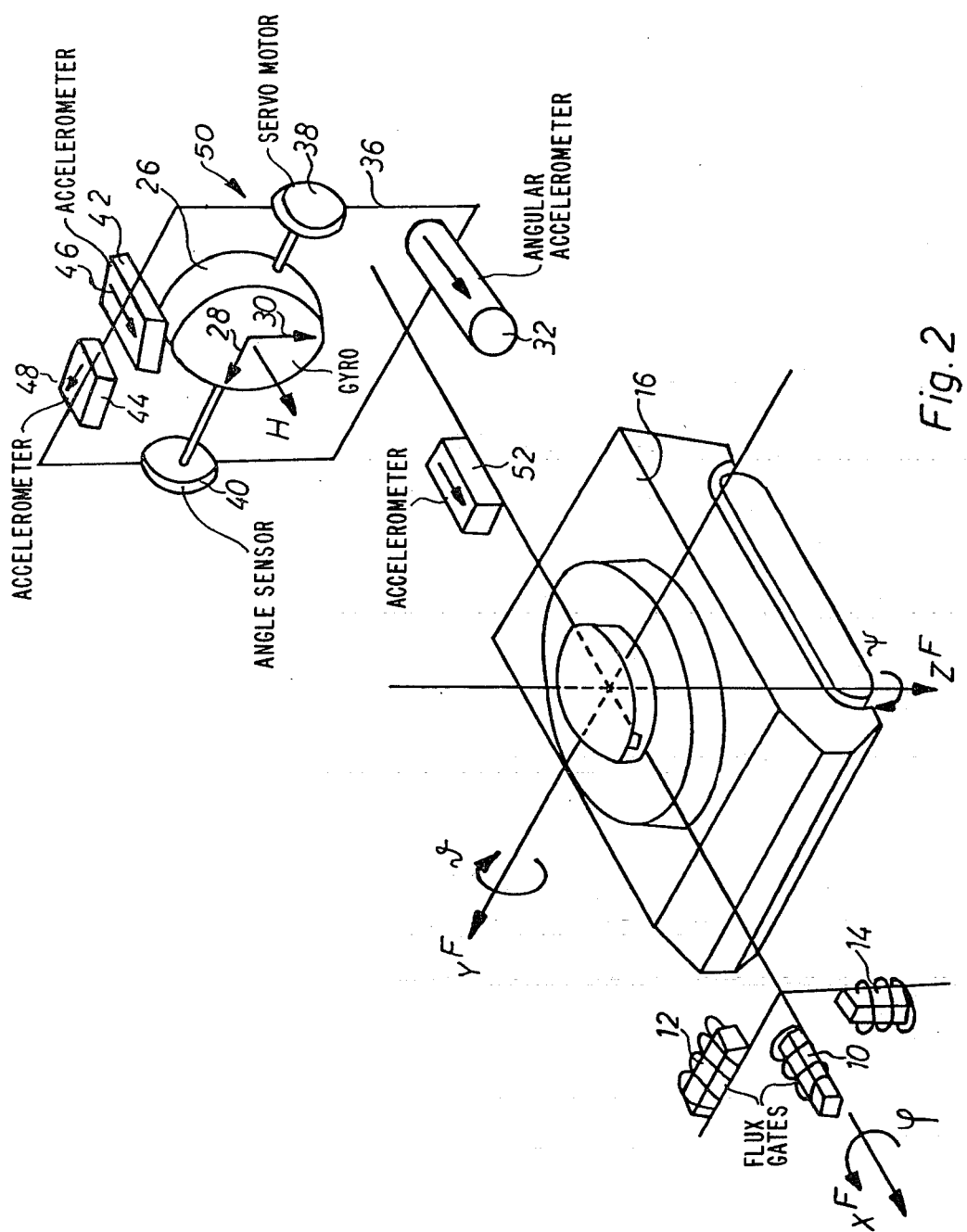
FIG. 2 is a schematic-perspective illustration of the vehicle and illustrates the construction and arrangement of the various sensors.

Furthermore sensors for the rotary speeds $w_x^F$, $w_y^F$, $w_z^F$ about the vehicle fixed coordinate axes $x^F$, $y^F$, $z^F$ are provided. These are illustrated in the block diagram of FIG. 1 as sensors 20,22 and 24. In practice the sensors 22 and 24 are a two-axis rate gyro 26 (FIG. 2). This rate gyro 26 is of the type illustrated in FIG. 4 or 5. In the position illustrated of the rate gyro 26, the spin axis H is parallel to the longitudinal axis $x^F$ of the vehicle. Its two input axes 28 and 30 are parallel to the transverse axis $y^F$ and the vertical axis $z^F$ of the vehicle, respectively. The third sensor 20 comprises a rotary acceleration meter 32 the output signal of which is applied to an integrator 34 (FIG. 6). The rate gyro 26 is mounted for rotation about its input axis 28 parallel to the transverse axis of the vehicle in a vehicle-fixed frame or intermediate housing 36. It may be rotated by a servomotor 38 from an operational position "northing", with which the spin axis H is vertical, through 90° into the operational position "heading-attitude reference unit". The movement of the servomotor is monitored by an angle sensor 40.

Furthermore two vehicle fixed accelerometers 42 and 44 are provided. The input axis 46 of the accelerometer 42 is parallel to the longitudinal axis $x^F$ of the vehicle. The input axis 48 of the accelerometer 44 is parallel to the transverse axis $y^F$ of the vehicle.

The sensors 20,22,24 and 42,44 together define the "inertial measuring unit" 50.

A speed sensor 52 is provided as additional sensor and measures, as indicated in FIG. 2, the speed of the vehicle 16 in the direction of the longitudinal axis of the vehicle.

Figure 3:
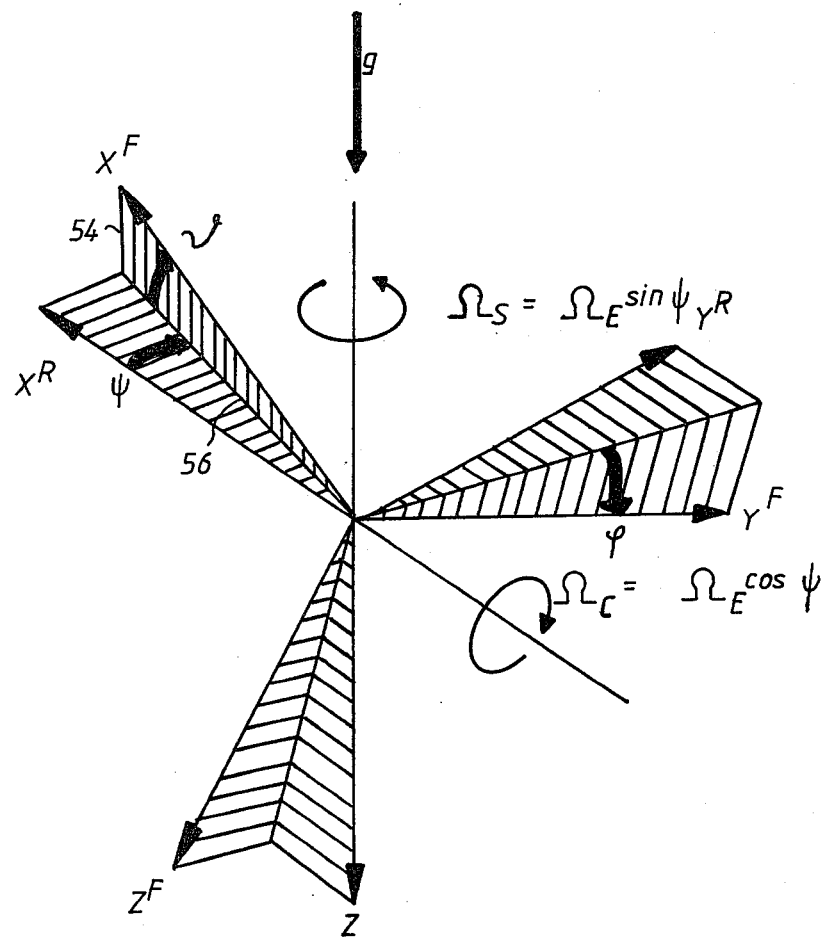
FIG. 3 illustrates the relative positions of the vehicle-fixed and earth-fixed coordinate systems.

The measurements are made in a vehicle-fixed coordinate system with the coordinate axes $x^F$, $y^F$, and $z^F$. For navigation, however, the heading angle and the vehicle speed are required in an earth-fixed coordinate system with the coordinates $x^R$ (north), $y^R$ (east) and $z^R$ (vertical). The relation between the two coordinate systems can be seen from FIG. 3. The vertical plane 54 of the longitudinal axis $x^F$ of the vehicle forms the the true heading angle $\psi$ with the $x^R z^R$-plane. The longitudinal axis $x^F$ of the vehicle is inclined by the pitch angle $\theta$ with respect to the intersection 56 of the plane 54 and the horizontal $x^R y^R$-plane. The coordinate axes $y^F$ and $z^F$ are rotated through the roll angle $\phi$ about the vehicle longitudinal axis thus located.

A vector measured in the vehicle-fixed coordinate system is transformed into the earth-fixed coordinate system by means of a "directional cosine matrix"

$$C_F^R = C_{ij} = \begin{bmatrix} c\vartheta c\psi; & -s\psi c\varphi + ; & s\psi s\varphi + \\ & +s\varphi s\vartheta c\psi; & +c\varphi s\vartheta c\psi \\ c\vartheta s\psi; & c\varphi c\psi + & -s\varphi c\psi + \\ & +s\varphi s\vartheta s\psi; & +c\varphi s\vartheta s\psi \\ -s\vartheta; & s\varphi c\vartheta; & c\varphi c\vartheta \end{bmatrix} \quad (1)$$

In order to save space, "sin" has been abbreviated as "s", and "cos" has been abbreviated as "c". The attitude angles $\vartheta, \psi$ and $\varphi$ are related to the elements of the directional cosine matrix by the following relations:

$$\vartheta = -\arcsin C_{31} \quad (2)$$

$$\psi = \arctan C_{21}/C_{11} \quad (3)$$

$$\varphi = \arctan C_{32}/C_{33} . \quad (4)$$

The acceleration due to gravity is represented in the earth-fixed coordinate system by a vector $$g^R = \begin{bmatrix} O \\ O \\ g \end{bmatrix} \quad (5)$$

while the rotation of the earth is represented by a vector $$\Omega_R = \begin{bmatrix} \Omega_c \\ O \\ -\Omega_s \end{bmatrix} \quad (6)$$

wherein $$\Omega_s = \Omega_E \sin \phi \text{ and} \quad (7)$$

$$\Omega_c = \Omega_E \cos \phi \quad (8)$$

if $\Omega_E$ is the rotary speed of the earth, and $\Phi$ is geographic latitude.

The signals $G_x{}^F$, $G_y{}^F$ and $G_z{}^F$ from the magnetic field sensors 10,12,14 (block 18) are applied to a computer unit 58, to which also the elements $C_{31}, C_{32}, C_{33}$ are applied, which are obtained in a manner still to be described. In addition the computer unit 58 receives a signal DEV, which represents the distortion of the magnetic field lines (deviation) caused by the vehicle. The computer unit 58 provides a signal which represents the magnetic heading angle $\psi_M$ between the intersection 56 in FIG. 3 and the north direction as defined by the direction of the magnetic lines of force (magnetic north).

The signals $w_x{}^F$, $w_y{}^F$, $w_z{}^F$ from the sensors 20,22,24, which represent the rotary speeds relative to inertial space in a vehicle-fixed coordinate system, are compensated at summing points 60,62,64 for the components of the rotation of the earth and for the transport rate, i.e. the rotary speed due to the movement of the vehicle on the surface of the earth, by signals $T_x, T_y, T_z$, which yields the rotary speeds $\omega_x{}^F$, $\omega_y{}^F$, $\omega_z{}^F$ of the vehicle relative to earth.

These signals $\omega_x{}^F$, $\omega_y{}^F$, $\omega_z{}^F$ together with the acceleration signals $A_x{}^F$, $A_y{}^F$ from the accelerometers 42 and 44, respectively, and the speed signal $v_x{}^F$ from the speed sensor 52 are supplied to a computer unit 68. This computer unit 68 provides the elements $C_{31}, C_{32}, C_{33}$ of the directional cosine matrix $C_F{}^R$ as well as inertial speed signals $v_{Ix}{}^F$ and $v_{Iy}{}^F$.

The computer unit 66 receives the elements $C_{31}, C_{32}, C_{33}$ of the directional cosine matrix $C_F{}^R$ from the computer unit 68, the trigonometric functions $\sin \psi$ and $\cos \psi$ of the true heading angle and, for taking the transport rate into account, the components $v_x{}^R$ and $v_y{}^R$ of the vehicle speed in the earth-fixed coordinate system.

A computer unit 70 receives the elements $C_{31}, C_{32}, C_{33}$ from the computer unit 68, and the compensated rotary speeds $\omega_x{}^F$, $\omega_y{}^F$, $\omega_z{}^F$, and the magnetic heading angle $\psi_M$ from the computer unit 58. It provides therefrom the trigonometric functions $\sin \psi$ and $\cos \psi$ of the true heading angle $\psi$. These functions are applied to the computer unit 66 and to a computer unit 72.

The computer unit 72 receives, as mentioned above, the trigonometric functions $\sin \psi$ and $\cos \psi$ from the computer unit 70, furthermore the element $C_{31} = \sin \theta$ of the directional cosine matrix $C_F{}^R$ from the computer unit 68, and a corrected speed signal. It provides therefrom the components $v_x{}^R$, $v_y{}^R$, $v_z{}^R$ of the vehicle speed in the earth-fixed coordinate system. The horizontal speed components $v_x{}^R$, $v_y{}^R$ are supplied, as mentioned before, to the computer unit 66. In addition, the components $v_x{}^R$, $v_y{}^R$ and $v_z{}^R$ are supplied to a position computer 74, to which also a reference altitude $h_r$ is applied. The position computer 74 provides the position of the vehicle in terms of geographic longitude and latitude and of the altitude h.

The speed signal $v_x{}^F$ from the speed sensor 52 is applied to a computer unit 76, to which also the inertial speed signals $v_{Iy}{}^F$ and $v_{Ix}{}^F$ are applied. The computer unit 76 provides an estimated value $\hat{\Delta v}_x{}^F$ of the error of the speed signal $v_x{}^F$. The speed signal $v_x{}^F$ is corrected for this estimated error $\hat{\Delta v}_x{}^F$ at a summing point 78. The speed signal thus corrected is supplied to the computer unit 72, as mentioned hereinbefore.

Figure 4:
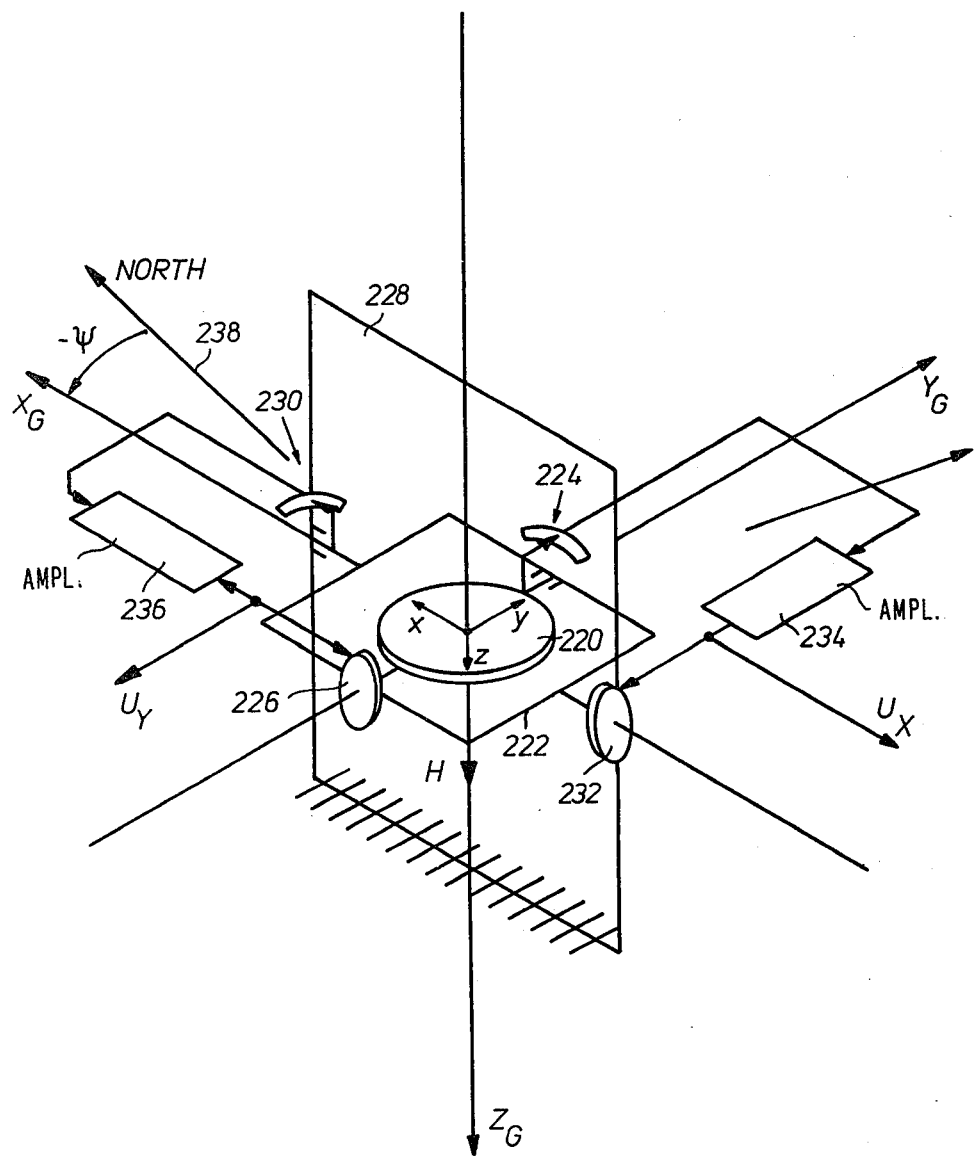
FIG. 4 is a schematic-perspective illustration of the gyro unit in its position for determining north direction.

Referring to FIG. 4, numeral 220 designates the housing of a gyro the spin axis z of which is vertical. The gyro spin is designated "H". The housing 220 is mounted in an inner gimbal 222 about an input axis y, which is perpendicular to the spin axis. A pick-off 224 is attached to the gimbal 222 and responds to a deflection of the housing 220 about the input axis y. A torquer 226 is attached to the gimbal 222 on the opposite side and is adapted to exert a torque about the input axis y on the housing 220. The inner gimbal 222 is mounted in an outer gimbal 228 about an axis which is perpendicular to the input axis y and, in the position of rest, is aligned with the input axis x. A pick-off 230 is attached to the outer gimbal 228 and responds to the deflection of the inner gimbal 222 relative to the outer gimbal 228 about said axis. A torquer 232 is attached to the outer gimbal 228 on the opposite side and is adapted to exert a torque on the inner gimbal 222 about said axis. The pick-offs 224 and 230 and the torquers 226 and 232 are connected crosswise, i.e. the pick-off on the input axis y is connected through a frequency-dependent amplifier 234 to the torquer 232 on the input axis x, and the pick-off 230 on the input axis x is connected through a frequency-dependent amplifier 236 to the torquer 226 on the input axis y. The gains of the amplifiers 234 and 236 are so high, that practically the housing 220 of the gyro and the gimbals 222 and 228 are electrically restrained to the relative positions shown in FIG. 1.

It has been assumed in FIG. 4 that the spin axis H of the gyro is exactly vertical. The input axis x of the gyro, which serves as reference direction, forms an angle $\psi$ with the geographic north direction, said angle being designated "north deviation". This angle is to be measured. A component $\omega_E \cos \Phi$ of the rotation of the earth falls into the geographic north direction, wherein $\omega_E$ is the rotary speed of the rotation of the earth and $\Phi$ is geographic latitude. Of this component, in turn, a component $$\Omega_x = \omega_E \cdot \cos \Phi \cos \psi \qquad (9)$$

will act on the input axis x, and a component $$\Omega_y = -\omega_E \cdot \cos \Phi \sin \psi \qquad (10)$$

will act on the input axis y. The pick-off signals from the pick-offs 224 and 230 amplified by the amplifiers 234 and 236, respectively, generate such input signals $U_y$ and $U_x$, respectively, for the torquers 226 and 232, respectively, that the precession torques caused by the angular speed components $\Omega_x$ and $\Omega_y$, respectively, are just balanced. Therefore, with disturbances neglected, the following relations are valid $$U_x = \frac{H}{K_{Tx}} \Omega_y \qquad (11)$$

$$U_y = -\frac{H}{K_{Ty}} \Omega_x, \qquad (12)$$

wherein $U_y$ [volts] is the voltage applied to the torquer 226,
$U_x$ [volts] is the voltage applied to the torquer 232,
$K_{Ty}$ [p cm volt$^{-1}$] is the constant of the torquer 226 and
$K_{Tx}$ [p cm volt$^{-1}$] is the constant of the torquer 232.

From these two voltages $U_x$ and $U_y$ with known constants of the torquers the north deviation may be derived as follows $$\frac{U_x}{U_y} = \frac{K_{Ty} \cdot \omega_E \cos \Phi \sin \psi}{K_{Tx} \cdot \omega_E \cos \Phi \cos \psi} = \frac{K_{Ty}}{K_{Tx}} \tan \psi, \quad (13)$$

The angle $\psi$ is, as can be seen from FIG. 4, the angle between the instrument-fixed axis x and the north direction 238.

Figure 5:
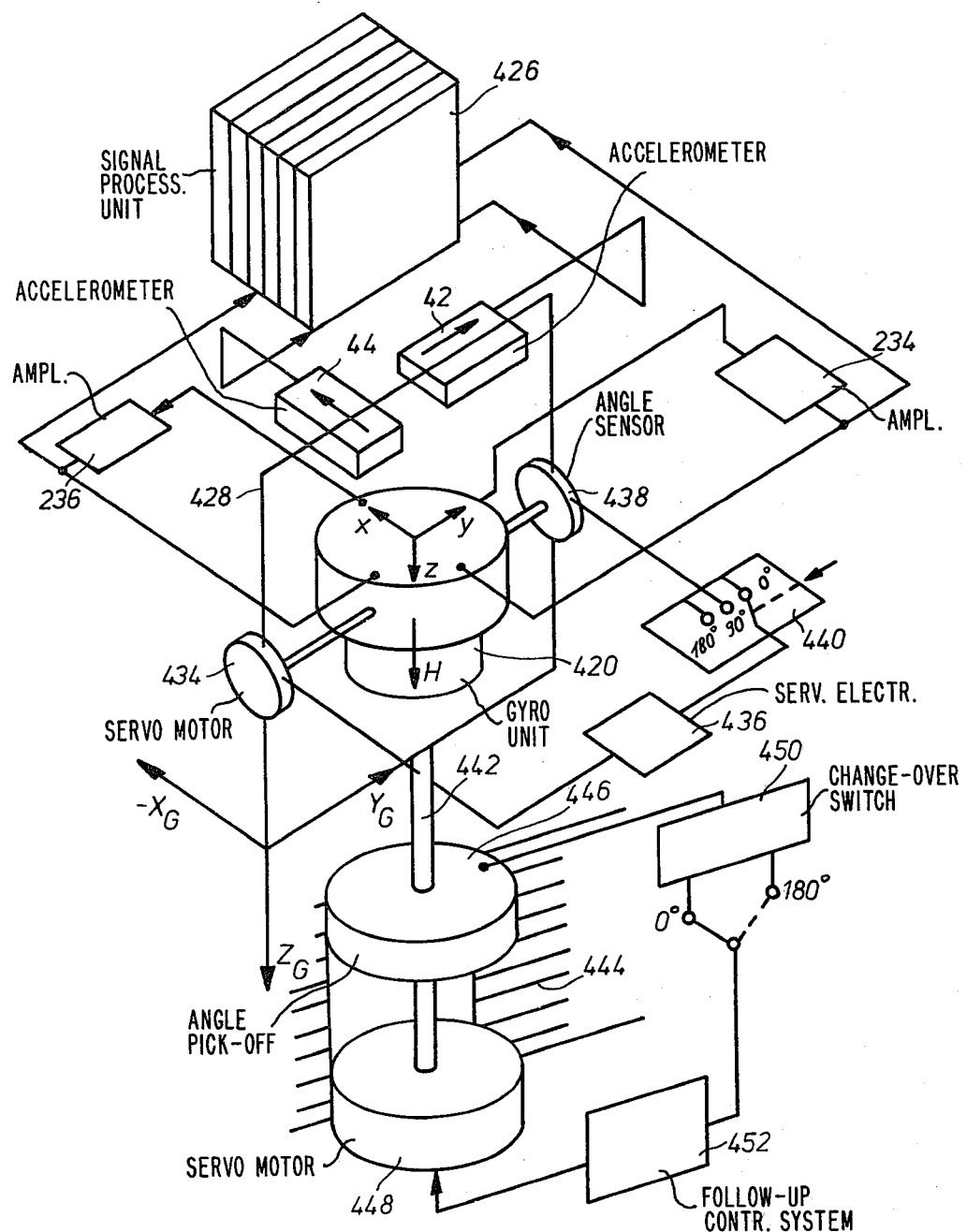
FIG. 5 is a schematic-perspective illustration of the tiltable and rotatable mounting of the gyro unit and of the control and signal processing.
Figure 6:
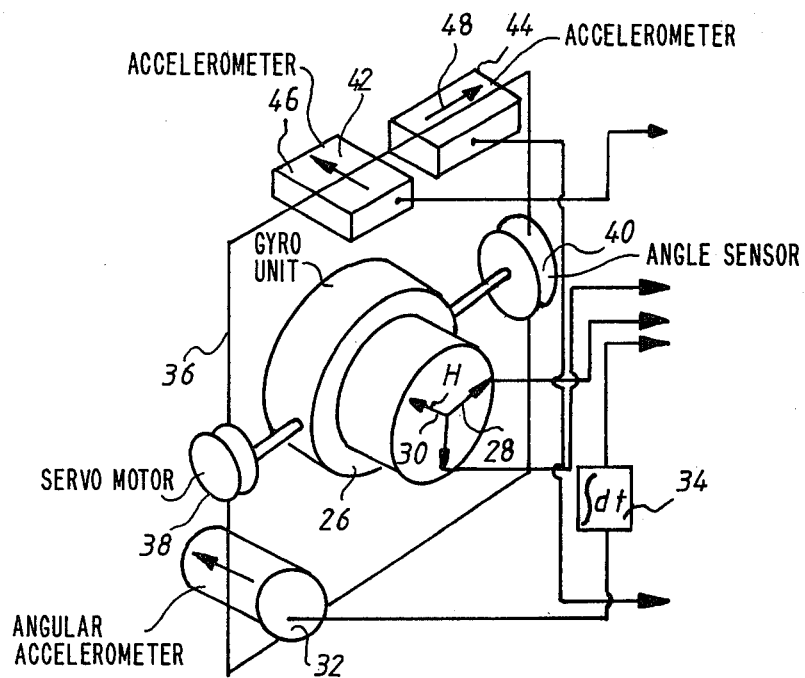
FIG. 6 is a schematic-perspective illustration of the inertial measuring unit used with the navigational instrument, when the gyro unit is in its position heading-attitude reference.

Referring to FIG. 5, numeral 420 designates a gyro unit which is of the type shown in FIG. 4. The gyro unit comprises a two axis gyro the spin axis of which is parallel to the vehicle vertical axis $z^F$, and the two input axes of which are parallel to the longitudinal axis $x^F$ and the transverse axis $y^F$ of the vehicle, respectively. An angle pick-off and a torquer is provided on each of the two mutually perpendicular input axes of the gyro. The signal of each angle pick-off associated with one input axis is connected crosswise, through an amplifier each, to the torquer on the respective other input axis. Thereby the gyro is restrained electrically to the vertical axis of the vehicle.

Figure 11:
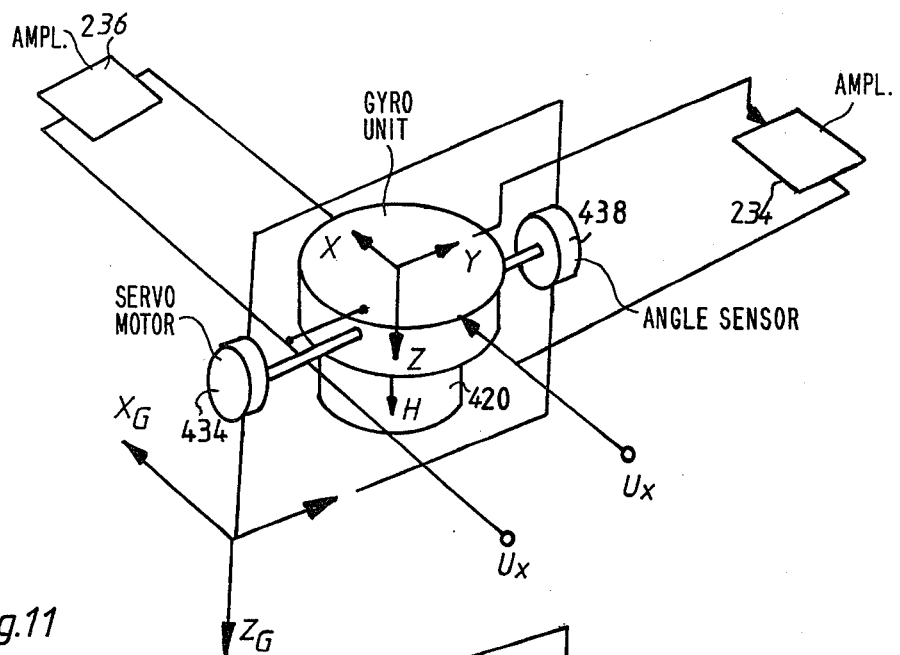
FIG. 11 illustrates the orientation of the gyro unit and of the associated gyro unit-fixed coordinates in a first position for the determination of the north direction.
Figure 12:
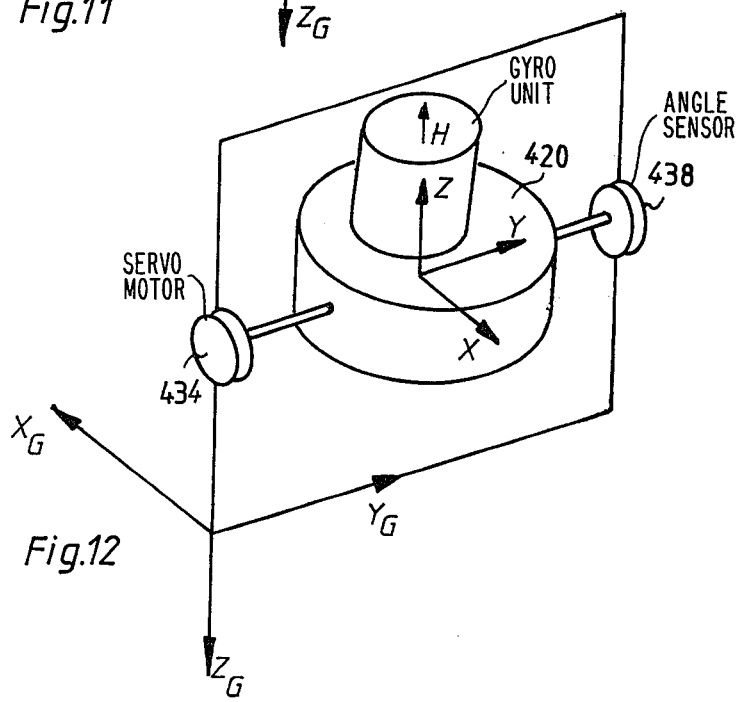
FIG. 12 illustrates the gyro housing in a second position angularly offset relative to the orientation of FIG. 11 by 180° about a substantially horizontal axis for the determination of the north direction with compensation of certain systematic measuring errors.

The signals supplied to the torquers are, at the same time, applied to a signal processing unit 426. The gyro unit 420 is mounted in an intermediate housing 428 for rotation about the input axis $y^F$ parallel to the transverse axis of the vehicle. Accelerometers 42 and 44 are affixed to the vehicle, the input axis of the accelerometer 42 being parallel to the longitudinal axis $x^F$ of the vehicle, and the input axis of the accelerometer 44 being parallel to the transverse axis $y^F$ of the vehicle. The gyro unit is arranged to be rotated by a servomotor 434. The servomotor 434 is controlled by servo-electronics 436. The movement of the servomotor 434 is monitored by an angle sensor 438. The servo-electronics 436 control the servomotor, depending on the position of a switch 440 such that it is moved into 0°-, 90°- or 180°-positions. The 0°-position is illustrated in FIGS. 5 and 11. The 180°-position is shown in FIG. 12. In its 90°-position illustrated in FIG. 6, the instrument will operate as heading-attitude reference unit.

The intermediate housing, in turn, is mounted by means of a shaft 442 for rotation about a vertical axis relative to a vehicle-fixed instrument housing 444, said axis coinciding with the gyro spin axis in the initial position illustrated in FIG. 5. An angle pick-off 446 and a servomotor 448 are located on the shaft 442. The angle pick-off 446 provides a signal depending on the angular position of the intermediate housing 428 relative to the vehicle-fixed instrument housing 444. This signal is connected to a follow-up control system 452 through a change-over switch 450. The servomotor 448 is controlled by the follow-up control system 452 such that it rotates the intermediate housing either into the initial position illustrated or into a position angularly offset with respect thereto by 180° about the vertical axis, depending on the position of the change-over switch 450. In this latter position, the orientation of the gyro unit is identical to that shown in FIG. 14.

Figure 7:
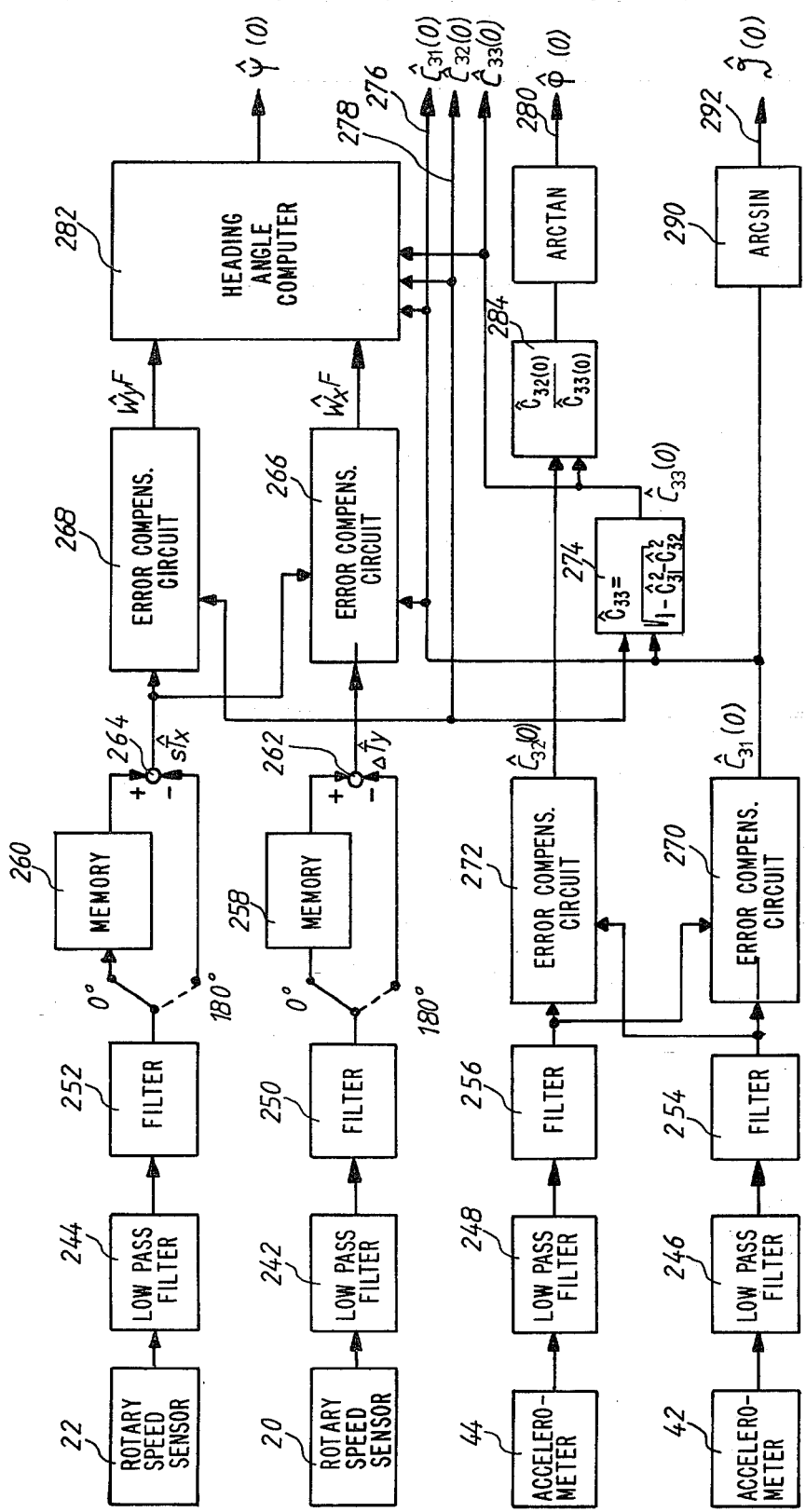
FIG. 7 is a block diagram of the signal processing during the finding of the north direction, when the gyro unit is in the position illustrated in FIG. 5.

The signal processing is illustrated as block diagram in FIG. 7.

The gyro is represented by two sensors 20,22 for the rotary speeds $w_x$ and $w_y$, respectively, about the two input axes. Furthermore the two accelerometers 42 and 44 are illustrated. The signals from the sensors 20,22 and accelerometers 42,44 are smoothed by one low-pass filter each 242,244,246 and 248, respectively. The signals thus smoothed are applied to one filter each 250,252,254 and 256, respectively. The filters serve to suppress noise and interfering signals and, at the same time, are used for the analog-to-digital conversion. The filters have identical structures and will be described in greater detail hereinbelow with reference to FIGS. 8 to 10.

The measurement with the gyro unit 220 is made once in the 0°-position illustrated in FIGS. 5 and 11, and once in the 180°-position indicated in FIG. 12. The signals obtained in the 0°-position are stored in memories 258,260. After the gyro unit 220 has been rotated into the 180°-position, the stored signals are combined with the signals then obtained. The difference $\Delta T_y$ of the signal stored in memory 258 and of the signal obtained from sensor 20 in the 180°-position is formed at a summing point 262. The sum $\Sigma T_x$ of the signal stored in memory 260 and of the signal obtained from sensor 22 in the 180°-position is formed at a summing point 264.

An azimuth or heading angle computer 282 receives the output signals $w_x{}^F$ and $w_y{}^F$ of the error compensation circuits 266 and 268, as well as the signals $C_{31}(O)$, $C_{32}(O)$ and $C_{33}(O)$ and provides therefrom a signal $\hat{\varphi}(O)$, which represents an estimated value of the true heading angle or the north deviation.

Furthermore the ratio $$\frac{\hat{C}_{32}(O)}{\hat{C}_{33}(O)}$$

is formed, as illustrated by block 284, to provide therefrom the roll angle $\hat{\varphi}(O)$ at an output 288 by means of an inverse tangent function generator 289.

Eventually the signal $C_{31}(O)$ is applied to an inverse sine function generator 290 which provides an estimated value $\hat{\vartheta}(O)$ of the pitch angle at its output 292.

The signal processing unit described operates as follows:

The following relations are true for the x-and y-components of the accelerations in a vehicle-fixed coordinate system:

$$A_x{}^F = {}_{31} g + \dot{v}_x{}^F + W_x \quad (14)$$

$$A_y{}^F = C_{32} g + \dot{v}_y{}^F + W_y, \quad (15)$$

i.e. the accelerations are composed of the component resulting from the acceleration due to gravity, of vibrations $\dot{v}_x{}^F$, $\dot{v}_y{}^F$ of the vehicle and of white noise $W_x, W_y$. With stationary vehicle the anticipation values of $C_{31}$ and $C_{32}$ can be assumed to be constant and the anticipation values of $\dot{v}_x{}^F$ and $\dot{v}_y{}^F$ can be assumed to be zero.

The output signals of non-ideal accelerometers are $$\frac{U_x}{SF_x} = (1 + DK_x) A_x{}^F + \epsilon_{xz} A_y{}^F - \epsilon_{xy} A_z{}^F + b_x + KQ_x A_x{}^{F2} \quad (16)$$

$$\frac{U_y}{SF_y} = (1 + DK_y) A_y{}^F + \epsilon_{yx} A_z{}^F - \epsilon_{yz} A_y{}^F + b_y + KQ_y A_y{}^{F2} \quad (17)$$

wherein
$SF_x, SF_y$ are the scale factors,
$DK_x, DK_y$ are the relative scale factors,
$b_x, b_y$ are the zero deviations of the accelerometers,
$KQ_x, KQ_y$ are the square error components,
$\epsilon_{ij}$ is the misalignment of the axes defined as rotation of the i-input axis of the accelerometer about the j-axis.

The output signals of the accelerometers 42,44 are filtered by the low-pass filters 246,248, in order to eliminate the vibration and noise components. Subsequently the errors are compensated by filters 254,256 in accordance with the error model given in equations (16) and (17), as will be described hereinbelow. When the misalignment angles $\epsilon_{ij}$ cannot be made small enough, $A_z$ is required for the compensation. The time average with stationary vehicle is $$A_z^2 = + \sqrt{g^2 - A_x^{F2} - A_y^{F2}} \quad (18)$$

After the filtering and the error compensation the following quantities are known:

$$\hat{C}_{31}(O) = - \frac{A_x^F}{g} \quad (19)$$

$$\hat{C}_{32}(O) = - \frac{A_y^F}{g} \quad (20)$$

$$\hat{C}_{33}(O) = \sqrt{1 - \hat{C}_{31}^2 - \hat{C}_{32}^2} \quad (21)$$

This provides the attitude angles $$\hat{\vartheta}(O) = - \arcsin \hat{C}_{31}(O) \quad (22)$$

$$\hat{\varphi}(O) = - \arctan \frac{\hat{C}_{32}(O)}{\hat{C}_{33}(O)} \quad (23)$$

With stationary vehicle, the rotary speed measured in a vehicle-fixed coordinate system has, in addition to the component resulting from the rotation of the earth, also vibration and noise components:

$$w^F = C_R^F \begin{bmatrix} \Omega_c \\ 0 \\ -\Omega_s \end{bmatrix} + W_H + W, \quad (24)$$

wherein $\Omega_c = \Omega_E \cos \Phi$ $\Omega_s = \Omega_E \sin \Phi$ and $\Phi =$ is geographic latitude.

The time average of the two disturbing components is zero. It is $$C_R^F \begin{bmatrix} \Omega_c \\ 0 \\ -\Omega_s \end{bmatrix} = \begin{bmatrix} C_{11}\Omega_c - C_{31}\Omega_s \\ C_{12}\Omega_c - C_{32}\Omega_s \\ C_{13}\Omega_c - C_{33}\Omega_s \end{bmatrix} \quad (25)$$

The following error model may be laid down for the gyro, i.e. the sensors 20 and 22.

$$-\frac{M_y}{H} = (1 + DSF_x) \cdot \left[ w_x^F + \alpha_{xz}w_y^F - \alpha_{xy}w_z^F - mA_x^F - \right.$$

$$\left. qA_y^F + nA_y^F A_y^F - \frac{C-A}{H} w_z^F w_y^F + d_y \right] \cdot \quad (26)$$

$$+\frac{M_x}{H} = (1 + DSF_y) \cdot \left[ w_y^F + \alpha_{yx}w_z^F - \alpha_{yz}w_x^F - mA_y^F + \right. \quad (27)$$

-continued $$\left. qA_x^F + nA_y^F A_z^F - \frac{C-A}{H} w_z^F w_y^F + d_y \right],$$

wherein $\alpha_{ij}$ is the misalignment of the input axes represented by a rotation of the i-axis about the j-axis.

m is the mass unbalance of the gyro, q is a square term n is the anisoelasticity, $x_y$ are zero deviations DSF is the relative scale factor error, H is the gyro spin C−A/H is the mass anisotropy and $M_i$ are the torques to be exerted by the torquers.

Measurements with the gyro are made in two positions. Due to the different orientations of the gyro axes, some of the error terms will appear with opposite signs.

In the normal position of FIGS. 5 and 11, the gyro axes are parallel to the vehicle axes $x^F, y^F, z^F$. The gyro signals, i.e. the output signals at the torquers $$-T_y^{(1)} = -\frac{M_y^{(1)}}{H} \quad (28)$$

$$T_x^{(1)} = \frac{M_x^{(1)}}{H} \quad (29)$$

will then result from equations (26) and (27).

In the 180°-position of the gyro unit 220 the y-input axis of the gyro remains parallel to the $y^F$-axis, but the spin axis z of the gyro and the x-input axis become anti-parallel to the axes $x^F$ and $z^F$, respectively. This results in the following output signals at the torquers $$-T_y^{(2)} = -\frac{M_y^{(2)}}{H} = \quad (30)$$

$$(1 + DSF_x)\left[ -w_x^F + \alpha_{xz}w_y^F + \alpha_{xy}w_z^F + \right.$$

$$\left. mA_x^F - qA_y^F + nA_x^F A_z^F + \frac{C-A}{H} w_z^F w_x^F + d_x \right]$$

$$T_x^{(2)} = \frac{M_x^{(2)}}{H} = \quad (31)$$

$$(1 + DSF_y)\left[ w_y^F - \alpha_{yz}w_z^F + \alpha_{yz}w_x^F - \right.$$

$$\left. mA_y^F - qA_x^F - nA_y^F A_z^F - \frac{C-A}{H} w_z^F w_y^F + d_y \right]$$

The difference becomes:

$$\Delta T_y = T_y^{(1)} - T_y^{(2)} = \quad (32)$$

$$(1 - DSF_x)[-2w_x^F + 2\alpha_{xy}w_z^F + 2mA_x^F],$$

The sum is $$\Sigma T_x = T_x^{(1)} + T_x^{(2)} = \quad (33)$$

$$(1 + DSF_y)[2w_y^F - 2mA_y^F + 2d_y].$$

With the signal processing described, the sum and the difference are formed at the summing points 262,264 after the filtering of the gyro output signals by the filters 250,252.

Thus the following is valid:

$$\hat{\Delta T_y} = (1 - DSF_x)[-2\hat{w}_x^F + 2a_{xy}\hat{w}_z^F + 2m\hat{A}_x^F] \quad (34)$$

and $$\hat{\Sigma T_x} = (1 + DSF_y)[2\hat{w}_y^F - 2m\hat{A}_y^F + 2d_y], \quad (35)$$

wherein the symbol "$\wedge$" always symbolizes an estimated value.

$W_z^F$ can be computed from the uncompensated expressions $\hat{\epsilon T_x}$ and $\hat{\Delta T_y}$ $$w_z^F = \sqrt{\Omega_E^2 - w_x^{F2} w_y^{F2}} \quad (36)$$

and, in accordance with equations (34) and (35):

$$w_x^F \approx \sqrt{\Omega_E^2 - \left(\frac{\Sigma T_x}{2}\right)^2 - \left(\frac{\Delta T_y}{2}\right)^2}. \quad (37)$$

This yields $$\hat{w}_x^F = \frac{-\hat{\Delta T_y}}{2(1+DSF_x)} - a_{xy} w_z^F - m A_x^F \quad (38)$$

$$\hat{w}_y^F = \frac{\hat{\Sigma T_x}}{2(1+DSG_y)} - m A_y^F + d_y, \quad (39)$$

wherein $A_x^F$ and $A_y^F$ are known. At the same time the following is valid:

$$\hat{w}_x^F = \hat{C}_{11}\Omega_c - \hat{C}_{31}\Omega_s \quad (40)$$

$$\hat{w}_y^F = \hat{C}_{12}\Omega_c - \hat{C}_{32}\Omega_s \quad (41)$$

Therein $C_{31}$ and $C_{32}$ are known from the acceleration measurement in accordance with equations (19) and (20).

The directional cosine matrix yields:

$$C_{11} = \cos\vartheta \cos\psi \quad (42)$$

$$C_{12} = \sin\varphi \sin\vartheta \cos\psi - \sin\psi \cos\varphi \quad (43)$$

After some transformations follows from equations (38) and (39) for the north deviation angle $$\cos\psi(O) = \frac{1}{\sqrt{1-C_{31}^2}}\left[C_{31}\sin\Phi + \frac{w_x^F}{\Omega_E \cos\Phi}\right] \quad (44)$$

$$\sin\psi(O) = \frac{1}{\sqrt{1-C_{31}^2-C_{32}^2}}\left[\sqrt{1-C_{31}^2}\left\{\frac{w_y^F}{\Omega_E \cos\Phi} + C_{32}\tan\Phi\right\} + C_{31}C_{32}\cos\psi\right]. \quad (45)$$

The north deviation angle $\psi(O)$ can be derived from equations (44) and (45) through the respective inverse functions. The quadrants are fixed in accordance with the following criteria:

$$\sin\psi \geq \tfrac{1}{2}\sqrt{2} \longrightarrow \psi = \arccos x_c. \quad (46)$$

$$\sin\psi \leq -\tfrac{1}{2}\sqrt{2} \longrightarrow \psi = 2\pi - \arccos x_c \quad (47)$$

$$\cos\psi > +\tfrac{1}{2}\sqrt{2} \longrightarrow \psi = \arcsin x_s \quad (48)$$

$$\cos\psi < -\tfrac{1}{2}\sqrt{2} \longrightarrow \psi = \pi - \arcsin x_s, \quad (49)$$

wherein $x_c$ is the expression on the right side of equation (44) and $c_s$ is the expression on the right side of equation (45).

In the circuit of FIG. 7 the error compensation circuits 266 and 268 cause error compensation of the signals $\Delta T_y$ and $\Sigma T_x$ in accordance with equations (40) and (41). The signals $w_x^F$ and $w_y^F$ thus obtained are applied to the heading angle computer 282. The error compensation circuits 270,272 cause error compensation of the signals from filters 254,256 in accordance with equation (16) and (17). The heading angle computer 282 computes $\hat{\psi}$ in accordance with equations (33) and (34).

The filters 250 and 256 have identical structures. They serve, at the same time, the purpose of analog-to-digital conversion. A conventional analog-to-digital converter comprises a reset integrator. The analog input signal is integrated with respect to time, until the integral has reached a predetermined value. Then an output pulse is generated and the integrator is reset to zero. The pulses thus obtained are counted by a counter during a predetermined time. The counter then contains a digital signal proportional to the analog input signal.

Figure 8:
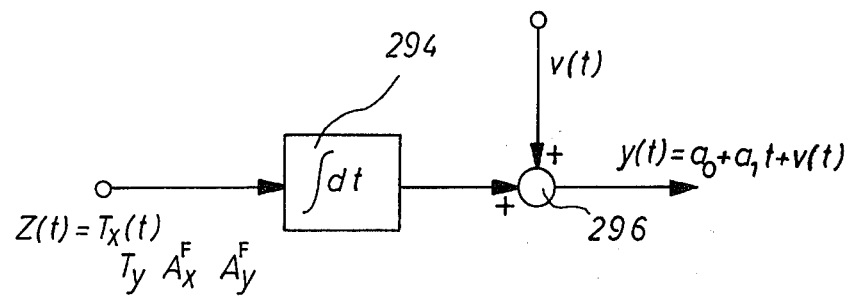
FIG. 8 illustrates the signal model, on which the filters for the sensor signals are based.
Figure 9:
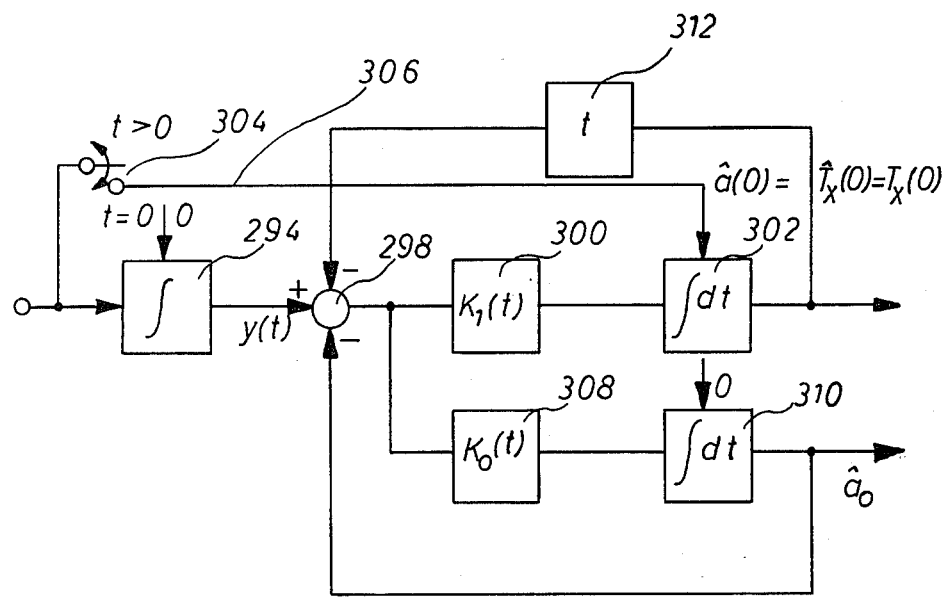
FIG. 9 illustrates the filter structure.

The signal model herefor is illustrated in FIG. 8. The input signal z(t) may be $T_x(t)$, $T_y(t)$, $A_x^F(t)$ or $A_y^F(t)$. This signal is integrated with respect to time by the integrator 294. The measurement noise v(t) is superimposed to the output signal of the integrator, as shown by the summing point 296. Thus a signal $$y(t) = a_0 + a_1 t + v(t) \quad (50)$$

is obtained. The interesting quantity therein is $a_1$. With the filter 250, 252, 254 or 256 an estimated value $\hat{a}_1$ of this quantity is derived from signal y(t), said estimated value representing, at the same time, an estimated value of the input quantity, for example $A_x^F$.

The filter 250, 252, 254 or 256 has the following structure:

Each filter comprises a first integrator, which corresponds to the integrator 294 of FIG. 8 and which provides a signal in accordance with equation (50). The output signal of the integrator 294 with the measuring noise is applied to a summing point 298. The signal formed at the summing point is, on one hand, multiplied by a factor $K_1(t)$, as represented by block 300, and applied to a second integrator 302, which is reset to the instantaneous value of the sensor signal z(0) at the beginning of each cycle, as has been indicated schematically in FIG. 9 by switch 304 and conductor 306. The signal formed at the summing point 298 is, on the other hand, multiplied by a factor $K_o(t)$, as represented by block 308, applied to a third integrator 310. The output signal from the second integrator 302 is multiplied by time t, as represented by block 312, and fed back with reversed sign to the summing point 298. The output signal of the third integrator 310 is also fed back to the summing point 298 with reversed sign. The third integrator is reset to zero at the beginning of each cycle.

If the signal at the output of integrator 302 deviates from $a_1$, and the signal at the output of the integrator 310 deviates from $a_o$, a difference signal will appear at the summing point 298. This difference signal causes correction of these output signals through the integrators, until the difference signal becomes zero. At the output of the integrator 302, a signal will be controlled which represents the input value $z(t)$, thus either $T_x, T_y, A_x^F$ or $A_y^F$.

The parameter $a_o$ permits taking into account of d.c. components which result from the integration of harmonic interfering components.

Figure 10:
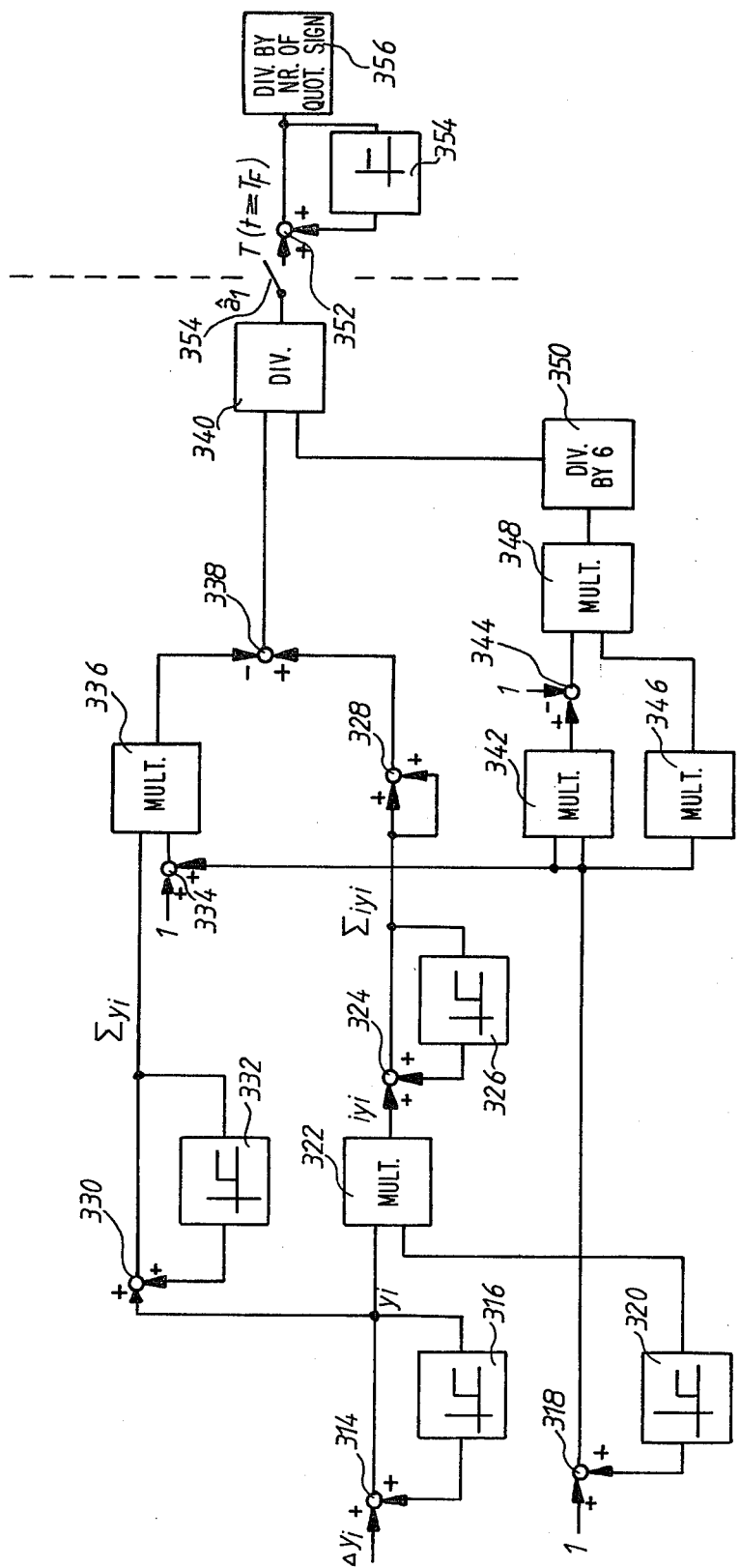
FIG. 10 is a block diagram of a particularly advantageous realization of the filter.

A realization of the filter, which is particularly suitable for the time-discreet implementation with minimum expenditure, is illustrated in FIG. 10. The embodiment of FIG. 10 is based on the same signal model of FIG. 8 as the embodiment of FIG. 9, i.e. the signal model in accordance with equation (50).

When the quantity y is detected at the moments T, 2T, ... nT, this signal model presents the relation:

$$\begin{bmatrix} y(T) \\ y(2T) \\ \cdot \\ \cdot \\ \cdot \\ y(nT) \end{bmatrix} = \begin{bmatrix} 1 & T \\ 1 & 2T \\ \cdot & \cdot \\ \cdot & \cdot \\ \cdot & \cdot \\ 1 & nT \end{bmatrix} \begin{bmatrix} a_o \\ a_1 \end{bmatrix} + \begin{bmatrix} v(T) \\ v(2T) \\ \cdot \\ \cdot \\ \cdot \\ v(nT) \end{bmatrix} \quad (51)$$

or, if written with vectors and a matrix $$z = Mx + f \quad (52)$$

An optimum estimated value of x is $$\hat{x} = \begin{bmatrix} \hat{a}_o \\ \hat{a}_1 \end{bmatrix} = [M^T M]^{-1} M^T \cdot z \quad (53)$$

If the matrix M is substituted in equation (53), the following summing formula is obtained for $a_1$ $$\hat{a}_1(nT) = \frac{12 \sum_1^n i \cdot y(iT) - 6(n+1) \sum_1^n y(iT)}{nT(n^2-1)}, \quad (54)$$

wherein

T is the detection interval $y(iT)$ is the measured quantity at the moment iT and will be designated $y_i$ hereinbelow.

This equation (54), reduced by 6, is realized in the filter of FIG. 10.

The first integrator is an analog reset integrator, to which the sensor signal is applied and which provides an increment pulse, after a predetermined level of the output signal has been reached, and is then reset to zero. The number of the increment pulses generated during a detection interval T is designated $\Delta y_i$. The increment pulse number $\Delta y_i$ is added in a first adder 314 to the sum $y_i$ of the preceding increment pulse numbers, which has been delayed by one clock interval through a delay loop 316. Each clock pulse is added in a second adder 318 to the sum $(i-1)$ of the preceding clock pulses, which have been delayed by one clock interval through a delay loop 320. The sum $y_i$ of the increment pulse numbers is multiplied in a first multiplier 322 with the sum i of the clock pulses, whereby a signal $iy_i$ is provided. The signal $iy_i$ thus formed is added in a third adder 324 to the sum $\Sigma iy_i$ of the preceding signals $iy_i$, which has been delayed by one clock interval through a delay loop 326. The signal $\Sigma iy_i$ thus obtained is added to itself in a fourth adder, whereby a signal $2\Sigma iy_i$ is provided.

The signal $y_i$ representing the sum of the increment pulse numbers is added in a fifth adder 330 to the sum $\Sigma y_i$ of the preceding signals, which has been delayed by one clock interval through a delay loop 332. The sum n of the clock pulses is increased by one in a sixth adder 334. The signals $\Sigma y_i$ and $(n+1)$ are multiplied in a second multiplier 336, whereby a signal $(n+1)\Sigma y_i$ is provided.

The signal $(n+1)\Sigma y_i$ is subtracted from the signal $2\Sigma iy_i$ in a seventh adder 338. The signal thus obtained is applied as numerator signal to a divider 340.

The signal representing the sum n of the clock pulses is multiplied by itself in a third multiplier 342. The signal $n^2$ thus obtained is reduced by one in an eighth adder 344, whereby a signal $(n^2-1)$ is provided. The signal representing the sum n of the clock pulses is multiplied by the detection interval T, as indicated by block 346, whereby a signal nT is provided. The signal $(n^2-1)$ is multiplied by a signal nT in a fourth multiplier 348. The signal thus obtained is divided by 6, as indicated by block 350. The signal $(1/6(n^2-1)nT$ is applied as denominator signal to the divider 340.

As the anticipation value of the parameter $a_1$ is constant, the average of the values $a_1(nT)$ computed in intervals T is formed for the purpose of further filtering. The average is formed in form $$\hat{a}_1(nT) = \frac{1}{k} \sum_{n-k}^{n} \hat{a}_1(j) \quad (55)$$

with $j = n-k, n-(k-1) \ldots n$.

To this end the signal provided by the divider 340 is applied to a nineth adder 352 after a predetermined number of clock intervals, as indicated by the switch 354. The applied quotient signal is added in the nineth adder to the sum of the preceding quotient signals, which have been delayed by one clock interval through a delay loop. The sum thus obtained is divided by the number of the applied quotient signals, as indicated by block 356.

Figure 14:
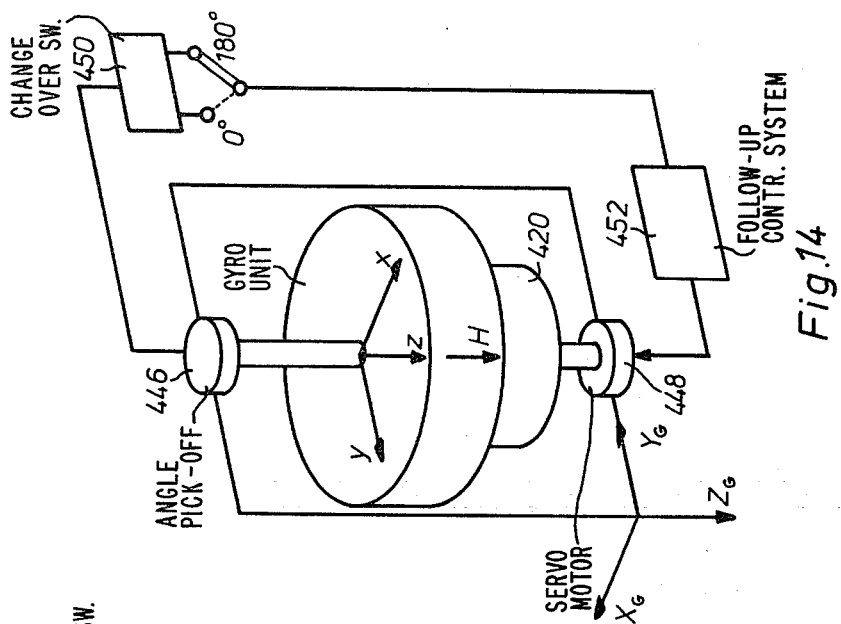
FIG. 14 illustrates the gyro unit after its rotation through 180° about the substantially vertical axis, also for the purpose of compensating systematical errors.

As has already been described in connection with FIG. 5, the intermediate housing 438 can also be rotated with shaft 442 through 180° about a vertical axis. Then the gyro unit is in a respective one of the two positions illustrated schematically in FIG. 13 and FIG. 14. In the "initial position" illustrated in FIG. 13, the first input axis x of the gyro extends to the rear of the Figure, and the second input axis y extends to the right. The other position of the gyro unit 420, which is reached after a 180°-rotation about the axis z is illustrated in FIG. 14. In this position the first input axis x of the gyro points to the front of the figure, and the second input axis points to the left. As mentioned above, the gyro unit 420 contains a gyro assembly of the type shown in FIG. 4.

Figure 13:
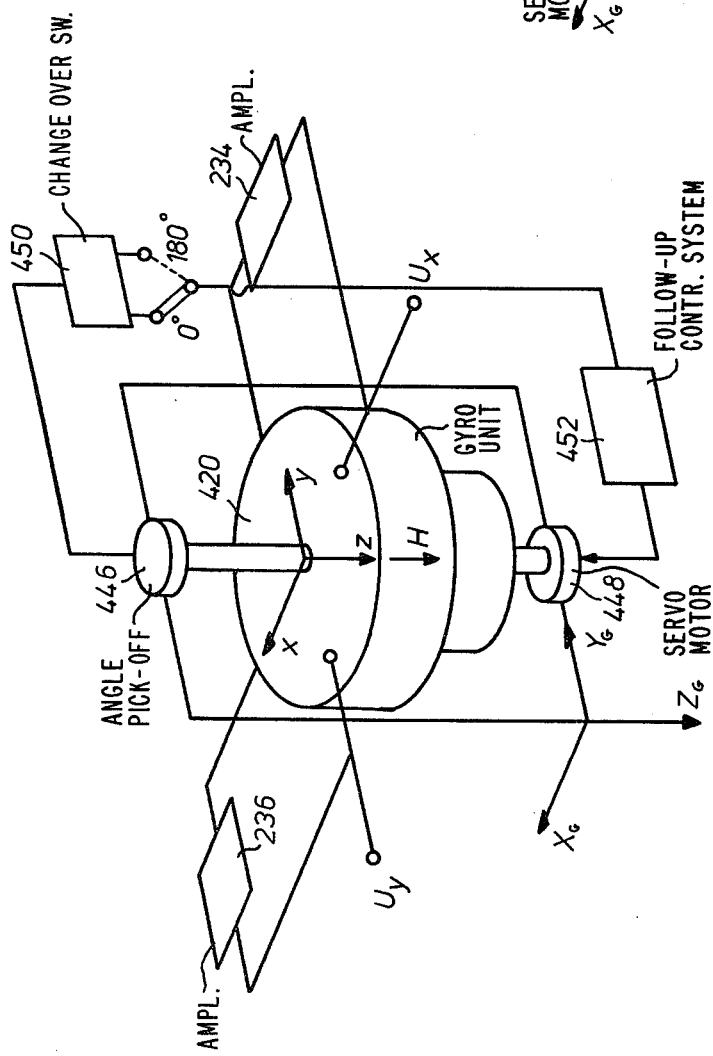
FIG. 13 illustrates the orientation of the gyro unit and of the associated gyro unit-fixed coordinates prior to its rotation about a substantially vertical axis.

The erecting torques which are exerted on the gyro by the torquer acting about the x-axis due to the signals from the pick-off on the y-axis in the initial position of FIG. 13 are designated $M_x^{(1)}$. The erecting torques, which are exerted on the gyro by the torquer acting about the y-axis due to the signals from the pick-off on the x-axis in the initial position of FIG. 13 are designated $M_y^{(1)}$. In the position angularly offset by 180° with respect to this initial position, the corresponding erecting torques are $M_x^{(3)}$ and $M_y^{(3)}$, respectively. The pick-offs and torquers provide signals $$T_x^{(1)} = \frac{M_x^{(1)}}{H}, \; T_y^{(1)} = \frac{M_y^{(1)}}{H}, \; T_x^{(3)} = \frac{M_x^{(3)}}{H} \text{ and } T_y^{(3)} = \frac{M_y^{(3)}}{H}$$

The signals $T_x^{(1)}$ and $T_y^{(1)}$ result from equations (26) and (27). The signals obtained after the 180° rotation are $$T_x^{(3)} = -\Omega_y + \alpha_{yx}\Omega_z + \alpha_{yz}\Omega_x + ma_y - qa_x - na_ya_z - \frac{C-A}{H}\Omega_z\Omega_y + B_y. \quad (56)$$

$$-T_y^{(3)} = -\Omega_x - \alpha_{xz}\Omega_y - \alpha_{xy}\Omega_z + ma_x + qa_y - na_xa_z - \frac{C-A}{H}\Omega_z\Omega_x + B_x \quad (57)$$

The differences of the signals with the initial position of FIG. 13 and the position of FIG. 14 angularly offset by 180° become $$DT_x = T_x^{(1)} - T_x^{(3)} = 2\left(\Omega_y - \alpha_{yz}\cdot\Omega_x - ma_y + qa_x + na_ya_z + \frac{C-A}{H}\Omega_z\Omega_y\right) \quad (58)$$

$$DT_y = T_y^{(3)} - T_y^{(1)} = -2\left(\Omega_x + \alpha_{xz}\Omega_y + ma_x - qa_y + na_xa_z + \frac{C-A}{H}\Omega_z\Omega_x\right). \quad (59)$$

It will be noticed that the uncompensated gyro drifts $B_x$ and $B_y$ are not contained in these signals. With many gyros, however, these uncompensated gyro drifts are the major sources of error, which count more than all the other source of error together. With each gyros the rotation of FIGS. 13 and 14 is to be preferred to the arrangement of FIGS. 11 and 12, for which equations (32) and (33) are valid.

The signals may be processed in an appropriate memory and computer circuit in accordance with equations (58) and (59).

Figure 15:
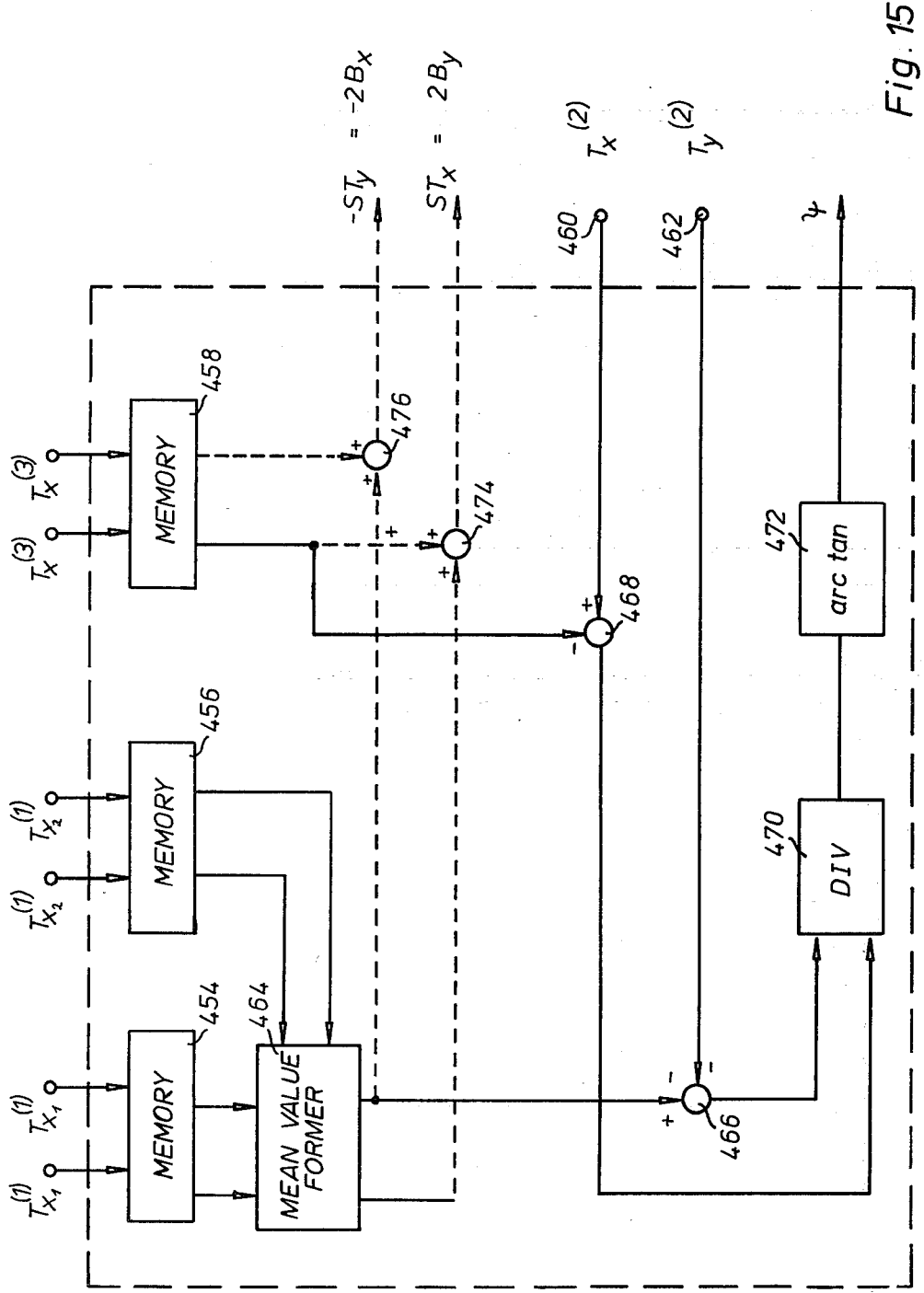
FIG. 15 illustrates the signal processing means for the arrangement of FIG. 5.

With the arrangement of FIG. 5, however, both kinds of rotation can be used for the error compensation. The computer in FIG. 15 comprises a first memory 454, a second memory 456 and a third memory 458. In the initial position of FIGS. 5 and 11, at first the signals $T_{x1}^{(1)}$ and $T_{y1}^{(1)}$ of the torquers are stored in the first memory 454 said signals resulting from equations (26) and (27). (The lower index "1" indicates the first measurement of these signals). Thereafter the intermediate housing 428 is rotated through 180° about the vertical axis by means of the servomotor 448. The signals $T_x^{(3)}$ and $T_y^{(3)}$ then obtained from the torquers are stored in the memory 458. The intermediate housing 428 is rotated back into its initial position. The signals $T_{x2}^{(1)}$ and $T_{y2}^{(1)}$ of the torquers are again picked off in this initial position and are stored in the memory 456. Thereafter the gyro unit 420 is rotated through 180° about the horizontal axis by the servomotor 434. The signals $T_x^{(2)}$ and $T_y^{(2)}$ obtained from the torquers and corresponding to equations (30) and (31) are also supplied to the computer, as indicated at 460,462.

A mean value former 464 forms the mean values from the signals stored in the memories 454 and 456

$$\overline{T}_x^{(1)} = \tfrac{1}{2}(T_{x1}^{(1)} + T_{x2}^{(1)}) \text{ and} \quad (60)$$

$$\overline{T}_y^{(1)} = \tfrac{1}{2}(T_{y1}^{(1)} + T_{y2}^{(1)}) \quad (61)$$

The difference $$\Delta T_y = \overline{T}_y^{(1)} - T_y^{(2)} \quad (62)$$

is formed at a summing point 466 (see also equation (32)).
The formation of the difference $$\Sigma T_{xc} = T_x^{(2)} - T_x^{(3)} = 2\,(\Omega_y - m\cdot a_y - \alpha_{yx}\cdot\Omega_z) \quad (63)$$

is effected at a further summing point 468. The two difference signals $\Delta T_y$ and $\Sigma T_{xc}$ are supplied to dividing means 470, which form the quotient $$\frac{\Sigma T_{xc}}{-\Delta T_y}.$$

This quotient is applied to an inverse tangent function generator 472, which forms the north deviation signal $$\psi = \arctan\frac{\Sigma T_{xc}}{-\Delta T_y} \quad (64)$$

For self-testing purpose the sum $$ST_x = \overline{T}_x^{(1)} + T_x^{(3)} \quad (65)$$

may be formed at a summing point 474 and the sum $$ST_y = -(\overline{T}_y^{(1)} + T_y^{(3)}) \quad (66)$$

may be formed at a summing point 476, which, as can be shown, are substantially proportional to the gyro drifts.

The operation of this arrangement is as follows: From equations (16) and (56) follows:

$$ST_x = T_x^{(1)} + T_x^{(3)} = 2\,(\alpha_{yx}\Omega_z + B_y) \quad (67)$$

and $$ST_y = -T_y^{(1)} - T_y^{(2)} = 2\,(-\alpha_{xy}\Omega_z + B_x). \quad (68)$$

With negligible deviations $\alpha_{yx}$ and $\alpha_{xy}$, respectively, of the gyro input axes relative to the housing axes, which can be achieved by appropriate precision of manufacture, the following is valid with good approximation:

$$2\hat{B}_y = ST_x \quad (69)$$

$$2\hat{B}_x = ST_y, \quad (70)$$

wherein $\hat{B}_x$ and $\hat{B}_y$ are estimated values for $B_x$ and $B_y$. Therefore the expression $\Sigma T_x$ from equation (33), which enters the equation for the north deviation, can be corrected for the gyro drift $B_y$, after $ST_x$ has been determined. The expression $\Sigma T_{xc}$ thus corrected is $$\Sigma T_{xc} = \Sigma T_x - 2\hat{B}_y = \overline{T}_x^{(1)} + T_x^{(2)} - 2\hat{B}_y \quad (71)$$

and, if $2B_y$ from equation (69) is substituted:

$$\Sigma T_{xc} = \overline{T}_x^{(1)} + T_x^{(2)} - \overline{T}_x^{(1)} - T_x^{(3)} = T_x^{(2)} - T_x^{(3)} \quad (72)$$

Equations (30) and (31) then yields:

$$\Sigma T_{xc} = 2\Omega_y - 2ma_y - 2a_{yx}\cdot\Omega_z \tag{73}$$

Furthermore, as has already been stated above, the following is true $$\Delta T_y = T_y^{(1)} - T_y^{(2)} = -2\Omega_x + 2a_{xy}\Omega_z + 2ma_x$$

independently of $B_x$. With disturbing terms neglected, this yields $$\frac{\Sigma T_{xc}}{-\Delta T_y} = \frac{\Omega_y}{\Omega_x} = \tan\psi,$$

this term being compensated for the gyro drifts $B_x$ and $B_y$.

The change-over and the application of the signals to the various memories and inputs are controlled in the correct sequence by a program control unit (not shown).

Thus the arrangement of FIG. 7 provides the initial values of the elements of the directional cosine matrix or attitude parameters prior to starting on the mission. The gyro unit is then rotated from the position "northing" of FIGS. 4 and 5 into the position "heading-attitude reference". Then the computer unit continuously provides the current attitude parameters.

Figure 16:
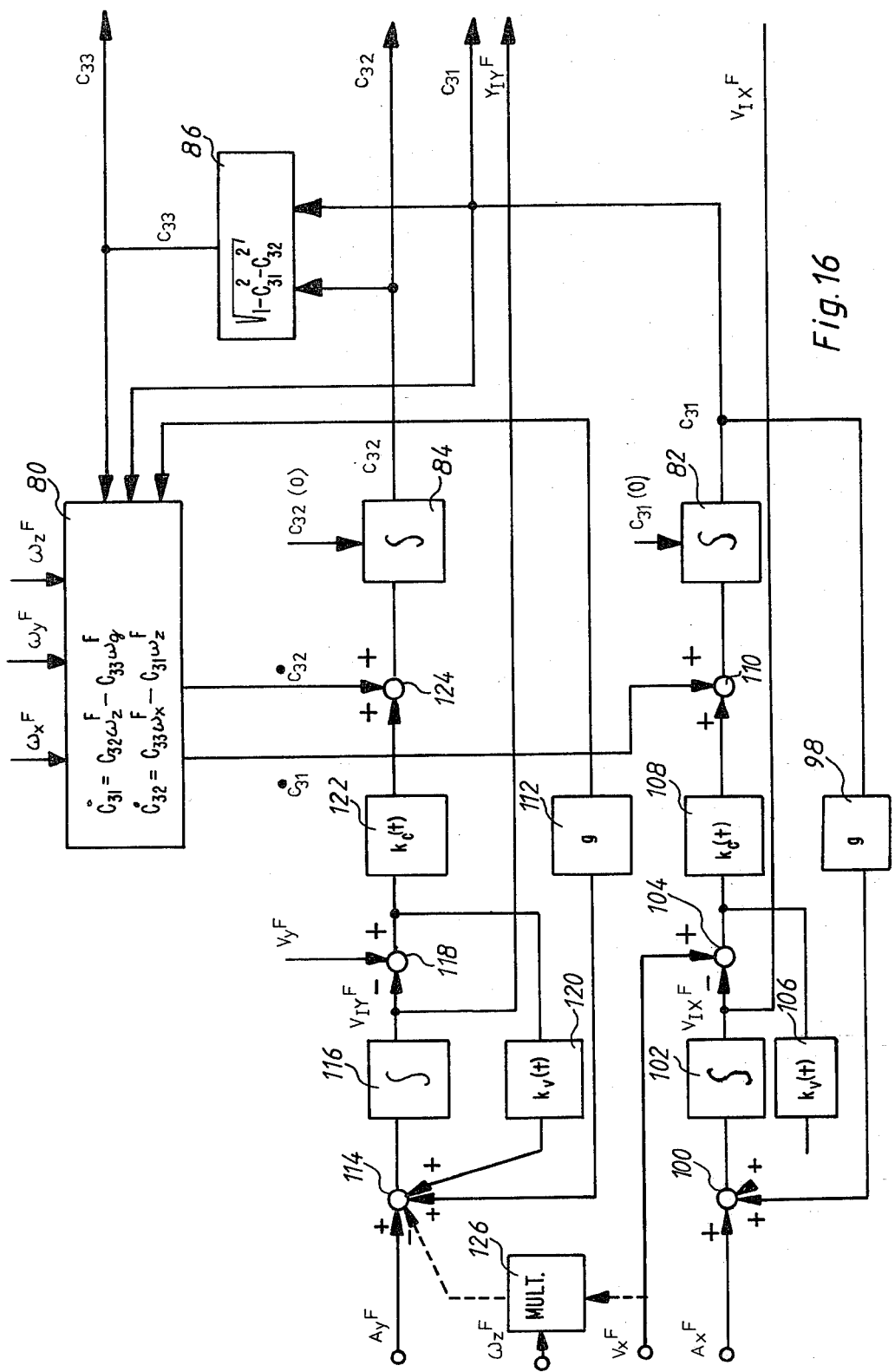
FIG. 16 illustrates the set-up of the computer for the continuous computation of the transformation parameters during the mode of operation "heading-attitude reference" of the gyro unit of FIG. 6.

This computer unit 68 is illustrated in detail in FIG. 16.

As illustrated by block 80, the computer unit 68 provides signals $$\dot{C}_{31} = C_{32}\omega_z{}^F - C_{33}\omega_y{}^F \tag{74}$$

$$\dot{C}_{32} = C_{33}\omega_x{}^F - C_{31}\omega_z{}^F \tag{75}$$

from the elements of the last line of the directional cosine matrix—fed back in the manner to be described hereinbelow—and the rotary speeds $\omega_x{}^F$, $\omega_y{}^F$, $\omega_z{}^F$ from the sensors 20,22,24 and compensated at 60,62,64. The signals $\dot{C}_{31}$ and $\dot{C}_{32}$ thus obtained are integrated with respect to time by integrators 82 and 84, respectively, in order to get the signals $C_{31}$ and $C_{32}$. The initial values $C_{31}(O)$ and $C_{32})$ for the integration are obtained as described above with reference to FIG. 7.

As the matrix $C_F{}^R$ is orthonormal, $$C_{31}^2 + C_{32}^2 + C_{33}^2 = 1 \tag{76}$$

$$C_{33} = +\sqrt{1 - C_{31}^2 - C_{32}^2} \tag{77}$$

i.e. the third element $C_{33}$ results automatically from the two other ones. As illustrated by block 86, a signal representing the element $C_{33}$ is generated in accordance with equation (78) from the output signals of the integrators 82 and 84. Thus the elements $C_{31}$, $C_{32}$ and $C_{33}$ are available for the signal processing in block 80 in accordance with equations (74) and (75). The elements $C_{31}$, $C_{32}$ and $C_{33}$ are supplied to the computer units 66,70 and, partly, 72, as illustrated in FIG. 1.

Figure 17:
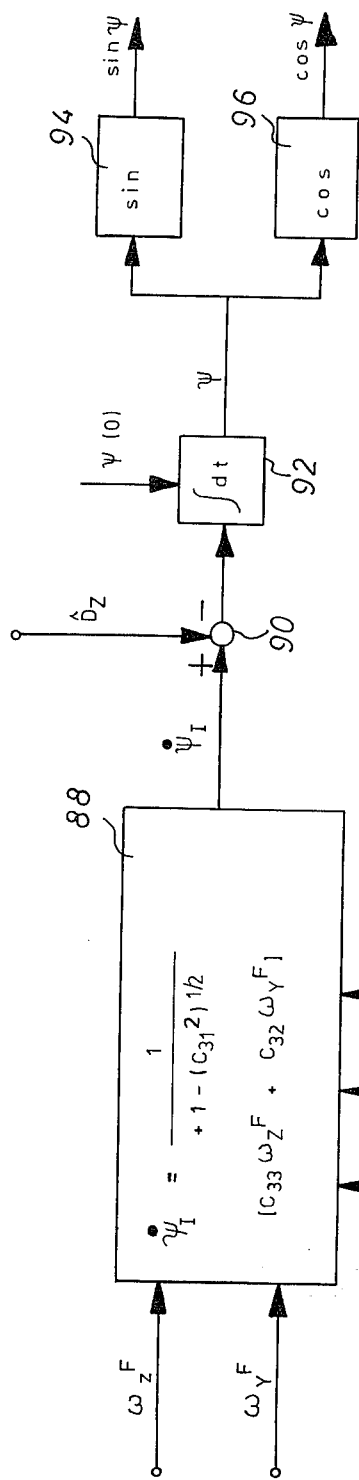
FIG. 17 illustrates the set-up of the computer for generating the heading angle signal.

A signal $$\psi_I = \frac{1}{\sqrt{1 - C_{32}^2}}[C_{33}\omega_z{}^F + C_{32}\omega_y{}^F] \tag{78}$$

is generated in computer unit 70 from the signals $C_{31}$, $C_{32}$ and $C_{33}$ thus obtained and from the rotary speeds $\omega_y{}^F$, and $\omega_z{}^F$, as indicated by block 88. Computer unit 70 is shown in detail in FIG. 17. This signal is the time derivative of the "inertial" heading angle, as it is derived from the measured angular speeds $\omega_x{}^F$, $\omega_y{}^F$, $\omega_z{}^F$. An estimated value $D_z$ of the heading drift is superposed to this signal $\dot\psi_I$ at a summing point 90, said estimated value being obtained in a manner to be described hereinbelow. The corrected heading angle rate signal is integrated with respect to time by means of an integrator 92 and provides the true heading angle $\psi$ in the earth-fixed coordinate system. The heading angle $\psi$ is applied to a sine function generator 94 and a cosine function generator 96 to provide signals $\sin\psi$ and $\cos\psi$, which are supplied to the computer units 66 and 72, as illustrated in FIG. 1.

The elements $C_{31}$, $C_{32}$, $C_{33}$ of the directional cosine matrix as obtained solely from the angular speeds $\omega_x{}^F$, $\omega_y{}^F$ and $\omega_z{}^F$ are subjected to a drift. Such a drift may result in intolerable errors, unless very high demands on the gyro and on the other components are made. For this reason these values are backed making use of the signals $A_x{}^F$ and $A_y{}^F$ from the accelerometers 42,44 and of the signal $v_x{}^F$ from the speed sensor.

The signal $C_{31}$ from the output of the integrator 82 is multiplied by the acceleration g due to gravity, which is represented by block 98, and is superposed at a summing point 100 to the signal $A_x{}^F$ from the accelerometer 42. A further signal is applied to the summing point 100, as will be described hereinbelow. The signal $A_x{}^F$ of the accelerometer 42 and the superposed signals at the summing point 100 are integrated with respect to time by an integrator 102. Thus an inertial speed signal $v_{Ix}{}^F$, i.e. a speed signal which is derived from the acceleration signal $A_x$ taking the component of the acceleration due to gravity into account, is provided and is supplied to the computer unit 76 (FIG. 1). The speed signal $v_x{}^F$ from the speed sensor 52 is superposed to the inertial speed signal $v_{Ix}{}^F$ with opposite sign at a summing point 104 to provide a difference signal. The difference signal multiplied by a time-dependent factor $K_v(t)$, which is represented by block 106, is said further signal superposed at summing point 100 to the signal $A_x{}^F$ of the accelerometer. Furthermore the difference signal multiplied by a time-dependent factor $K_c(t)$, which is represented by block 108, is superposed at a summing point 110 to the $C_{31}$ signal. The signal formed at the summing point 110 is integrated by the integrator 82.

In similar manner the signal $C_{32}$ from the output of the integrator 84 multiplied by the acceleration g due to gravity, which is represented by block 112, is superposed in the summing point 114 to the signal $A_y{}^F$ from the accelerometer 44. A further signal still to be explained is applied also to the summing point. The signal $A_y{}^F$ of the accelerometer 44 and the superposed signals at the summing point 114 are integrated with respect to time by an integrator 116. Thus also an inertial speed signal $v_{Iy}{}^F$ is obtained, which is supplied, like the signal $v_{Ix}{}^F$, to the computer unit 76. A speed signal $v_y{}^F$ from a transverse speed sensor may be superposed with opposite sign to the inertial speed signal $v_{Iy}{}^F$ at a summing point 118. With a vehicle of the type in question here, it can, however, be assumed that $v_y{}^F=0$. The signal thus obtained multiplied by a time-dependent factor $K_v(t)$, which is represented by block 120, is said further signal superposed to the signal $A_y{}^F$ from the accelerometer 44 at the summing point 114. In addition the signal from the summing point 118 is superposed with a time-dependent factor $k_c(t)$ represented by block 122 to the $C_{32}$-signal at a summing point 124. The signal formed at the summing point 124 is integrated by the integrator 84.

In order to take the centrifugal acceleration into account, an additional signal may be applied to the summing point, which signal is obtained by multiplying the signal $v_x^F$ from the speed sensor 52 by the angular speed $\omega_z^F$ about the vertical axis $z^F$, as has been illustrated by block 126.

Figure 19:
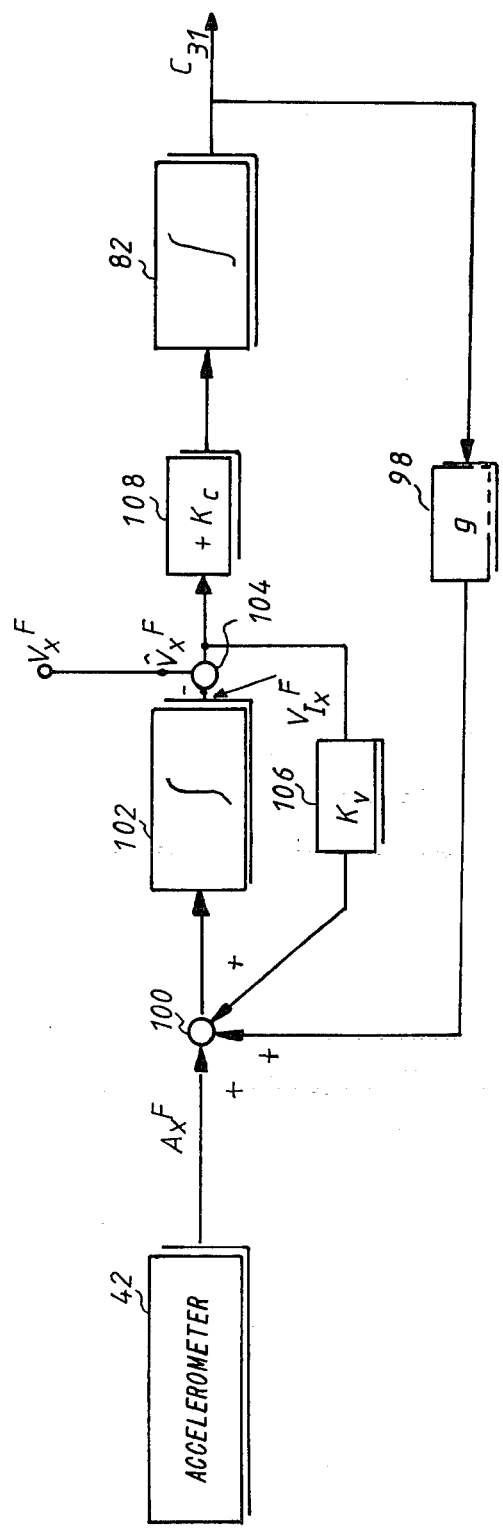
FIG. 19 illustrates the set-up of a filter for deriving a directional cosine from the accelerometer signal and the speed signal for use in the arrangement of FIG. 16.

A filter which provides a signal, which represents the element $C_{31}$ of the directional cosine matrix $C_F^R$, from the accelerometer signal $A_x^F$ of the accelerometer 42 and from the speed signal $v_x^F$ of the speed sensor 52 is illustrated in detail in FIG. 19.

Figure 18:
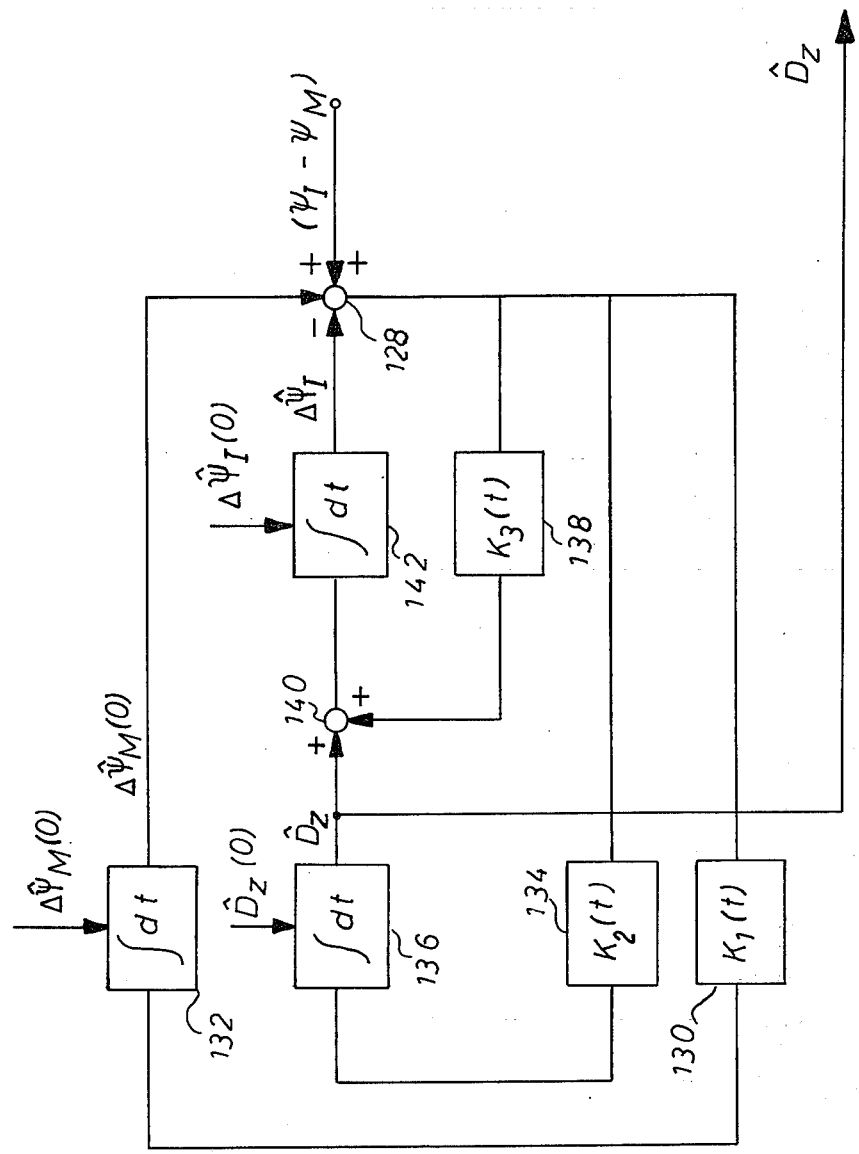
FIG. 18 illustrates the set-up of a computer for estimating the heading drift.

As can be seen from FIG. 1, magnetic field responsive means 18 and 58 for determining the direction of the magnetic field of the earth in an earth-fixed coordinate system and for generating a signal representing this direction are provided. A signal $\hat{D}_z$ from the computer unit 58 is superposed to the $\dot{\psi}_I$ signals with opposite sign at at the summation point prior to the integration with respect to time by the integrator 92. This signal represents an estimated value of the heading drift derived by means of the magnetic field of the earth. The generation of this signal $\hat{D}_z$ is illustrated in FIG. 18.

The signal $\psi_M$ representing the direction of the magnetic field of the earth (magnetic heading angle) is superposed with opposite sign to an inertial heading signal $\psi_I$ obtained by integration of the $\dot{\psi}_I$-signal to provide a difference signal $(\psi_I - \psi_M)$. A first signal $\Delta\hat{\psi}_M$ of the same sign and a second signal $\Delta\hat{\psi}_I$ of opposite sign are superposed to this difference signal $\psi_I - \psi_M$ at a summing point 128. The first signal $\Delta\hat{\psi}_M$ is an estimated value of the error of the magnetic heading angle, and the second signal is an estimated value of the error of the inertial heading signal, as will be explained hereinbelow. The first signal $\Delta\hat{\psi}_M$ is obtained by integration with respect to time of the signals thus superposed at summing point 128 with a first, time-dependent factor $K_1(t)$ by means of an integrator 132. Furthermore the superposed signals are multiplied by a second time-dependent factor $K_2(t)$, which is represented by the block 134, and are then integrated with respect to time by means of an integrator 136. A signal which represents an estimated value $\hat{D}_z$ of the heading drift will then appear at the output of the integrator 136. Eventually the signals superposed at the summing point 128 are multiplied by a third time-dependent factor $K_3(t)$, which is represented by block 138.

The product signal thus obtained and the above mentioned signal representing the estimated value $\hat{D}_z$ of the heading drift are superposed at a summing point 140. The signals thus superposed at the summing point 140 are integrated by means of an integrator 142 and provide the above mentioned second signal $\Delta\hat{\psi}_I$, which is applied to the summing point 128 like the first signal $\Delta\hat{\psi}_M$. The signal obtained from the integrator 136 and representing the estimated value $\hat{D}_z$ of the heading drift is, at the same time, superposed with opposite sign to the $\dot{\psi}_I$-signal at the summing point 90 (FIG. 17) prior to the integration of this signal.

The arrangement described operates as follows:

According to equation (22), $C_{31} = -\sin\vartheta$. Thus the component $g \sin\vartheta$ is substracted from the signal $A_x^F$ of the accelerometer at the summing point 100 of FIGS. 16 and 19, said component being due to the acceleration due to gravity. Thus a signal is provided which represents Newton's acceleration in the direction of the longitudinal axis $x^F$ of the vehicle. This signal is integrated by the integrator 102, whereby a signal $v_{Ix}^F$ is provided, thus the inertially measured speed. This inertial speed $v_{Ix}^F$ is compared to the speed $v_x^F$ measured by the speed sensor 52. A deviation of these values from each other may be due to an error of the accelerometer or to a wrong $C_{31}$. The deviation is applied to the summing point 100 with a predetermined, time-dependent factor $K_V(t)$ and thereby corrects the signal $A_x^F$ of the accelerometer 42. In addition it is integrated with a second, predetermined, time-dependent factor $K_c(t)$ and corrects the value of $C_{31}$. A controlled state will then be achieved in which the deviation between $v_x^F$ and $v_{Ix}^F$ become zero, whereby the correct value of $C_{31}$ will occur. By appropriate selection of the factors care can be taken that, taking the typical systematic errors of the sensors into account, an optimum value of $C_{31}$ will be obtained.

In the case of FIG. 16, the deviation between $v_{Ix}^F$ and $v_x^F$ causes correction of $C_{31}$ prior to the integration.

If $\psi$ designates the (at first unknown) true heading angle, which is not falsified by drift or the like, the following is valid:

$$\psi_I = \psi + \Delta\psi_I \tag{79}$$

$$\psi_M = \psi + \Delta\psi_M, \tag{80}$$

if $\Delta\psi_I$ and $\Delta\psi_M$ are the errors of the inertial and magnetic heading angles, respectively. This yields $$\psi_I - \psi_M = \Delta\psi_I - \Delta\psi_M. \tag{81}$$

With the filter of FIG. 18, it has been assumed that the difference $\psi_I - \psi_M$ has the form $$\psi_I - \psi_M = a_0 + a_1 t \tag{82}$$

i.e. is composed of a constant component $a_0$ and a linearily increasing component $a_1 t$. Furthermore, it has been assumed that $\Delta\dot{\psi}_M$ is constant, thus $$\Delta\ddot{\psi}_M = 0 \tag{83}$$

Therefrom follows:

$$\Delta\dot{\psi}_I = \dot{\psi}_I - \dot{\psi}_M = a_1 \tag{84}$$

On the other hand is per definitionem $$\Delta\dot{\psi}_I = D_z, \tag{85}$$

the heading drift of the inertially measured heading angle, which therefore corresponds to the coefficient $a_1$. These relations are simulated in the filter of FIG. 18. At the summing point 128 the difference of estimated values $\Delta\hat{\psi}_I$ and $\Delta\hat{\psi}_M$ is connected in opposition to the difference $\psi_I - \psi_M$, which has been received from the circuit of FIG. 17, the initial estimated values $\Delta\hat{\psi}_I(O)$ and $\Delta\hat{\psi}_M(O)$ being selected in some reasonable way as also the initial value $\hat{D}_z(O)$. A deviation of the differences is multiplied by $K_1(t)$ and integrated by the integrator 132 and causes variation of $\Delta\hat{\psi}_M$. Furthermore the deviation at the summing point 128 with the factor $K_2(t)$ causes a variation of the estimated value through the integrator 136. With zero deviation $(\psi_I - \psi_M) - (\Delta\hat{\psi}_I - \Delta\hat{\psi}_M)$, this estimated value would cause a linear increase of the signal at summing point 128 through the integrator 142, the deviation remaining zero only if $\hat{D}_z$ is equal to the actual heading drift. In addition the deviation is applied directly to the integrator 142 with the factor $K_3(t)$, whereby $\Delta\hat{\psi}_I$ is additionally corrected by a constant value. It should be noted that $K_1(t)$, $K_2(t)$ and $K_3(t)$ are functions declining with time torwards zero. In the stationary state, the deviation $(\psi_I - \psi_M) - (\Delta\hat{\psi}_I - \Delta\hat{\psi}_M)$ at the summing point 128 is zero, and $D_z$ is equal to the heading drift $\Delta\psi_I$. This signal is tapped and corrects $\psi_I$ in FIG. 17.

Figure 20:
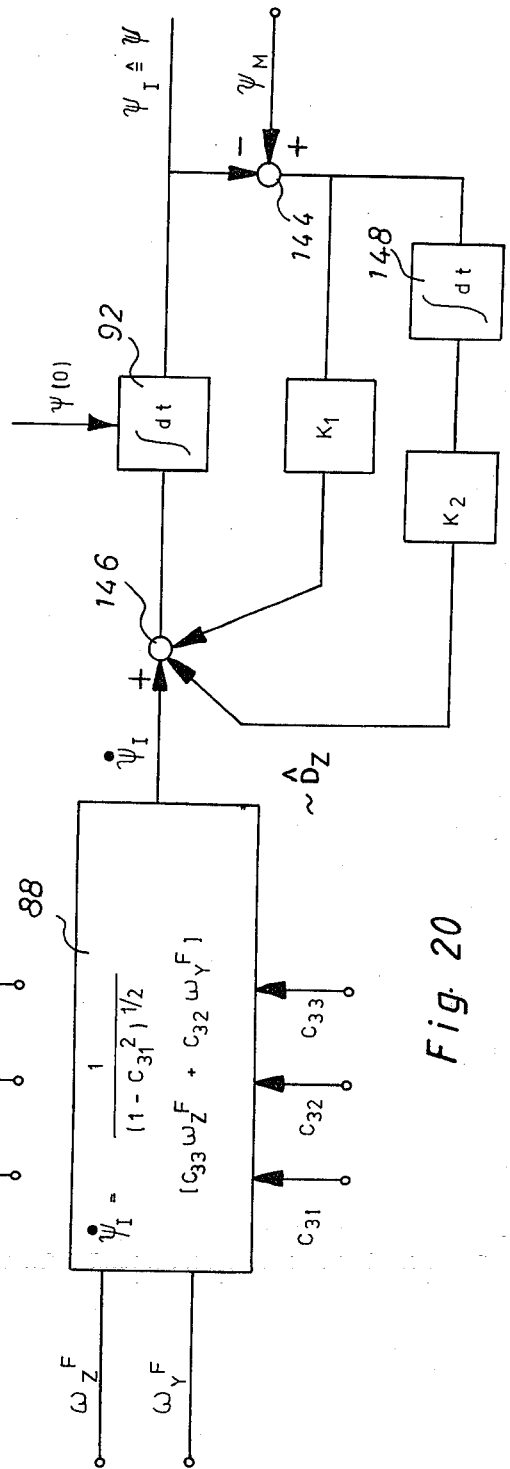
FIG. 20 illustrates a simplified version of the computer of FIG. 17.

A simplified modification is illustrated in FIG. 20, corresponding elements bear the same reference numerals as in FIG. 16.

In the modified embodiment of FIG. 20 the inertial heading angle $\psi_I$ is connected in opposition to the magnetic heading angle at the summing point 144. The difference is, on one hand, with a factor $K_1$ superposed to the $\psi_I$-signal at the summing point 146. On the other hand, the difference is integrated by means of the integrator 148, and the integral with a factor $K_2$ is applied to the $\psi_I$-signal at the summing point 146.

Figure 21:
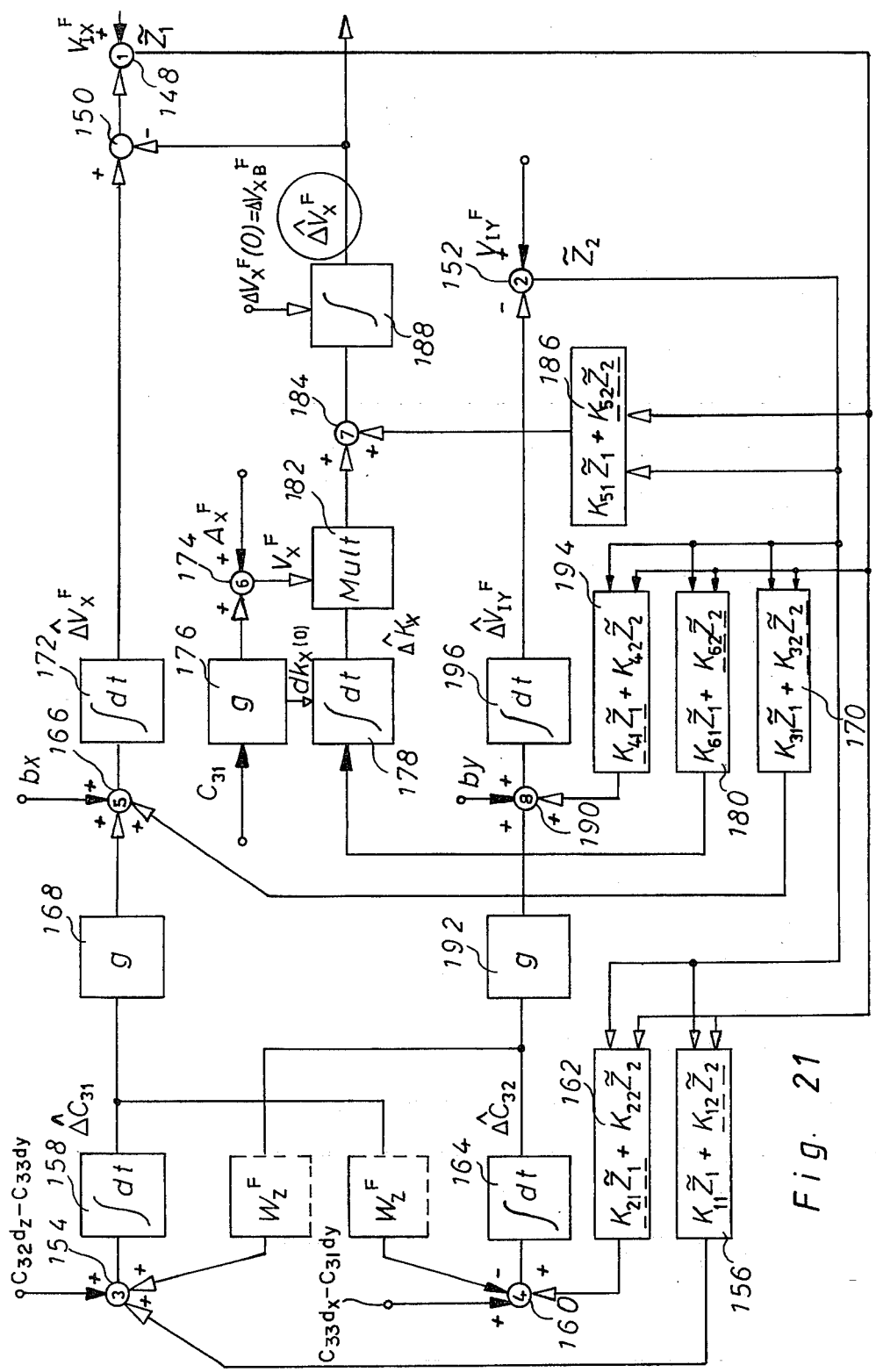
FIG. 21 illustrates an optimal filter for providing an estimated value of the speed signal.

The computer unit 76 in FIG. 1 represents an optimal filter, which, in accordance with FIG. 21, is constructed in the following way:

The difference $v_{Ix}^F - v_x^F$ of the component $v_{Ix}^F$ of the inertial speed signal falling into the direction of the longitudinal axis $x^F$ of the vehicle and of the speed signal $v_x^F$ from the speed sensor 52 is connected in opposition, at a first summing point 148, to the difference of a first and a second signal formed at a summing point 150. The first signal represents, as will be explained hereinbelow, an estimated value $\hat{\Delta v}_{Ix}^F$ of the error of the longitudinal component signal $v_{Ix}$. The second signal represents, as will also be explained hereinbelow, an estimated value $\hat{\Delta v}_x^F$ of the error of the speed signal $v_x^F$. A first difference signal $z_1$ is formed at the summing point 148.

A further signal is connected in opposition at a second summing point 152 to the component $v_{Iy}^F$ of the inertial speed signal falling into the direction of the transverse axis of the vehicle to form a second difference signal. This further signal represents, as will be explained hereinbelow, an estimated value $\hat{\Delta v}_{Iy}^F$ of the error of the transverse component signal $v_{Iy}^F$ of the inertial speed.

The first difference signal multiplied by a factor $K_{11}$ as well as a signal $$C_{32}d_z - C_{33}d_y$$

are added at a third summing point 154, as illustrated by block 154, wherein $C_{32}, C_{33}$ are elements provided by the transformation parameter computer 68 from the last line of the directional cosine matrix for the transformation from a vehicle-fixed coordinate system into an earth-fixed coordinate system, and $d_z, d_y$ are the known drifts of the rotary speed sensors 22, 24 sensitive about the vertical and transverse axes, respectively.

The signal thus obtained is integrated with respect to time by means of an integrator 158, which provides a signal $\hat{\Delta C}_{31}$ at its output, $\hat{\Delta C}_{31}$ being, as will be explained hereinbelow, an estimated value of the error of element $C_{31}$ of the directional cosine matrix.

The second difference signal $z_2$ multiplied by a factor $K_{22}$, which is represented by block 162, and a signal $$C_{33}d_x - C_{31}d_y$$

are added at a fourth summing point 160, wherein $C_{31}, C_{33}$ are again elements, provided by the transformation parameter computer, from the last line of the directional cosine matrix for the transformation from the vehicle fixed coordinate system into an earth-fixed coordinate system, and $d_x, d_y$ are the known drifts of the rotary speed sensors 20, 22 sensitive about the longitudinal and transverse axes, respectively.

The signal thus obtained is integrated by means of an integrator 164, which provides a signal $\hat{\Delta C}_{32}$ at its output, $\hat{\Delta C}_{32}$ being, as will be explained hereinbelow, an estimated value of the error of the element $C_{32}$ of the directional cosine matrix.

The signal $\hat{\Delta C}_{31}$ multiplied by the acceleration g due to gravity, which is represented by block 168, the first difference signal $z_1$ multiplied by a factor $K_{31}$, which is represented by block 170, and the known zero deviation $b_x$ of the accelerometer sensitive in longitudinal direction of the vehicle are added at a fifth summing point 166. The signal thus obtained is integrated by an integrator 172 to provide the above mentioned signal which represents the estimated value $\hat{\Delta v}_{Ix}^F$ of the longitudinal component signal $v_{Ix}^F$ of the inertial speed.

The signal $A_x^F$ of the accelerometer sensitive in longitudinal direction $x^F$ of the vehicle, and the element $C_{31}$ of the first column and the last line of the directional cosine matrix $C_F^R$ provided by the transformation parameter computer 68 and multiplied by the acceleration g due to gravity, which is represented by block 176, is added at a sixth summing point 174. This results in a signal representing the translatory acceleration $\dot{v}_x^F$ in the longitudinal direction $x^F$ of the vehicle. The first difference signal $z_1$ multiplied by a factor $K_{61}$, which is represented by block 180, is integrated by an integrator 178 to provide an estimated value $\hat{\Delta k}_x$ of the error of the scale factor of the speed sensor 52. The signal representing the translatory acceleration $\dot{v}_x^F$ is multiplied by this estimated value $\hat{\Delta k}_x$, as indicated by block 182. The first difference signal $z_1$ multiplied by a factor $K_{51}$, as represented by block 186, and the product of the signal representing the translatory acceleration $\dot{V}_x^F$ and of the output signal $\hat{\Delta k}_x$ of the integrator 178 are added at a seventh summing point 184. The signal thus obtained is integrated by means of a further integrator 188. Then the integrator 188 provides the above mentioned signal, which represents the estimated value $\hat{\Delta v}_x^F$ of the error of the speed signal $v_x^F$ from the speed sensor 52.

The signal $\hat{\Delta C}_{32}$ from integrator 164 multiplied by the acceleration g due to gravity, which is represented by block 192, the second difference signal $z_2$ multiplied by a factor $K_{42}$, as represented by block 194, as well as the known zero deviation $b_y$ of the accelerometer 42 sensitive in the longitudinal direction $x^F$ of the vehicle are added at an eighth summing point 190. The signal thus obtained is integrated with respect to time by means of an integrator 196. The integrator 196 provides a signal which represents the estimated value $\hat{\Delta v}_{Iy}^F$ of the transverse component signal of the inertial speed.

As illustrated in FIG. 1, the signal $\hat{\Delta v}_x^F$ obtained from integrator 188 is subtracted from the speed signal $v_x^F$ of the speed sensor 54 at the summing point 78.

The filter described up to now assumes that the rotary speed $\omega_z^F$ of the vehicle about its vertical axis $z^F$ is small, and $\hat{\Delta C}_{31}$ and $\hat{\Delta C}_{32}$ are also kept small by good attitude filters. In this case two separate filters, one of which is of fourth order and one of which is of second order can be used instead of one filter of sixth order. If this assumption cannot be made, the filter has to be supplemented as follows, as has been illustrated in FIG. 21 by the elements shown in dashed lines:

The signal $\Delta \hat{C}_{32}$ multiplied by the rotary speed $\omega_z^F$ about the vertical axis, on one hand, and the second difference signal $z_2$ multiplied by a factor $K_{12}$, on the other hand, are additionally added at the third summing point 154. The signal $\Delta \hat{C}_{32}$ multiplied by the rotary speed about the vertical axis, on one hand, and the first difference signal $z_1$ multiplied by a factor $K_{21}$, on the other hand, are additionally added at the fourth summing point 160.

The second difference signal $z_2$ multiplied by a factor $K_{52}$ is additionally added at the fifth summing point 166. The second difference signal $z_2$ multiplied by a factor $K_{52}$ is additionally added the seventh summing point 184. The difference signal $z_1$ multiplied by a factor $K_{41}$ is additionally added at an eigth summing point 190.

The second difference signal $z_2$ multiplied by a factor $K_{62}$ is additionally applied to the integrator 178 for providing an estimated value of the error $\Delta \hat{k}_x$ of the scale factor of the accelerometer 52.

The factors $K_{ij}$ are, in general, functions of time and are computed off-line.

The filter in its simplified version operates as follows:

With a filter of the present type a model of a quantitiy looked for, for example of the error of the speed signal, is copied. The quantity obtained by the model is compared to a measured quantity. Then the paramters of the model are varied depending on the deviation observed, until the quantity obtained by the model becomes equal to the measured quantity. As in the present case, a plurality of quantites can be combined in the model, a plurality of measured quantities being supplied to the filter.

The filter described with reference to FIG. 21 is based on the following error model for the speed information:

$$\Delta v_x^F = \Delta k_x \cdot v_x^F + \Delta v_{xB}^F \quad (86)$$

$$\Delta \dot{v}_{Ix}^F = g\Delta C_{31} + b_x \quad (87)$$

$$\Delta \dot{v}_{Iy}^F = g\Delta C_{32} + b_y. \quad (88)$$

This means: The error $\Delta v_x^F$ of the speed $v_x^F$ measured by the speed sensor 52 is due, on one hand, to a zero deviation $v_{xB}^F$ and, on the other hand, to a scale error $\Delta k_x$. The error of the measured translatory accelerations $\Delta \dot{v}_{Ix}^F$ or $\Delta \dot{v}_{Iy}^F$ results from an error $\Delta C_{31}$ or $\Delta C_{32}$, respectively, of the respective element of the directional cosine matrix and from a zero deviation $b_x$ or $b_y$, respectively, of the respective accelerometer 42 and 44, respectively.

It is assumed that $b_x$ and $b_y$ are known. Also the drifts $d_x, d_y$ and $d_z$ of the rotary speed sensors 20,22,24 are assumed to be known. The errors $\Delta C_{31}$ and $\Delta C_{32}$ caused by the drifts are, in analogy to equations (74) and (75):

$$\Delta \dot{C}_{31} = C_{32}d_z - C_{33}d_y \quad (89)$$

and $$\Delta \dot{C}_{32} = C_{33}d_x - C_{31}d_z \quad (90)$$

These signals are applied to the summing points 154 and 160, respectively and are integrated whereby estimated values $\Delta \hat{C}_{31}$ and $\Delta \hat{C}_{32}$ are provided. These estimated value are multiplied by g, and the zero deviation $b_x$ or $b_y$, respectively, is added at the summing points 166 and 190, respectively. In accordance with the model of equations (87) and (88) this yields $\Delta \dot{v}_{Ix}^F$ and $\Delta \dot{v}_{Iy}^F$, from which estimated values $\Delta \hat{v}_{Ix}^F$ and $\Delta \hat{v}_{Iy}^F$ are obtained by integration.

The integrator 178 provides, at first, an estimated value $\Delta \hat{k}_x(O)$ of the error of the scale factor of the speed sensor 52. This estimated value is multiplied by the inertially derived acceleration signal $\dot{v}_x^F$ from summing point 174. The value thus obtained is integrated by the integrator 188 and then provides the first term of equation (86). The second term $\Delta v_{xB}^F$ corresponds to the initial value of the integrator 188, whereby the integrator 188 provides an estimated value $\Delta \hat{v}_x^F$ of the error of the speed signal $v_x^F$ from the speed sensor 52. (For the purpose of the error estimation the time integral of the inertially measured translatory acceleration $v_x^F$ may replace the speed signal from speed sensor 52 in the expression $\Delta k_x v_x^F$).

The difference $v_{Iy}^F - v_x^F$ of the speeds in the direction $x^F$ of the longitudinal axis of the vehicle measured inertially and by the speed sensor 52 and the inertially measured transverse speed serve as input quantities to the filter. The following has to be true:

$$v_{Ix}^F - v_x = \Delta v_{Ix}^F - \Delta v_x^F. \quad (91)$$

Furthermore $$\Delta v_{Iy}^F = v_{Iy}^F, \quad (92)$$

as the average of the transverse speed of the vehicle is zero.

When the estimated values $\Delta \hat{v}_{Ix}^F - \Delta \hat{v}_x^F$ and $\Delta \hat{v}_{Iy}^F$ deviate from the input quantities, the difference signals $z_1$ and $z_2$ will occur. These difference signals are multiplied by appropriate functions of time and are applied to integrators, whereby they vary the parameters of the models, until the difference values become zero, thus the estimated values satisfy the equations (91) and (92). For example $z_1$ varies the estimated value $\Delta \hat{k}_x$ with the factor $K_{61}$ through the integrator 178, and the estimated value for the zero deviation $\Delta v_{xB}^F$ of the speed sensor 52 with the factor $K_{51}$ through the integrator 188.

In the general case the parameter are varied depending on linear combinations of the difference signals $z_1$ and $z_2$. For example $\Delta \hat{C}_{31}$ is varied depending on $K_{11}z_1 + K_{12}z_2$. Usually the filter may, however, simplified in the manner described above.

Figure 22:
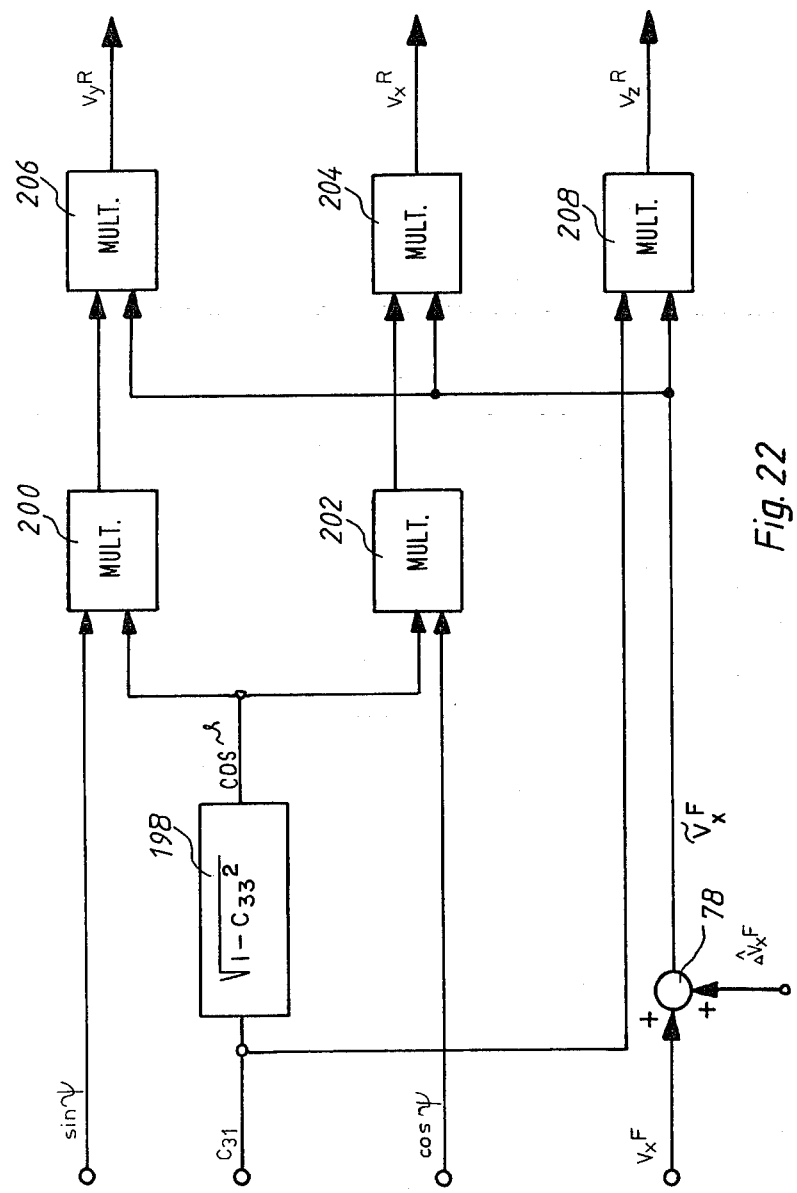
FIG. 22 illustrates the coordinate transformation computer for transforming the speed signal.

The speed signal $v_x^F$ from the speed sensor 52, corrected at the summation point 78 by the estimated value $\Delta \hat{v}_x^F$ is applied to the coordinate transformation computer 72, which is illustrated in detail in FIG. 22.

The coordinate transformation computer 72 receives the signals sin $\psi$ and cos $\psi$ as well as the element $C_{31} = -\sin \vartheta$ of the directional cosine matrix. From the latter element it forms $$\cos \vartheta = \sqrt{1 - C_{31}^2} \quad (93)$$

as illustrated by block 198.

Figure 23:
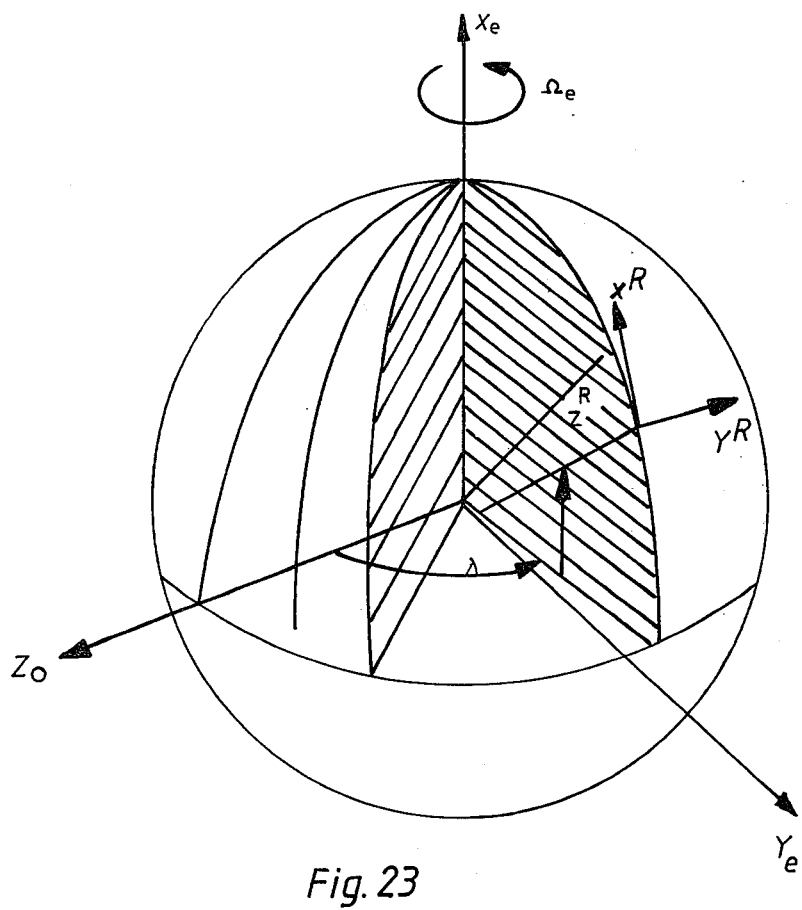
FIG. 23 illustrates the geometric relations for deriving the vehicle position from the speed components by means of the position computer.

The coordinate transformation computer forms therefrom and from sin $\psi$ and cos $\psi$ the products sin $\psi$ cos $\vartheta$ and cos $\psi$ cos $\vartheta$, as illustrated by the blocks 200 and 202. Multiplication of the signals thus obtained and of $C_{31} = -\sin \vartheta$ by the corrected speed signal $\tilde{v}_x{}^F$, represented by blocks 204,206,208 yields $$v_x{}^R = \tilde{v}_x{}^F \cos \psi \cos \vartheta \qquad (94)$$

$$v_y{}^R = \tilde{v}_x{}^F \sin \psi \cos \vartheta \qquad (95)$$

$$v_z{}^R = \tilde{v}_x{}^F \sin \vartheta \qquad (96)$$

in agreement with the multiplication of the vector $$\tilde{v}_x{}^F = \begin{bmatrix} \tilde{v}_x{}^F \\ 0 \\ 0 \end{bmatrix} \qquad (97)$$

by the directional cosine matrix $C_F{}^R$ of equation (1). The speed components in an earth-fixed coordinate system $x^R, y^R, z^R$ are obtained, as illustrated in FIG. 23. The position computer 74 (FIG. 1) computes therefrom the position of the vehicle. It is, as can be seen from FIG. 23

$$\dot{\Phi} = \frac{V_x{}^R}{R_o + h} \qquad (98)$$

$$\dot{\lambda} = \frac{V_y{}^R}{(R_o + h)\cos \Phi} \qquad (99)$$

wherein
 $\Phi$ is geographic latitude
 $\lambda$ is geographic longitude
 $R_o$ is the radius of the reference surface of the earth (sea level),
 h is the altitude above the reference surface.
Thus the position computer 76 computes $$\Phi(t) = \int_0^t \frac{v_x{}^R(t)}{R_o + h} dt + \Phi(0) \qquad (100)$$

$$\lambda(t) = \int_0^t \frac{v_y{}^R(t)}{(R_o + h)\cos \Phi} dt + \lambda(0). \qquad (101)$$

Figure 24:
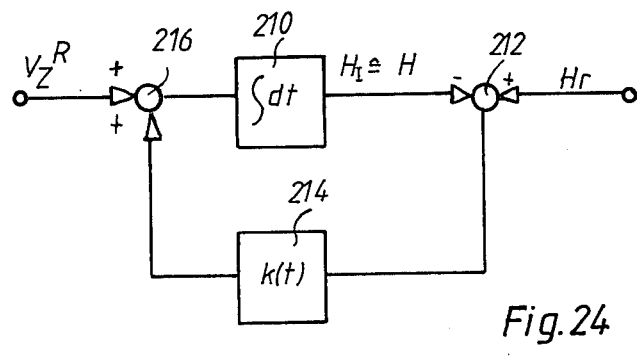
FIG. 24 illustrates, how the altitude signal is obtained.

Altitude above the reference surface is derived by integrating the vertical speed component $v_z{}^R$ and is backed by a reference altitude $h_r$, which is measured or fed in with stationary vehicle. The filter structure provided herefor is illustrated in FIG. 24.

The signal $v_z{}^R$ is integrated by an integrator 210 and provides an estimated value $\hat{h}$ of altitude. The difference $\hat{h}_r - h$ is formed at a summing point 212. The deviation of estimated value and reference altitude is multiplied by a time-dependent factor k(t), which has been computed off-line and is represented by block 214, and is fed back to a summing point 216 at the input of the integrator 210.

In FIGS. 7 to 10, each of the filters 250,252,254 and 256 is illustrated as arranged in an associated separate channel without interconnection between these channels. This procedure does not take into account the interaction between the various axes, i.e. the fact that rotation about one axis affects also the signal obtained about some other axis. Therefore the signal processing described in connection with FIGS. 7 to 10 is not completely exact. In many cases, however, it will provide sufficient accuracy while, on the other hand, the expenditure can be reduced considerably.

An exact mode of signal processing will now be described with reference to FIG. 25.

With misalignment of the spin axis $z_G$ relative to the vertical, the accelerometers 42 and 44 provide acceleration signals $a_x$ and $a_y$ as components of the acceleration due to gravity. These signals $a_x$ and $a_y$ are supplied to a computer together with the signals $U_x$ and $U_y$ from the torquers. The computer may be a microprocessor.

With a not-exactly-vertical alignment of the spin axis $z_G$ of the gyroscope, the north deviation signal obtained from the north deviation computer (FIG. 7) does not represent the true north deviation $\psi$ but only an estimated value $\hat{\psi}$ of the north deviation. With this estimated value $\hat{\psi}$ assuming actually vertical alignment of the spin axis of the gyroscope, transformation parameters, for example in the form of the directional cosines, between a gyroscope casing-fixed coordinate syste, which is defined by the first input axis $x_G$, the second input axis $Y_G$ and the spin axis $z_G$ of the gyroscope, and an earth-fixed coordinate system, which is defined by east direction, north direction and vertical, are obtained. These transformation parameters can be combined in a directional cosine matrix $$C_F{}^{\hat{R}} = \begin{bmatrix} \cos \hat{\psi} & -\sin \hat{\psi} & 0 \\ \sin \hat{\psi} & \cos \hat{\psi} & 0 \\ 0 & 0 & 1 \end{bmatrix} \qquad (102)$$

Figure 25:
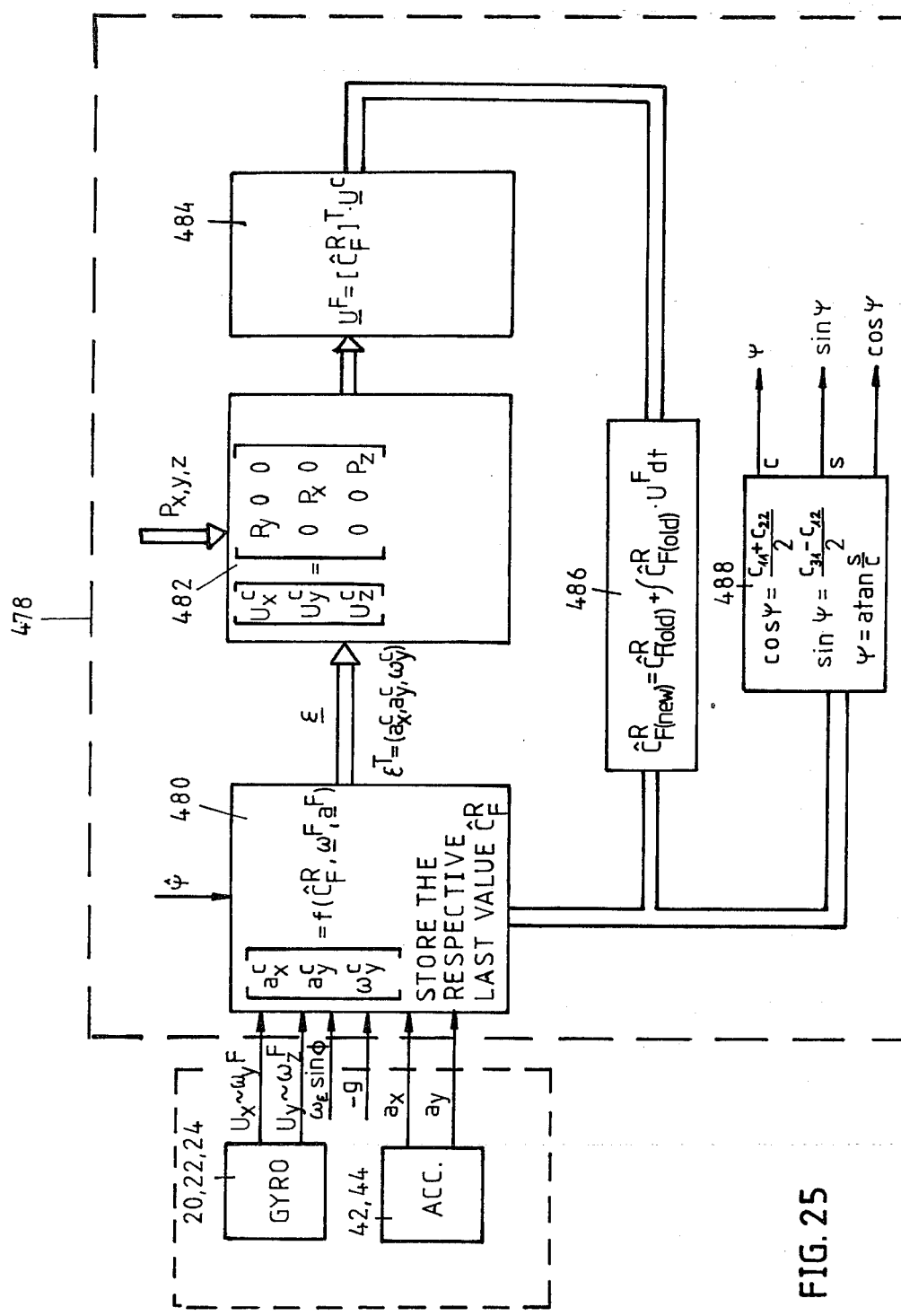
FIG. 25 illustrates a modification of the filter arrangement of FIG. 7.

Using this (at first only approximately correct) directional cosine matrix, error signals are formed by the computer 478 (FIG. 25) from the acceleration signals $a_x$ and $a_y$ provided by the accelerometers 42,44 as well as from the signals $U_x$ and $U_y$ of the torquers of the gyroscope, these error signals being represented in FIG. 25 as combined in an error vector $\epsilon$.

These error signals represent the errors of the selected transformation parameters as resulting from the signals $a_x$ and $a_y$ of the accelerometers 42 and 44, respectively, and from the torquer signals $U_x$ and $U_y$ of the gyroscope. In a computer unit 482 these error signals $\epsilon$ are weighted with factors $P_i$ variable with time and ascertained in advance "off-line" by means of an optimization method. Correction signals for the transformation parameters are provided by a correction signal computer 484 from the error signals thus weighted. These correction signals are represented by a correction signal vector U in FIG. 25. The transformation parameters are corrected accordingly in a transformation parameter computer 486 to which the correction signals U are fed. The corrected transformation parameters are again supplied to the error signal computer 480 as new estimated value. Thus there is a feedback in a closed loop: Estimated values of transformation parameters are used to compute corrections of the transformation parameters making use of the signals $a_x$ and $a_y$ of the accelerometers 42,44 and of the torquer signals $U_x$ and $U_y$ of the gyroscope. The improved transformation parameters thus corrected are used during the next computing cycle to compute further corrections, until eventually the output signals of the transformation parameter computers 486 converge towards values at which the error signals $\epsilon$ vanish.

Figure 26:
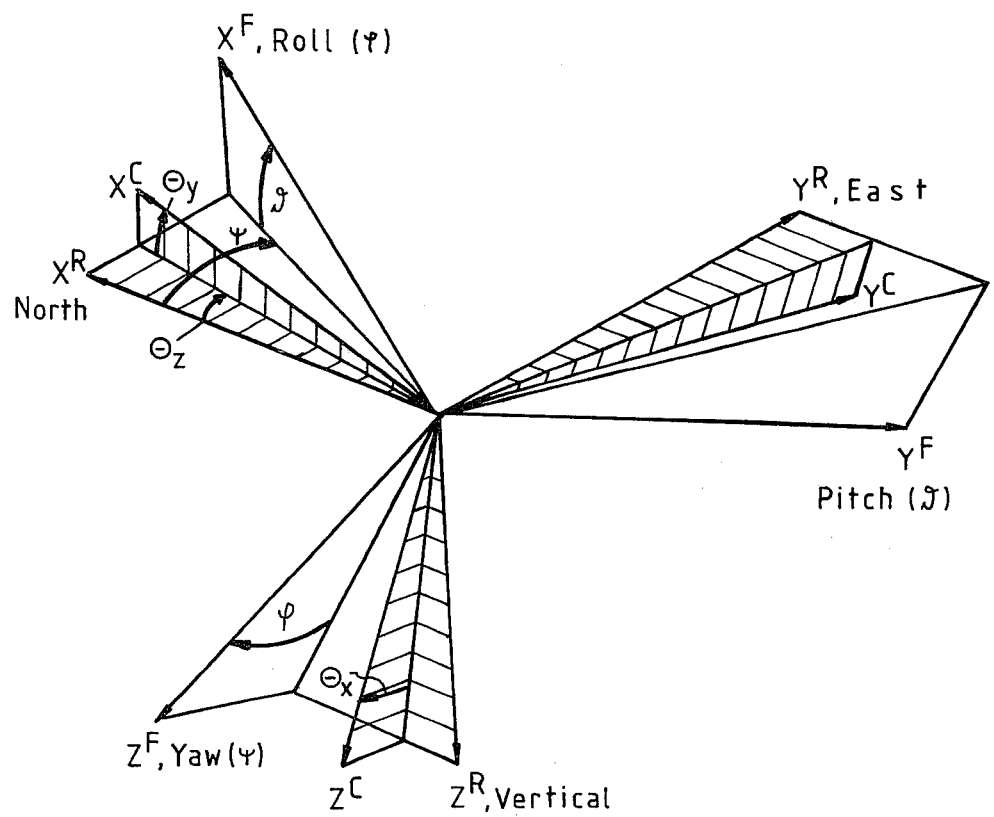
FIG. 26 illustrates the coordinate systems and error angles processed by the filter arrangement of FIG. 25.

The procedure outlined above will explained in greater detail hereinbelow. $\hat{C}_F{}^R$ does not represent the actual relation between F-system (the axes of which are coincident with the gyro-fixed G-system) and the R-system, but transforms the acceleration vectors $a^F$ and rotary speed vectors $\omega^F$ measured in the F-system into a C-system, which results from the R-system by rotation through the error angles $\Theta_x$, $\Theta_y$, $\Theta_z$, as illustrated in FIG. 26.

Appropriate measures have to ensure that the C-system is converted into the R-system, i.e. that the error angles $\Theta_x$, $\Theta_y$, $\Theta_z$ go towards zero. This will cause $C_F{}^R$ to go towards $C_F{}^R$, the elements in the matrix of equation (102) being adjusted automatically to their correct values given for $C_F{}^R$ in equation (1) with the misalignment of the instrument being taken into account.

This object is achieved by the circuit of FIG. 25.

The sensors for measuring the misalignment are the two accelerometers designated by 42 and 44 of FIG. 5. With small pitch ($\vartheta$) and roll angles ($\varphi$), the outputs of the accelerometers are $$a_x{}^F = \vartheta g$$

$$a_y{}^F = -\vartheta g \qquad (103)$$

When these output signals $a_x{}^F$, $a_y{}^F$ are transformed into the C-system by the available, not exact matrix $C_F{}^R$, wherein $C_F{}^R$ is related to the exact $C_F{}^R$ as follows, if a matrix $C_R{}^C$ is defined in accordance with FIG. 26

$$\hat{C}_F{}^R = C_R{}^C \cdot C_F{}^R \triangleq C_F{}^C \qquad (104)$$

The x- and y-components of the acceleration in the notional C-system are $$a_x{}^C = \Theta_y g$$

$$a_y{}^C = -\Theta_x g \qquad (105).$$

These signals would be provided by accelerometers mounted in the C-system.

In the sense of the aforementioned control problem, $a_x{}^C$ and $a_y{}^C$ are error signals representing the error angles $\Theta_x$ and $\Theta_y$, respectively. Carrying out the same steps for the rotary speeds $\omega^F$ measured in the F-system (which is identical with the G-system) yields the y-component in the C-system as follows:

$$\Omega_y{}^C = -\Theta_z \omega_E \cos \Phi - \Theta_x \omega_E \sin \Phi, \qquad (106)$$

wherein $\omega_E$ is the rotary speed of the rotation of the earth and $\Phi$ is latitude.

With respect to the control problem also $\omega_y{}^C$ is an error signal, as it contains the third error angle $\Theta_z$.

Consequently block 480 of FIG. 25 computes the error signals, represented by the error vector $$\epsilon^T = [a_x{}^C, a_y{}^C, \omega_y{}^C] \qquad (107)$$

from the measured informations $a_x{}^F$, $a_y{}^F$ and $\omega_x{}^F$ and $\omega_y{}^F$. Because of the assumed small angles ($\vartheta, \varphi$) of the misalignment, $\omega_z{}^F$ is assumed as $$\omega_z{}^F = -\omega_E \sin \phi \qquad (108)$$

and $a_z{}^F$ is assumed as $$a_z{}^F = -g. \qquad (109)$$

Thus, with the definition of $C_F{}^R$ as illustrated in FIG. 26, the following computations are carried out in block 80:

$$a_x{}^C = \hat{C}_{11} a_x{}^F + \hat{C}_{12} a_y{}^F - \hat{C}_{13} g \qquad (110)$$

$$a_y{}^C = \hat{C}_{21} a_x{}^F + \hat{C}_{22} a_y{}^F - \hat{C}_{23} g \qquad (111)$$

$$\omega_y{}^C = \omega_x{}^F + \hat{C}_{22} \omega_y{}^F - \hat{C}_{23} \omega_s, \qquad (112)$$

wherein $$\omega_s = \omega_E \sin \Phi \qquad (113)$$

During the first run, the values from equation (102) are substituted as $\hat{C}_{ij}$.

This defines the error vector $\epsilon$.

In order to convert the C-system into the R-system, the following "actuator" signals will be defined with the above mentioned error signals:

$$U_x{}^C = P_x a_y{}^C \qquad (114)$$

$$U_y{}^C = -P_y a_x{}^C \qquad (115)$$

$$U_z{}^C = P_z \omega_y{}^C \qquad (116)$$

The gain factors (weighting factors) $P_x$, $P_y$, $P_z$ are computed "off-line" in accordance with criteria of stability, accuracy and follow-up speed.

It is assumed, that $\Theta_x$ can be reduced by a rotation $U_x{}^C$ about the $x^C$-axis, $\Theta_y$ can be reduced by a rotation $U_y{}^C$ about the $y^C$-axis, and $\Theta_z$ can be reduced by a rotation $U_z{}^C$ about the $z^C$-axis.

The "actuator" signals are computed from $\epsilon$ in block 82 of FIG. 5 and represent the "actuator" vector $$[U^C] = [U_x{}^C, U_y{}^C, U_z{}^C] \qquad (117)$$

As the C-system is only a notional system, it is, of course, not possible to rotate, "physically" about the axes of this system. It is, however, possible to vary the matrix $\hat{C}_F{}^R \triangleq C_F{}^C$ by $$\dot{C}_F{}^C = C_F{}^C \cdot U^F, \qquad (118)$$

wherein $$U_F = \begin{bmatrix} 0 & -U_z{}^F & U_y{}^F \\ U_z{}^F & 0 & -U_x{}^F \\ -U_y{}^z & U_x{}^F & 0 \end{bmatrix} \qquad (119)$$

and $$[U^F]^T = [U_x{}^F, U_y{}^F, U_z{}^F] \qquad (120)$$

are notional rotary speeds in the F-system. The latter ones are derived from those in the C-system by the transformation.

$$U^F = C_C{}^F U^C = [C_F{}^C]^T U^C = [C_F{}^R]^T U^C \qquad (121)$$

Here always the most recent value of $\hat{C}_F{}^R$ is substituted for $C_F{}^C$ in accordance with equation (104). If, furthermore, the $U^F$ thus determined, are substituted in equation (118), this results in the change of $\dot{C}_F{}^C \triangleq \dot{C}_F{}^R$ necessary in accordance with the control requirement $\Theta_x$, $\Theta_y$, $\Theta_z \to 0$.

In block 484, FIG. 25, the $U^C$ formed in accordance with the equations (114) to (116) is, at first, transformed into the F-system in accordance with equation (118), in order to obtain the vector of the "actuator" speed, which is required to make $\Theta_x$, $\Theta_y$, $\Theta_z$ go towards zero, in the F-system ($U^F$). The $U^F$-vector represents the three weighted corrective signals for the transformation parameters (here for the elements of the directional cosine matrix). In accordance with equation (118) a corrected (new) $\hat{C}_F^R$-matrix is computed in block 486, FIG. 25, by forming $$\hat{C}_F^R \text{ (new)} = \hat{C}_F^R \text{ (old)} + \int \hat{C}_F^R \text{ (old)} \cdot U^F dt. \tag{122}$$

Subsequently the error vector $\epsilon$ is again computed with this new $\hat{C}_F^R$-matrix, as described. This procedure is repeated, until after some time $\hat{C}_F^R$ has converged towards the correct $C_F^R$ by making $\Theta_x$, $\Theta_y$ and $\Theta_z$ converge towards zero by the closed loop control described.

In block 488 the true heading is computed always with the most recent $\hat{C}_F^R$-matrix.

I claim:

1. Navigational instrument for a vehicle, wherein the north direction is determined by means of a gyro, comprising:
    a two-axis gyro having a spin axis, a first and a second input axis,
    a first angle pick-off and a first torquer on the first input axis,
    a second angle pick-off and a second torquer on the second input axis,
    first amplifier means for applying the amplified angle signal from the first angle pick-off to the second torquer, second amplifier means for applying the amplified angle signal from the second angle pick-off to the first torquer, and
    signal processing means, to which the amplified angle signals are applied,
    characterized in that:
    (a) the gyro with the angle pick-offs and the torquers is arranged in an intermediate housing,
    (b) the intermediate housing is mounted for rotation about an axis of rotation parallel to one input axis through 90° from a first position with substantially vertical spin axis into a second position,
    (c) a pair of vehicle-fixed accelerometers is arranged with its input axes parallel to the transverse and longitudinal axes, respectively, of the vehicle, said accelerometers producing accelerometer signals $A_x^F$, $A_y^F$ respectively,
    (d) the signal processing means comprise
    ($d_1$) first computer means for providing initial vehicle attitude signals from the amplified angle signals with stationary vehicle and said first position of the intermediate housing, and
    ($d_2$) second computer means for continuously providing vehicle attitude signals representing the attitude of the moving vehicle in an earth-fixed coordinate system from said initial vehicle attitude signals, said angle signals from the angle pick-offs and said accelerometer signals with the second position of the intermediate housing.

2. Navigational instrument as set forth in claim 1, characterized by
    (a) speed measuring means for generating a speed signal representing the longitudinal speed of the vehicle in a vehicle-fixed coordinate system,
    (b) a coordinate transformation computer to which vehicle attitude signals and said speed signal are supplied for providing speed component signals indicative of the components of the vehicle speed in an earth-fixed coordinate system, and
    (c) integrating computer means, to which the speed component signals are supplied for computing the vehicle position in the earth-fixed coordinate system.

3. Navigational instrument as set forth in claim 1, characterized in that said first computer means comprise
    (a) matrix element forming means connected to receive the acceleration signals $A_x^F$, $A_y^F$ of the accelerometers and for forming therefrom estimated values of the elements $C_{31}$ and $C_{32}$ of the directional cosine matrix for the transformation from a vehicle-fixed coordinate system ($x^F$, $y^F$, $z^F$) into an earth-fixed coordinate system ($x^R$, $y^R$, $z^R$) in accordance with the relation $C_{31}(O) = -A_x^F/g$ $C_{32}(O) = -A_y^F/g$, (b) squaring, adding and root extracting means connected to receive the estimated values thus obtained and for forming therefrom an estimated value of the third element $C_{33}$ of the last line of the directional cosine matrix $C_F^R$ in accordance with the relation $$C_{33}(O) = +\sqrt{1 - C_{31}^2 - C_{32}^2}, \text{ and}$$

(c) means connected to receive the signals applied to the torquers and for deriving therefrom signals representing the rotary speeds $w_y^F$ and $w_x^F$,
    (d) heading angle means connected to receive the signals $C_{31}$, $C_{32}$ and $C_{33}$ and the signals representing the rotary speeds $w_y^F$ and $w_x^F$, and producing a signal representing the initial heading angle $\psi(O)$ of the vehicle in an earth-fixed coordinate system in accordance with the relations $$\cos \psi(O) = \frac{1}{\sqrt{1 - C_{31}^2}} \left[ C_{31} \sin \Phi + \frac{w_x^F}{\Omega_E \cos \Phi} \right] \tag{1}$$

$$\sin \psi(O) = \frac{1}{\sqrt{1 - C_{31}^2 - C_{32}^2}} \left[ \sqrt{1 - C_{31}^2} \left\{ \frac{w_y^F}{\Omega_E \cos \Phi} + C_{32} \tan \Phi \right\} + C_{31} C_{32} \cos \psi \right] \tag{2}$$

wherein
    $\Phi$ is geographic latitude and
    $\Psi_E$ is the rotary speed of the earth.

4. Navigational instrument as set forth in claim 3, characterized by
    (a) the signals supplied to the torquers from the angle pick-offs, which signals are proportional to the rotary speeds, and the acceleration signals from the accelerometers constituting sensor signals,
    (b) a pair of filters, each filter comprises three integrators, three multipliers and a summing point, each filter being connected to receive a respective sensor signal, (c) as to each of the filters:
 (1) each of the three integrators produces a respective output signal,
 (2) the summing point receives three input signals and produces an output signal therefrom,
 (3) a first of the integrators is connected to receive the respective sensor signal and integrates it with respect to time to produce one of said three input signals,
 (4) two of the multipliers being connected to receive the output signal of the summing point and to respectively multiply that output signal by factors of $K_1(t)$ and $K_o(t)$ to produce respective output signals,
 (5) a second of the integrators is set to the instantaneous value of the respective sensor signal at the beginning of each cycle and is connected to receive the output signal of the $K_1(t)$ multiplier to produce an output signal,
 (6) a third of the multipliers is connected to receive the output signal of said second integrator, to multiply that signal by the time t and to feed it back to the summing point with reversed sign as a second of said three input signals,
 (7) a third of the integrators is connected to receive the output signal of the $K_o(t)$ multiplier and to produce an output signal which is fed to the summing point with reversed sign as the third of said three input signals.

5. Navigational instrument as set forth in claim 4, characterized in that the third integrator is reset to zero at the beginning of each cycle.

6. Navigational instrument as set forth in claim 3, characterized by
 (a) the signals supplied to the torquers from the angle pick-offs, which signals are proportional to the rotary speeds, and the acceleration signals from the accelerometers constituting sensor signals, said sensor signals being detected in cycles with each cycle having a duration T,
 (b) a pair of filters, each filter comprises clock means for producing clock pulses with intervals therebetween, five multipliers, two dividers, four delay loops, eight adders and an analog reset integrator,
 (c) as to each of the filters:
 (1) said integrator is connected to receive the respective sensor signal and resets it with respect to time and produces an increment pulse $y_i$ each time the resulting signal reaches a predetermined level and is reset to zero thereafter,
 (2) a first of the adders is connected to receive said increment pulses, said adder adding each increment pulse $y_i$ to the sum $y_i$ of the preceding increment pulses, which sum has been delayed by one clock interval through one of said delay loops,
 (3) a second of the adders is connected to receive said clock pulses, said second adder adding each clock pulse to the sum $i-1$ of the preceding clock pulses, which sum $i-1$ has been delayed by one clock interval through another of said delay loops, to produce a sum signal n,
 (4) a first of the multipliers is connected to the first and second adders to multiply the sum $y_i$ of the increment pulse numbers by the sum i of the clock pulses to produce a pulse signal $iy_i$,
 (5) a third of the adders is connected to said first multiplier for adding each pulse signal $iy_i$ to the sum of the preceding signals $iy_i$, which sum $iy_i$ has been delayed by one clock interval through another of the delay loops, to produce a pulse signal $\Sigma iy_i$,
 (6) a fourth of the adders is connected to the third adder to add the pulse signal $\Sigma iy_i$ by itself to produce a pulse signal $2\Sigma iy_i$,
 (7) a fifth of the adders is connected to receive the sum $y_i$ of the increment pulses, said fifth adder adding said sum $y_i$ to the sum $y_i$ of the preceding $y_i$ signals which have been delayed through another of the delay loops to produce a signal $\Sigma y_i$,
 (8) a sixth of the adders is connected to receive the signal n representing the sum of the clock pulses and to increase it by one to produce a signal (n+1),
 (9) a second of the multipliers being connected to receive and multiply the signals $\Sigma y_i$ and (n+1) to produce a signal $(n+1)\Sigma y_i$,
 (10) a seventh of the adders being connected to receive the signals $2\Sigma y_i$ and $(n+1)\Sigma y_i$ and to subtract the latter from the former to produce a signal $2\Sigma y_i - (n+1)\Sigma y_i$,
 (11) a third of the multipliers being connected to receive the signal n representing the sum of the clock pulses and to multiply that signal by itself to produce a signal $n^2$,
 (12) an eighth of the adders being connected to receive the signal $n^2$ and to reduce it by one to produce a signal $(n^2-1)$,
 (13) a fourth of the multipliers being connected to receive the signal n representing the sum of the clock pulses and to multiply it by the duration T of the cycle to produce a signal nT,
 (14) a fifth of the multipliers being connected to receive the signals $(n^2-1)$ and nT and to multiply those signals with each other, to produce a signal $nT(n^2-1)$,
 (15) a first of the dividers being connected to receive the signal $nT(n^2-1)$ and to divide it by a given number x to produce a signal $nT(n^2-1)/x$,
 (16) a second of the dividers being connected to receive the signals from the seventh adder and the first divider and to divide the signal from the former by the signal from the latter to produce a quotient signal.

7. Navigation instrument as set forth in claim 6, characterized in that each of the filters further comprises
 (17) a fifth delay loop,
 (18) a ninth adder connected to receive said quotient signal of the second divider after a predetermined number of clock pulses, said ninth adder adding the quotient signal so received to the sum of the quotient signals previously received, which sum has been delayed by one clock interval by the fifth delay loop, to produce a sum output signal,
 (19) a third divider connected to receive said sum output signal and to divide it by the total number of quotient signals.

8. Heading-attitude reference unit for determining the heading and the attitude of a vehicle, comprising: rotary speed sensor means, which are arranged to respond to the rotary speeds about three mutually perpendicular, vehicle-fixed input axes, said means including at least two rotary speed sensors producing sensor signals, two accelerometers having vehicle-fixed, mutually perpendicular input axes which respectively are parallel to the input axes of the two rotary speed sensors, said accelerometers producing sensor signals, and computer means, to which the signals from the rotary speed sensors and from the accelerometers are supplied for providing signals representing transformation parameters between a vehicle-fixed coordinate system and an earth fixed coordinate system, as well as the heading angle in the earth-fixed coordinate system, said computer means comprising (a) means for receiving said sensor signals and providing signals (4) $\dot{C}_{31} = C_{32}\omega_z^F - C_{33}\omega_y^F$ (5) $\dot{C}_{32} = C_{33}\omega_x^F - C_{31}\omega_z^F$ wherein
$C_{31}, C_{32}, C_{33}$ are the elements of the last line of the directional cosine matrix,
$\dot{C}_{31}, \dot{C}_{32}$ are the associated time derivatives,
$\omega_x^F$ is the rotary speed about an input axis $x^F$ in the vehicle-fixed coordinate system,
$\omega_y^F$ is the rotary speed about the second input axis $y^F$ in the vehicle-fixed coordinate system, and
$\omega_z^F$ is the rotary speed about the third input axis $z^F$ in the vehicle-fixed coordinate system, (b) means connected to receive the signals $\dot{C}_{31}$ and $\dot{C}_{32}$ and integrate the received signals with respect to time to provide signals $C_{31}$ and $C_{32}$, respectively, (c) means connected to receive the signals $C_{31}$ and $C_{32}$ from the integration means and for producing a signal $$c_{33} = \sqrt{1 - c_{31}^2 - c_{32}^2}$$

(d) from the signal $C_{31}$ and $C_{32}$ thus obtained, means connected to feed the signals $C_{31}, C_{32}$ and $C_{33}$ back to the computer for providing $\dot{C}_{31}$ and $\dot{C}_{32}$ from the rotary speed signals, (e) means connected to receive the signals $C_{31}, C_{32}$ and $C_{33}$ and the rotary speed signals $\omega_z^F$ and $\omega_y^F$ and for producing a signal $$\dot{\psi}_I = \frac{1}{\sqrt{1 + C_{32}^2}} [C_{33} w_z^F + C_{32} w_y^F]$$

therefrom, and (f) means connected to receive this signal $\dot{\psi}_I$ and integrating it with respect to time to provide a signal $\psi_I$ representing the heading angle in the earth-fixed coordinate system.

9. Heading-attitude reference unit as set forth in claim 8 further characterized by (g) means connected to receive the signals $C_{32}$ and $C_{31}$ and to multiply each by the acceleration g due to gravity to produce signals $gC_{32}$ and $gC_{31}$, (h) means connected to receive the signals $gC_{32}$ and $gC_{31}$ and the signals $A_y^F$ and $A_x^F$, respectively, from the accelerometers and to superpose the former and the latter respectively, (i) means connected to receive the signals from the accelerometers and for superposing additional signals to each signal from an accelerometer, (j) means connected to receive the signals from the last mentioned means and for integrating those signals with respect to time to provide inertial speed signals, (k) at least one speed sensor, which provides a speed signal indicative of the component of the vehicle speed in the direction of the input axis of an accelerometer, (l) means connected to receive the inertial speed signal with opposite sign to the speed signal from the speed sensor and for superposing the two to provide a difference signal, (m) means connected to receive said difference signal and to multiply it by a factor $K_v(t)$, which is a function of time, to provide said additional signal superposed to the signal from the accelerometer, and (n) means connected to receive said difference signal and the $C_{32}$ and $C_{31}$ signals, multiplying the difference signal with a factor $K_c(t)$, which is a function of time, and superposing the resulting product to the $C_{32}$- and $C_{31}$-signals, respectively.

10. Heading-attitude reference unit as set forth in claim 8, and further characterized by (a) magnetic field responsive means for determining the direction $\psi_M$ of the magnetic field of the earth in the earth fixed coordinate system and for providing a signal representing this direction, and (b) means connected to receive the $\dot{\psi}_I$ signal prior to the integration with respect to time and for superposing thereon a signal $D_z$ with opposite sign to produce a signal $D_z \dot{\psi}_I$, said signal $D_z$ representing an estimated value of the heading drift derived by means of the direction of the magnetic field of the earth, the last mentioned integrating means then integrating this $D_z \dot{\psi}_I$ signal.

11. Heading-attitude reference unit as set forth in claim 10, and further characterized by (a) means connected to receive signal $\psi_M$ and the signal $\psi_I$ and producing a difference signal $(\psi_I - \psi_M)$ therefrom, (b) means connected to receive the difference signal $(\psi_I - \psi_M)$ and for superposing a first signal $\Delta\psi_M$ with the same and a second signal $\Delta\psi_I$ with opposite sign to this difference signal, (c) means connected to receive the last mentioned superposed signals and for multiplying them by a factor $K_1(t)$, which is a function of time, and for integrating the product with respect to time to provide said first signal $\Delta\psi_M$ which is then supplied to the last mentioned superposing means, (d) means connected to receive the last mentioned superposed signals and for multiplying them by a second factor $K_2(t)$, which is function of time, and for integrating the product with respect to time to produce a signal representing signal estimated value $D_z$ of the heading drift, and (e) means connected to receive the last mentioned superposed signals and the $D_z$ signal and for multiplying the said superposed signals with a third factor, which is a function of time, for superposing the product to said $D_z$ signal and for integrating the latter superposed signal with respect to time to provide said second signal $\Delta\psi_I$ which is then supplied to said last mentioned superposing means.

12. Instrument for the automatic determination of the north direction by means of a gyro affected by the rotation of the earth, wherein
the gyro is a two-axis gyro the spin axis of which is substantially vertical,
the position of the gyro is picked off by position pick-offs and torquer is arranged to exert erecting torques on the gyro to keep the spin axis of the gyro vertical, a position pick-off and a torquer is provided on each of two mutually perpendicular input axes of the gyro, the signal from each position pick-off associated with one input axis is suppiled crosswise to the torquer on the respective input axis to restrain the spin axis of the gyro to the vertical, and the signal supplied to the two torquers are, at the same time, applied to a north deviation computer, which provides, from the ratio of the signals, a signal representing the deviation of an instrument-fixed reference direction from north, characterized in that (a) the north deviation computer comprises a memory for storing the two signals $T_y^{(1)}$, $T_x^{(1)}$ supplied to the torquers, (b) the gyro is arranged to be rotated through 180° about a horizontal axis by a servomotor, after the signals have been stored, (c) the signals $T_y^{(2)}$, $T_x^{(2)}$ then supplied to the torquers are supplied to the north deviation computer, (d) the north deviation computer comprises means for providing signals $$\Delta T_y = T_y^{(1)} - T_y^{(2)} \tag{8}$$

$$\Sigma T_x = T_x^{(1)} + T_x^{(2)} \tag{9}$$

wherein $$T_y^{(1)} = \frac{M_y^{(1)}}{H}, \tag{10}$$

$$T_y^{(2)} = \frac{M_y^{(2)}}{H}, \tag{11}$$

$$T_x^{(1)} = \frac{M_x^{(1)}}{H}, \tag{12}$$

$$T_x^{(2)} = \frac{M_x^{(2)}}{H}, \tag{13}$$

$M_x^{(1)}$ and $M_x^{(2)}$ are the stored signals and the signals applied after the 180°-rotation to that torquer, which acts about one axis, $M_y^{(1)}$ and $M_y^{(2)}$ are the stored signals and the signals applied after the 180°-rotation to the other torquer, and H is the rotary momentum of the gyro, and (e) the north deviation computer comprises means for providing a signal $$\psi_1 = \arctan \frac{\Sigma T_x}{-\Delta T_y} \tag{14}$$

as north deviation signal.

13. Instrument as set forth in claim 12, characterized in that (a) the housing of the gyro is mounted for rotation and is rotatable through 90° about one of the input axes of the gyro by means of a servomotor, whereby the gyro can be used as heading reference unit, and (b) the same servomotor is arranged to optionally rotate the housing through 180°.

14. Instrument for the automatic determination of the north direction by means of a gyro affected by the rotation of the earth, wherein the gyro is a two-axis gyro the spin axis of which is substantially vertical, the position of the gyro is picked off by position pick-offs and a torquer is arranged to exert erecting torquers on the gyro ot keep the spin axis of the gyro vertical, a position pick-off and a torquer is provided on each of two mutually perpendicular input axes of the gyro, the signal from each position pick-off associated with one input axis is suppiled crosswise to the torquer on the respective input axis to restrain the spin axis of the gyro to the vertical, and the signals supplied to the two torquers are, at the same time, applied to a north deviation computer, which provides, from the ratio of the signals, a signal representing the deviation of an instrument-fixed reference direction from north, characterized in that (a) the north deviating computer comprises a memory for storing the two signals $T_y^{(1)}$, $T_x^{(1)}$ supplied to the torquers, (b) the gyro is arranged to be rotated by a servomotor through 180° about a vertical axis coinciding with the gyro spin axis, after these signals $T_x^{(1)}$, $T_y^{(1)}$ have been stored, (c) the signals $T_x^{(3)}$, $T_y^{(3)}$ then supplied to the torquers are applied to the north deviataion computer, (d) the north deviation computer comprises means for providing signals $$DT_x = T_x^{(1)} - T_x^{(3)} \tag{15}$$

$$DT_y = T_y^{(3)} - T_y^{(1)} \tag{16}$$

wherein $$T_y^{(1)} = \frac{M_y^{(1)}}{H}, \tag{17}$$

$$T_y^{(3)} = \frac{M_y^{(3)}}{H}, \tag{18}$$

$$T_x^{(1)} = \frac{M_x^{(1)}}{H}, \tag{19}$$

$$T_y^{(3)} = \frac{M_y^{(3)}}{H}, \tag{20}$$

$M_x^{(1)}$ and $M_x^{(3)}$ are the stored signals and the signals applied to one torquer, after the 180°-rotation, $M_y^{(1)}$ and $M_y^{(2)}$ are the stored signal and the signals applied to the other torquer after the 180° rotation, and H is the rotary momentum of the gyro, and (e) the north deviation computer comprises means for providing a signal $$\psi = \arctan \frac{DT_x}{DT_y} \tag{21}$$

as north deviation signal.

15. Instrument for the automatic determination of the north direction by means of a gyro affected by the rotation of the earth, wherein the gyro is a two-axis gyro the spin axis of which is substantially vertical, the position of the gyro is picked off by position pick-offs and a torquer is arranged to exert erecting torques on the gyro to keep the spin axis of the gyro vertical, a position pick-off and a torquer is provided on each of two mutually perpendicular input axes of the gyro, the signal from each position pick-off associated with one input axis is supplied crosswise to the torquer on the respective input axis to restrain the spin axis of the gyro to the vertical, and the signals supplied to the two torquers are, at the same time, applied to a north deviation computer, which provides, from the ratio of the signals, a signal representing the deviation of an instrument-fixed reference direction from north, characterized in that (a) the north deviation computer comprises a memory for storing the two signals $T_y^{(1)}$, $T_x^{(1)}$ supplied to the torquers, (b) the gyro is arranged to be rotated by a first servomotor through 180° about a vertical axis coinciding with the gyro spin axis, after these signals $T_x^{(1)}$, $T_y^{(1)}$ have been stored (c) the north deviation computer comprises a memory for storing the two signals $T_x^{(3)}$, $T_y^{(3)}$ then supplied to the torquers, (d) the first servomotor is controlled to rotate the gyro housing through 180° back into the initial position, after these latter signals have been stored, (e) the gyro is arranged to be rotated by a second servomotor through 180° about a horizontal input axis, after it has been rotated back by the first servomotor, (f) the signals $T_x^{(2)}$, $T_y^{(2)}$ then supplied to the torquers are applied to the north deviation computer, (g) the north deviation computer comprises means for providing signals $$\Sigma T_{xc} = T_x^{(2)} - T_x^{(3)} \qquad (22)$$

$$\Delta T_y = T_y^{(1)} - T_y^{(2)} \qquad (23)$$

wherein $T_x^{(2)}$ is the signal which, after rotation of the gyro about said one input axis y, is applied to that torquer which acts on the other input axis, $T_x^{(3)}$ is the signal which, after rotation of the gyro about the vertical axis, is supplied to that torquer which acts on said other input axis, $T_y^{(1)}$ is the signal which, in the initial position prior to the rotation about the vertical axis, is supplied to that torquer which acts about said one input axis, $T_y^{(2)}$ is the signal which, after the rotation about the horizontal axis, is supplied to that torquer which acts on said one input axis, and (h) the north deviation computer comprises means for providing a signal $$\psi_1 = \arctan \frac{\Sigma T_{xc}}{-\Delta T_y} \qquad (24)$$

as north deviation signal.

16. Instrument as set forth in claim 15, characterized in that the north deviation computer comprises means for providing signals $$ST_x = T_x^{(1)} + T_x^{(3)} \text{ and} \qquad (25)$$

$$ST_y = -T_y^{(1)} - T_y^{(3)}, \qquad (26)$$

said signals representing the components of the gyro drifts, wherein $T_x^{(1)}$ is the signal which, in the initial position prior to the rotation about the vertical axis, is supplied to that torquer which acts on said other input axis, and $T_y^{(3)}$ is the signal which, after the rotation about the vertical axis is supplied to that torquer which acts on said one input axis.

17. Instrument as set forth in claim 15, characterized in that (a) the north deviation computer comprises an additional memory for for storing the two signals $T_x^{(2)}$, $T_y^{(2)}$ supplied to the torquers, after the gyro has been rotated back about the vertical axis into its initial position, (b) the north deviation computer comprises means for providing the mean values $$T_x^{(1)} = \tfrac{1}{2}(T_{x1}^{(1)} + T_{x2}^{(1)}) \text{ and} \qquad (27)$$

$$T_y^{(1)} = \tfrac{1}{2}(T_{y1}^{(1)} + T_{y2}^{(1)}), \qquad (28)$$

wherein the index "1" indicates the signal prior to the rotation about the vertical axis and the index "2" indicates the signal after the rotation back into the initial position.

18. An instrument for the automatic determination of the north direction by means of a gyroscope affected by the rotation of the earth and having a spin axis, said instrument having an instrument-fixed reference direction and being characterized by: gyroscope positioning means secured to said gyroscope and mounting said gyroscope for pivotal movement about two input axes at right angles to each other, said positioning means positioning said spin axis substantially vertical, said positioning means including first and second torquers associated with said input axes respectively for controlling the angular position of the spin axis about the input axes respectively, first and second pickups associated with said input axes respectively for producing signals indicative of the angular position of the spin axis about the input axes respectively, and control means including said pickups and said torquers for actuating the torquer associated with one axis in response to the signal from the pickup associated with the other axis and for actuating the torquer associated with said other axis in response to the signal from the pickup associated with said one axis; and a north direction computer, connected to said control means to receive said signals, for producing from the ratio of the signals a north deviation signal indicative of the deviation from north of the instrument-fixed reference direction, said north deviation computer providing a signal $$\psi_1 \arctan \frac{K_{Ty} \cdot U_y}{K_{Tx} \cdot U_x}$$

wherein $U_x$ is the voltage which is supplied to the one torquer acting about the one input axis of the gyroscope, $K_{Tx}$ is the constant of said one torquer, $U_y$ is the voltage which is supplied to the other torquer acting about the other input axis of the gyroscope, and $K_{Ty}$ is the constant of said other torquer, said north deviation computer comprising a quadrant logic circuit for determining the quadrant of the north deviation, said quadrant logic circuit being connected to receive the two signals supplied to the torquers, and a quadrant computer, to which the signal $$\psi_1 \text{ arc tan} \frac{K_{Ty} \cdot U_y}{K_{Tx} \cdot U_x}$$

is applied together with an output signal from the quadrant logic circuit and which provides a north deviation signal $\psi$ taking the quadrant of the north deviation into consideration.

19. An instrument as set forth in claim 18 characterized in that the quadrant logic circuit comprises a comparator circuit, which specifies the quadrant of the north deviation in accordance with the following criteria:

| | | |
|---|---|---|
| $U_y > 0$ $U_x > 0$ | $0° < \psi < 90°$ | (quadrant I) |
| $U_y > 0$ $U_x < 0$ | $0° < \psi < 180°$ | (quadrant II) |
| $U_y < 0$ $U_x < 0$ | $180° < \psi < 270°$ | (quadrant III) |
| $U_y < 0$ $U_x > 0$ | $270° < \psi < 360°$ | (quadrant IV) | and that the quadrant computer provides the north deviation signal $\psi$, as a function of an output signal of the quadrant logic circuit representing the quadrant of the north deviation, in the following manner:

quadrant I : $\psi = |\psi_1|$
quadrant II : $\psi = 180° - |\psi_1|$
quadrant III : $\psi = 180° + |\psi_1|$
quadrant IV : $\psi = 360° - |\psi_1|$.

20. An instrument as set forth in claim 19, characterized in that the quadrant logic circuit comprises a null detector circuit for detecting singular values of the north deviation signal in accordance with the following criteria:

| | |
|---|---|
| $U_y = 0$ $U_x > 0$ | $\psi = 0$ |
| $U_y > 0$ $U_x = 0$ | $\psi = 90°$ |
| $U_y = 0$ $U_x < 0$ | $\psi = 180°$ |
| $U_y < 0$ $U_x = 0$. | $\psi = 270°$ |

21. An instrument as set forth in any one of the claims 18 through 20, wherein said gyroscope is casing-fixed and including:

accelerometer means operatively associated with the gyroscope for providing a pair of error signals indicative of the deviation of the gyroscope spin axis from the vertical; an error signal computer connected to receive the north deviation signal from the north deviation computer as an estimated value $\psi$ of the north deviation $\psi$ together with the signals which are applied to the torquers and the error signals from the accelerometer means, said error signal computer computing error signals of transformation parameters between said gyroscope and an earth-fixed coordinate system on the basis of estimated values of these transformation parameters, said estimated values of the transformation parameters being, at first, determined by the output signal of the north deviation computer;

a correction signal computer connected to receive the error signals from the error signal computer for computing correction signals to be applied to the transformation parameters from the error signals thus obtained and weighted, if appropriate;

a transformation parameter computer connected to receive said correction signals and for supplying corrected transformation parameters;

means connecting the transformation parameter computer and the error signal computer to supply said corrected transformation parameters to the error signal computer for the computation of the error signals by the error signal computer in a closed loop as new estimated values of the transformation parameters; and a computer connected to receive the corrected transformation parameters from the transformation parameter computer and producing a signal representing a corrected north deviation corresponding to the corrected transformation parameters.

22. An instrument as set forth in claim 21, wherein the accelerometer means comprises a pair of accelerometers mounted in fixed attitude relation to the gyroscope, said accelerometers having axes of sensitivity which are perpendicular to each other and respectively parallel to the two input axes of the gyroscope.

23. An instrument for the automatic determination of the north direction by means of a gyroscope affected by the rotation of the earth and having a spin axis, said instrument having an instrument-fixed reference direction and for use with a vehicle, said instrument being characterized by:

gyroscope positioning means secured to said gyroscope and mounting said gyroscope for pivotal movement about two input axes at right angles to each other, said positioning means positioning said spin axis substantially vertical, said positioning means including first and second torquers associated with said input axes respectively for controlling the angular position of the spin axis about the input axes respectively, first and second pickups associated with said input axes respectively for producing signals indicative of the angular position of the spin axis about the input axes respectively, and control means including said pickups and said torquers for actuating the torquer associated with one axis in response to the signal from the pickup associated with the other axis and for actuating the torquer associated with said other axis in response to the signal from the pickup associated with said one axis;

a north direction computer, connected to said control means to receive said signals, for producing from the ratio of the signals a north deviation signal indicative of the deviation from north of the instrument-fixed reference direction; accelerometer means operatively associated with the gyroscope for providing a pair of error signals indicative of the deviation of the gyroscope spin axis from the vertical, the accelerometer means comprising a pair of accelerometers mounted in a fixed orientation with respect to the vehicle, said accelerometers having axes of sensitivity which are perpendicular to each other and respectively parallel to the two input axes of the gyroscope;

the gyroscope being rotatable through 90° about one of the input axes of the gyroscope between the position at which the spin axis is vertical and a position at which the spin axis is horizontal; and including a computer for computing the true heading of the vehicle from the information provided by the accelerometers about the attitude of the vehicle relative to a horizontal plane, and from the angular speed about the vehicle-fixed input axes of the gyroscope provided by the gyroscope.

24. Navigational instrument for a land vehicle having a fixed longitudinal axis x, a fixed transverse axis y and a fixed vertical axis z, said instrument comprising:

an inertial measuring unit producing inertial speed signals and having rotation-responsive inertial sensors, which respond to rotary movements about said axes and have known drifts $d_x$, $d_y$, $d_z$ about their longitudinal, transverse and vertical axes x, y and z respectively, and accelerometers, which respond to linear accelerations along vehicle-fixed axes, the accelerometer sensitive in the direction of the longitudinal axis x producing a signal $A_x{}^F$ and having a known deviation $b_x$, a speed sensor having a scale factor, which speed sensor responds to the speed of the vehicle with respect to ground in the direction of the longitudinal axis of the vehicle and produces a speed singal $v_x{}^F$ in the direction of the vehicle longitudinal axis, a transformation parameter computer connected to receive the signals from the inertial measuring unit and which comprises means for computing transformation parameters for the transformation of vector components from a vehicle-fixed coordinate system into an earth-fixed coordinate system, corrective signal generators connected to receive the accelerometer signals and the transformation parameters from the transformation parameter computer and which provide signals representing the components due to gravity of the accelerations detected by the accelerometers, said gravity component signals being superposed to the signals from the accelerometers to provide translation acceleration signals, integrators connected to receive the translation acceleration signals to produce inertial speed signals $v_{Ix}{}^F$ and $v_{Iy}{}^F$, an optimal filter connected to receive the inertial speed signals and the speed signals from the speed sensor and which, on the basis of these signals, produces estimated speed signals $\hat{\Delta v}_{Ix}{}^F$ and $\hat{\Delta v}_{Iy}{}^F$ referenced to vehicle-fixed coordinates $v_{Ix}{}^F$ and $v_{Iy}{}^F$, a coordinate transformation computer connected to receive the estimated speed signals and the transformation parameters from the transformation parameter computer and which comprises first means for transforming these speed signals into transformed speed signals, which are referenced to an earth-fixed coordinate system, said computer producing signals $C_{31}$, $C_{32}$, $C_{33}$ from the last line of a directional cosine matrix for the transformation from a vehicle-fixed coordinate system into an earth-fixed coordinate system, and a position computer connected to receive the transformed speed signals and which comprises second means for providing position signals representing the position of the vehicle, said optimal filter comprising:

(a) a first summing point connected to receive the estimated value $\hat{\Delta v}_{Ix}{}^F$ of the error of the longitudinal component signal $v_{Ix}{}^F$ of the inertial speed and the estimated value $\hat{\Delta v}_x{}^F$ of the error of the speed signal $v_x{}^F$ and to produce a difference signal therefrom, (b) a second summing point connected to receive the inertial speed signal $v_{Ix}{}^F$ and the speed sensor speed signal $v_x{}^F$ and to produce a difference signal $v_{Ix}{}^F - v_x{}^F$ therefrom.

(c) a third summing point connected to receive said two difference signals and to produce a third difference signal $z_1$ therefrom, (d) a fourth summing point connected to receive the inertial speed signal $v_{Iy}{}^F$ and the estimated value $\hat{\Delta v}_y{}^F$ of the error of the transverse component signal $v_{Iy}{}^F$ of the inertial speed and to provide a fourth difference signal $z_2$ therefrom, (e) a first multiplier connected to receive the difference signal $z_1$ and to multiply it by a given factor $K_{11}$ to produce a signal $K_{11} z_1$, (f) third means connected to receive signals $d_z$, $d_y$ from the inertial measuring unit and signals $C_{32}$, $C_{33}$ from the coordinate transformation computer and to produce a signal $C_{32} d_z - C_{33} d_y$ therefrom, (g) a fifth summing point connected to said third means and said first multiplier to produce a signal representing the sum of the signals from said third means and the first multiplier, (h) a first integrator connected to said fifth summing point to integrate said sum of said signals and thereby produce a signal $\hat{\Delta} C_{31}$ which represents an estimated value of the error of the signal $C_{31}$ of the directional cosine matrix, (i) a second multiplier connected to receive the difference signal $z_2$ and to multiply it by a given factor $K_{22}$ to produce a signal $K_{22} z_2$, (j) fourth means connected to receive signals $d_x$, $d_y$ from the inertial measuring unit and signals $C_{31}$, $C_{33}$ from the coordinate transformation computer and to produce a signal $C_{33} d_x - C_{31} d_y$ therefrom, (k) a sixth summing point connected to said fourth means and said second multiplier to produce a signal representing the sum of the signals from the fourth means and the second multiplier, (l) a second integrator connected to said sixth summing point to integrate the sum signal of the sixth summing point and thereby produce a signal $\hat{\Delta} C_{32}$ which represents an estimated value of the error of the signal $C_{32}$ of the directional cosine matrix, (m) multiplying means connected to receive signals $C_{31}$ and $z_1$ and to multiply the signal $C_{31}$ by the accelerating due to gravity and to multiply the signal $z_1$ by a given factor $K_{31}$ and by the known accelerator deviation $b_x$ to produce output signals $g C_{31}$ and $K_{31} z_1 b_x$, (n) a seventh summing point connected to said multiplying means to receive the output signals therefrom and to add those signals together to produce a sum signal, (o) a third integrator connected to said seventh summing point to receive the sum signal therefrom and to integrate it to produce a signal $\hat{\Delta v}_{Ix}{}^F$ representing the estimated value of the error of the longitudinal component signal $v_{Ix}{}^F$ of the inertial speed, (p) an eighth summing point connected to receive the signals $A_x{}^F$ and $g C_{31}$ and add them to produce a signal $v_x{}^F$ representing the translatory acceleration in the direction of the longitudinal axis of the vehicle, (q) multiplying means and a fourth integrator connected to receive the difference signal $z_1$ multiply it by a given factor $K_{61}$ and integrate the product $K_{61}z_1$ thereof to produce a signal $\hat{\Delta k}_x$ representing the estimated value of the error of the scale factor of the speed sensor, (r) multiplying means and a ninth summing point connected to receive the difference signal $z_1$ and the translatory acceleration signal $v_x^F$, to multiply the difference signal $z_1$ with a given factor $K_{51}$ and to add the product $K_{51}z_1$ thereof with the signal $v_x^F$ to produce an output signal, (s) a sixth integrator connected to receive and integrate the last mentioned output signal to produce a signal $\hat{\Delta v}_x^F$ which represents the estimated value of the error of the speed signal from the speed sensor, (t) multiplying means connected to receive the signals $C_{32}$ and $z_2$, to multiply the signal $C_{32}$ by the acceleration g due to gravity and to multiply the signal $z_2$ by a given factor $K_{42}$ and by the known zero deviation $b_x$ to produce output signals $gC_{32}$ and $K_{42}z_1b_x$, (u) a tenth summing point connected to receive the output signals of the last mentioned multiplying means and to add those signals together to produce a sum signal, (v) a seventh integrator connected to receive the sum signal from the tenth summing point and to integrate that signal to produce a signal $\hat{\Delta v}_{Iy}^F$ which represents the estimated value of the error of the transverse component signal $v_{Iy}^F$, and (w) means connected to receive the speed signal $v_x^F$ and the estimated speed error signal $\hat{\Delta v}_x^F$ and to subtract the latter from the former to produce a corrected speed signal.

25. Navigational instrument as set forth in claim 24, and wherein the vehicle has a significant rotary speed $\omega_z^F$ about its vertical axis z, said instrument further comprising (a) multiplying means connected to receive the difference signals $z_1$ and $z_2$ and to multiply the $z_1$ signal by a given factor $K_{21}$ to produce a product signal $K_{21} z_1$ and to multiply the $z_2$ signal by given factors $K_{12}$, $K_{32}$ and $K_{52}$ to produce product signals $K_{12} z_2$, $K_{32} z_2$ and $K_{52} z_2$ respectively, (b) multiplying means connected to receive the $\hat{\Delta C}_{32}$ signal and to multiply it by the rotary speed $\omega_z^F$ to produce a signal $\omega_z^F \hat{\Delta C}_{32}$, (c) said fifth summing point being connected to receive and additionally add said product signal $K_{12} z_2$ and said $\omega_z^F \hat{\Delta C}_{32}$ signal in the production of the signal by the fifth summing point, (d) said sixth summing point being connected to receive and additionally add said product signal $K_{21} z_1$ and said $\omega_z^F \hat{\Delta C}_{32}$ signal in the production of the signal by the sixth summing point, (e) said seventh summing point being connected to receive and additionally add said product signal $K_{32} z_2$ in the production of the signal by the seventh summing point, and (f) said ninth summing point being connected to receive and additionally add said product signal $K_{52} z_2$ in the production of the signal by the ninth summing point.

* * * * *